United States Patent
Otsuka et al.

(10) Patent No.: US 6,416,151 B1
(45) Date of Patent: Jul. 9, 2002

(54) PRINTING APPARATUS PERFORMING PRINT REGISTRATION

(75) Inventors: Naoji Otsuka, Yokohama; Kiichiro Takahashi, Kawasaki; Hitoshi Nishikori, Inagi; Osamu Iwasaki, Tokyo; Minoru Teshigawara, Urawa; Toshiyuki Chikuma, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/285,791

(22) Filed: Apr. 5, 1999

(30) Foreign Application Priority Data

Apr. 3, 1998 (JP) .......................................... 10-108668

(51) Int. Cl.⁷ ............................................. B41J 29/393
(52) U.S. Cl. ....................................................... 347/19
(58) Field of Search ............................ 347/14, 15, 119, 347/43, 37, 41; 358/504

(56) References Cited

U.S. PATENT DOCUMENTS

| | | | |
|---|---|---|---|
| 4,313,124 A | 1/1982 | Hara ........................... | 347/57 |
| 4,345,262 A | 8/1982 | Shirato et al. ................ | 347/56 |
| 4,459,600 A | 7/1984 | Sato et al. .................... | 347/47 |
| 4,463,359 A | 7/1984 | Ayata et al. ................... | 347/56 |
| 4,558,333 A | 12/1985 | Sugitani et al. ............... | 347/65 |
| 4,723,129 A | 2/1988 | Endo et al. ................... | 347/56 |
| 4,740,796 A | 4/1988 | Endo et al. ................... | 347/56 |
| 5,250,956 A | * 10/1993 | Haselby et al. ................ | 347/19 |
| 5,289,208 A | * 2/1994 | Haselby ........................ | 347/19 |
| 5,488,397 A | 1/1996 | Nguyen et al. ................ | 347/40 |
| 5,564,848 A | 10/1996 | Quintana ....................... | 400/78 |
| 5,604,520 A | 2/1997 | Matsubara et al. ............ | 347/43 |
| 5,818,474 A | 10/1998 | Takahashi et al. ............. | 347/15 |
| 5,852,454 A | 12/1998 | Kanematsu et al. ........... | 347/43 |
| 6,109,722 A | * 8/2000 | Underwood ................... | 347/19 |

FOREIGN PATENT DOCUMENTS

| | | | |
|---|---|---|---|
| EP | 0257570 | 3/1988 | ............. B41J/3/04 |
| EP | 0570167 | 11/1993 | ........... B41J/2/205 |
| EP | 0622239 | 11/1994 | |
| JP | 54-56847 | 5/1979 | ........... B41M/5/26 |
| JP | 59123670 | 7/1984 | ............. B41J/3/04 |
| JP | 59138461 | 8/1984 | ............. B41J/3/04 |
| JP | 60-71260 | 4/1985 | ............. B41J/3/04 |
| JP | 4-041252 | 4/1992 | ............. B41J/2/21 |
| JP | 5-92565 | 4/1993 | ............. B41J/2/05 |
| JP | 7-101101 | * 7/1995 | ............. B41J/2/51 |

* cited by examiner

Primary Examiner—John Barlow
Assistant Examiner—Juanita Stephens
(74) Attorney, Agent, or Firm—Fitzpatrick, Cella, Harper & Scinto

(57) ABSTRACT

A first printing pattern is formed for a patch by means of a paper feed upstream side part of a black head. Then, a second printing pattern is formed for the patch by means of a cyan head in the following scans, and density of the patch is read by a reflection optical sensor in a scan after the completion of both patterns.

20 Claims, 46 Drawing Sheets

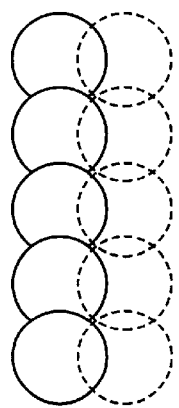
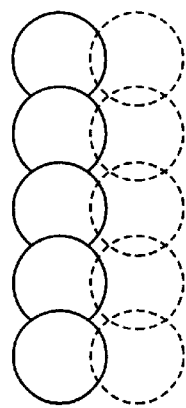
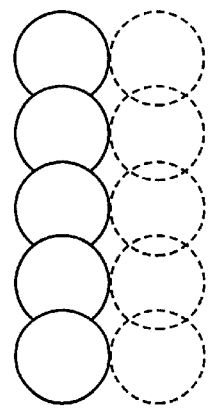
*FIG.29A*     *FIG.29B*     *FIG.29C*

|  | PRINTING MEDIUM 1 | PRINTING MEDIUM 2 | PRINTING MEDIUM 3 |
|---|---|---|---|
| PATTERN 1 | 0 | 1 | 4 |
| PATTERN 2 | 0 | 2 | 8 |

*FIG.50A*

|  | PRINT HEAD 1 | PRINT HEAD 2 | PRINT HEAD 3 |
|---|---|---|---|
| PATTERN 1 | 0 | 1 | 4 |
| PATTERN 2 | 0 | 2 | 8 |

*FIG.50B*

|  | INK 1 | INK 2 | INK 3 |
|---|---|---|---|
| PATTERN 1 | 0 | 1 | 4 |
| PATTERN 2 | 0 | 2 | 8 |

*FIG.50C*

|  | ENVIRONMENTAL CONDITION 1 | ENVIRONMENTAL CONDITION 2 | ENVIRONMENTAL CONDITION 3 |
|---|---|---|---|
| PATTERN 1 | 0 | 1 | 4 |
| PATTERN 2 | 0 | 2 | 8 |

*FIG.50D*

PRINTING APPARATUS PERFORMING PRINT REGISTRATION

This application is based on Patent Application No. 10-108668 filed Apr. 3, 1998 in Japan, the content of which is incorporated hereinto by reference.

BACKGROUND OF THE INVENTION

1. Field of the Invention

The present invention relates to a printing apparatus. More particularly, the invention relates to a printing apparatus which performs print registration upon bi-directional printing in which printing is performed during a forward scan and a reverse scan of a printing head or upon printing employing a plurality of printing heads.

2. Description of the Prior Art

Conventionally, printing registration of this kind is generally performed in the following manner.

For example, in the case of printing registration for the bi-directional printing where a forward scan and a reverse scan are performed to perform printing, a relative printing registration condition for the respective forward and reverse scans is varied by adjusting respective printing timing in the forward scan and the reverse scan and ruled lines are printed on a printing medium during the respective forward and reverse scans with use of the respective printing registration conditions. Then, a result of printing is observed by a user or the like to select the printing registration condition where best printing registration is achieved and a printing condition concerning the printing registration is set in a printing apparatus, a host computer or the like.

In the case of the printing registration between heads in the printing apparatus in which a plurality of printing heads are employed for printing, the ruled lines are printed by respective heads with varying the relative printing registration condition between the heads. Then, the printing registration condition where the best printing registration is attained is selected, by the user or the like, similarly to the above, to set the selected printing registration condition in the printing apparatus, the host computer or the like.

However, such conventional printing registration methods are accompanied by a troublesome operation that the user or the like observes a print result for the printing registration to select the printing registration condition and performs an operation for setting the printing registration condition. Therefor, some users, for whom such troublesome operation is unfavorable, may not perform the printing registration and use a printing apparatus in a condition containing a disagreement of printing positions between the respective forward and reverse scans or a disagreement of printing positions between the respective heads.

Furthermore, in the conventional methods, the printing registration condition can be selected only among respective printing registration conditions represented by printed patterns for the printing registration. For further printing registration with higher precision, it becomes necessary to perform printing of greater number of patterns with slightly varying the printing registration condition and it is also necessary for the user to distinguish delicate difference among the printed patterns to select the printing registration condition. In addition to trouble of the user, it takes a long period for performing the printing registration and require large number of patterns printed on the printing medium.

SUMMARY OF THE INVENTION

The object of the present invention is to provide a printing apparatus which can printing registration without troubling a user of the printing apparatus.

Another object of the present invention is to provide a printing apparatus which can perform an optimal printing registration irrespective of the ink to be used.

Still another object of the present invention is to provide a printing apparatus, wherein in the proximity of a scanning unit, there is provided an optical characteristic measuring unit for measuring optical characteristics of respective patterns which are printed during respective a first and a second printings to which printing registration performed, a plurality of density measurements are performed to the patterns by the optical characteristic measuring unit, and the print registration processing can be performed based on the measured density.

Still another object of the present invention is to provide a printing apparatus, wherein an interval between respective executions of pattern formation and measurement of the pattern can variously be adjusted so as to measure optical characteristics of the pattern by an optical characteristic measuring unit after a predetermined time elapses from the pattern formation during relative movement of a print head to a printing medium.

There is provided a printing apparatus for performing printing on a printing medium by using a print head, comprising:

scanning means for relatively moving the print head and the printing medium;

control means for controlling the print head to perform a first printing and a second printing which are a subject of printing registration so as to form a plurality of patterns, the plurality of patterns being formed in correspondence with a plurality of offset amounts in relative printing locations between the first printing and the second printing, respectively, and showing optical characteristics corresponding to the plurality of offset amounts, respectively;

optical characteristics measuring means provided on a location in the vicinity of the scanning means to measure the optical characteristics of each of the plurality of patterns formed by means of the print head controlled by the control means; and printing registration means for performing printing registration processing of the first printing and the second printing based on respective the optical characteristics of a plurality of patterns measured by the optical characteristics measuring means.

It should be noted that throughout the description and claims the wording "printing" means, in broad sense, not only forming significant information such as characters or graphics but also forming images, figures, patterns and the like on the printing medium or processing the medium irrespective of whether the information is significant or not and whether the information is overt or not in such a manner as to be visually perceived by a person.

Here, the wording "a printing medium" means, in broad sense, not only paper to be typically used in the printing apparatus but also cloths, plastic films, metal plates and the like which can receive the ink.

Furthermore, the wording "ink" should be understood in broad sense similarly to the definition of "printing," and should include any liquid to be used for formation of images, figures, patterns and the like or for processing of the printing medium by applying the ink to the printing medium.

Throughout the description and claims, the optical characteristics include the optical density, namely, the reflection optical density using a reflection index and the transmission optical density using transmittance. But, an optical reflection index, the intensity of reflected light or the like may be used. In the following description and claims, the reflection optical density is mainly used as the optical characteristics and is simply referred to as the optical density or the density without any particular confusion.

The above and other objects, effects, features and advantages of the present invention will become more apparent from the following description of the embodiments thereof in conjunction with the accompanying drawings.

BRIEF DESCRIPTION OF THE DRAWINGS

FIGS. 6A to 6C are schematic views respectively illustrating printing patterns for use in the first embodiment according to the present invention, wherein FIG. 6A illustrates dots in the case where the printing positions are well registered; FIG. 6B, where the printing positions are registered with a slight offset; and FIG. 6C, where the printing positions are registered with a greater offset;

FIGS. 7A to 7C are schematic views respectively illustrating patterns for printing registration for use in the first embodiment according to the present invention, wherein FIG. 7A illustrates dots in the case where the printing positions are well registered; FIG. 7B, where the printing positions are registered with a slight offset; and FIG. 7C, where the printing positions are registered with a greater offset;

FIGS. 13A to 13C are schematic views respectively illustrating other printing patterns in the first embodiment according to the present invention, wherein FIG. 13A illustrates dots in the case where the printing positions are well registered; FIG. 13B, where the printing positions are registered with a slight offset; and FIG. 13C, where the printing positions are registered with a greater offset;

FIGS. 14A to 14C are schematic views respectively illustrating further printing patterns in the first embodiment according to the present invention, wherein FIG. 14A illustrates dots in the case where the printing positions are well registered; FIG. 14B, where the printing positions are registered with a slight offset; and FIG. 14C, where the printing positions are registered with a greater offset;

FIGS. 15A to 15C are schematic views respectively illustrating still further printing patterns in the first embodiment according to the present invention, wherein FIG. 15A illustrates dots in the case where the printing positions are well registered; FIG. 15B, where the printing positions are registered with a slight offset; and FIG. 15C, where the printing positions are registered with a greater offset;

FIGS. 16A to 16C are schematic views respectively illustrating still further printing patterns in the first embodiment according to the present invention, wherein FIG. 16A illustrates dots in the case where the printing positions are well registered; FIG. 16B, where the printing positions are registered with a slight offset; and FIG. 16C, where the printing positions are registered with a greater offset;

FIGS. 18A to 18C are schematic views illustrating characteristics depending upon a distance between dots of the printing pattern in the second embodiment according to the present invention, wherein FIG. 18A illustrates dots in the case where the printing positions are well registered; FIG. 18B, where the printing positions are registered with a slight offset; and FIG. 18C, where the printing positions are registered with a greater offset;

FIGS. 19A to 19C are schematic views illustrating characteristics depending upon a distance between dots of the printing pattern in the second embodiment according to the present invention, wherein FIG. 19A illustrates dots in the case where the printing positions are well registered; FIG. 19B, where the printing positions are registered with a slight offset; and FIG. 19C, where the printing positions are registered with a greater offset;

FIGS. 21A to 21C are schematic views respectively illustrating printing patterns in a third embodiment according to the present invention, wherein FIG. 21A illustrates dots in the case where the printing positions are well registered; FIG. 21B, where the printing positions are registered with a slight offset; and FIG. 21C, where the printing positions are registered with a greater offset;

FIGS. 25A to 25C are schematic views illustrating a printing registration reference pattern thinned to half in the forth embodiment according to the present invention, wherein FIG. 25A illustrates dots in the case where the printing positions are well registered; FIG. 25B, where the printing positions are registered with a slight offset; and FIG. 25C, where the printing positions are registered with a greater offset;

FIGS. 29A to 29C are schematic views illustrating a printing registration reference pattern thinned to half in a seventh embodiment according to the present invention, wherein FIG. 29A illustrates dots in the case where the printing positions are well registered; FIG. 29B, where the printing positions are registered with a slight offset; and FIG. 29C, where the printing positions are registered with a greater offset;

FIGS. 30A and 30B are views illustrating a drive pulse of a printing head in the seventh embodiment according to the present invention, wherein FIG. 30A illustrates a single pulse; and FIG. 30B, double pulses;

FIG. 50A to FIG. 50D illustrate, respectively, an example of waiting time setting in the another embodiment.

DETAILED DESCRIPTION OF PREFERRED EMBODIMENTS

Figure 1:
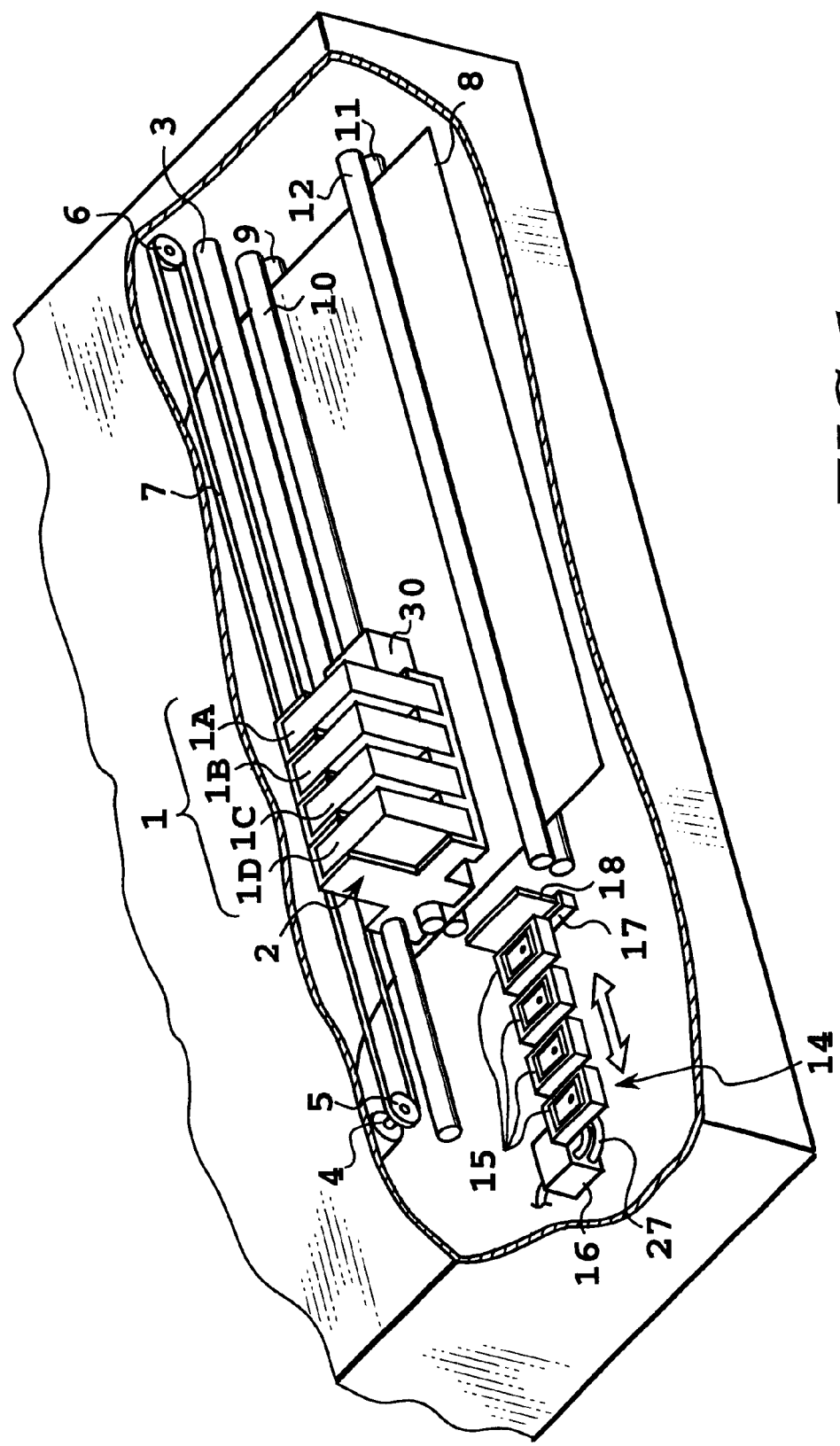
FIG. 1 is a perspective view, partly broken away, showing a schematic construction of an ink-jet printing apparatus in one preferred embodiment according to the present invention.

In a printing registration method and a printing apparatus in one embodiment according to the present invention, printing in forward scan and in reverse scan or printing by each of a plurality of printing heads (hereinafter referred to as "first printing" and "second printing"), which should be registered with each other, is performed at the same position on a printing medium. Printing is performed under a plurality of mutually distinct conditions by varying conditions determining relative position between the first printing and the second printing. An optical sensor having a resolution lower than that of the printing reads a density of each printing to determine a best printing registration condition on the basis of the relationship between those density values. Such determination is variable depending upon the pattern to be printed.

In one embodiment according to the present invention, a printing head is scanned for printing in forward and reverse directions with respect to a printing medium. In printing registration for the forward scan and the reverse scan in a serial printer for forming an image by bi-directional scanning, the first printing pattern to be used for printing in the forward scan and the second printing pattern to be used for printing in the reverse scan are as follows.

With respect to a printing pattern in the case where bi-directional printing is performed under an ideal printing registration condition, a distance in a carriage scanning direction between a printing dot to be formed in the forward scan and a printing dot to be formed in the reverse scan preferably ranges from half of a dot diameter to the same as a dot diameter. In this printing pattern, an average density of a printed portion is reduced as the relative positions are shifted. With the pattern, whether the printing positions are registered or not influences on the average density of a portion to be printed (hereinafter referred to as "a printed portion"). A printing registration condition can be determined by measurement of the density by an optical sensor mounted on a carriage and calculation based on the measured density. In calculating, predetermined calculation is performed on the basis of a density distribution with respect to a plurality of printing registration conditions to determine the condition where the best printing registration is attained. It should be noted that when high precision is not required in printing registration and more simplified calculation is desired, a printing condition where, for example, the highest density data is obtained, may be selected as the printing registration condition.

Printing patterns in other embodiments are as follows. When a first pattern to be used for printing in the forward scan and a second pattern to be used for printing in the reverse scan are printed under an ideal printing registration condition, dots printed respectively are almost overlapped with each other. As the registration is shifted, printing registration in the overlapped dots are shifted, to thus increase the average density in the printed portion. With the pattern, whether the printing positions are registered or not influences on the average density of the printed portion. Thereafter, a printing registration condition can be determined by measurement of the density by the optical sensor mounted on the carriage and calculation based on the measured density, as described above. In the calculation method, the best printing registration condition can be determined on the basis of a density distribution with respect to a plurality of printing registration conditions. It should be noted that when more simplified calculation is to be performed, a printing registration condition according to the lowest density data can be selected in the embodiment.

In the foregoing two embodiments, in order to perform printing registration of bi-directional printing with high precision, it is desirable that the density of the printed portion on the printing medium be significantly varied according to the printing registration conditions. For this purpose, it is required that the distance between the printing dots in the carriage scanning direction of the printing patterns in the forward scan and the reverse scan be appropriate with respect to the diameter of the dot. On the other hand, in, for example, an ink-jet type printing apparatus, the dot diameter is varied according to the properties of the printing medium, the kind of ink, the volume of ink droplets to be ejected from the printing head. Therefore, in advance of pattern printing for printing registration, a plurality of predetermined patterns are printed by varying the distance between the dots in the carriage scanning direction, the optical densities of the patterns are read to determine the dot diameters at that time based on the reading result, thereby adjusting the distance between the dots in pattern printing for printing registration. Consequently, appropriate printing registration can be achieved irrespective of the kind of printing medium or ink, the size of the ink droplet and so on.

In order to perform printing registration of the bi-directional printing with higher precision, it is desirable that an output of the optical sensor should have a sufficient gradation level. For this purpose, it is necessary that the density of the printed portion for the printing registration should fall within a predetermined range. For example, when printing is performed with black ink on a printing medium having high color development characteristics, the printed portion becomes excessively black to reduce the absolute amount of reflected light, thereby causing the shortage of the output of the optical sensor. In advance of pattern printing for printing registration, a plurality of predetermined patterns are printed and their optical densities are read. On the basis of the result, the color development characteristics at that time are evaluated. The dots in the printing pattern for printing registration are thinned or overlapped on the basis of the evaluation, thereby adjusting the density.

In a further embodiment according to the present invention, the present invention is applicable to a serial printer including a plurality of printing heads, in which the printing heads are scanned with respect to a printing medium so as to form an image. In this case, concerning printing registration in the carriage scanning direction between the heads, not the relative registration between the printing in the forward scan and the printing in the reverse scan but the relative registration between printing by a first head and printing by a second head can be implemented in the same manner as the above-described printing registration of the bi-directional printing.

Moreover, with respect to printing registration in the case where a plurality of printing heads are arranged in a direction perpendicular to the carriage scanning direction, not printing in the forward scan and the reverse scan, but printing by the first and second heads arranged in the vertical direction is performed to achieve printing registration in the same manner as the above-described printing registration in the bi-directional printing.

Furthermore, it is to be understood that even in a so-called full-line type printing apparatus, in which printing heads are fixed to the printing apparatus and a printing medium is only fed, printing registration can be performed in the same manner.

The present invention is further applicable to printing with oozy ink or printing medium. A plurality of uniform patterns are printed on the printing medium while varying an ink ejection amount, optical reflection indexes are measured by a sensor on a carriage to determine a region of the ejection amount, in which the variation amount of the optical reflection index is largest. In the region of the ink ejection amount, the patterns for printing registration are printed while varying its relative printing position. After measuring the optical reflection index, the best reflection index, for example, the lowest reflection index is calculated under the condition that the reflection index of the pattern becomes larger as the offset of the printing position becomes lager, thereby selecting an optimum printing position.

Furthermore, the patterns are printed on the printing medium while varying the ejection amounts and the printing positions. Among the printed patterns, the ejection amount at which the variation in optical reflection index is highest and the lowest optical reflection index when the printing registration is varied at that ejection amount are calculated to select an optimum printing position.

Next, concerning printing registration in the case where a plurality of colors of inks are used in the first head and the second head, when the inks to be used are different in color, oozing in the printing by the first head and oozing in the printing by the second head are different due to compositions of the inks. For example, when printing is performed on an oozy printing medium such as plain paper, the adjacent dots are oozed to be merged with each other even if printing positions are varied, reducing a variation in density and making it difficult to select the optimum printing position.

A plurality of uniform patterns are printed on the printing medium with the ink of the first head used in the printing registration pattern while the ejection amount is varied. Then, the densities of the printed patterns are measured by the sensor mounted on the carriage, thereby determining the ejection amount region where the variation amount of the optical reflection index becomes large. Similarly, the ejection amount region where the variation amount of the optical reflection index becomes largest is determined with respect to the ink of the second head to be used in the printing registration pattern. The patterns for printing registration in the optimum ejection amount region are printed by the first and second heads while the printing positions are varied. Printing registration by using a plurality of colors of inks can be performed by using not only colored inks but also transparent ink which varies the density when overlapped with colored inks.

The patterns are printed on the printing medium while varying the ejection amounts and printing positions of the first and second heads. Among the printed patterns, the ejection amount at which the variation in optical reflection index is highest and the lowest optical reflection index when the printing registration is varied at that ejection amount are calculated to select an optimum printing position.

Similarly, concerning printing registration between a plurality of printing heads in a direction different from the carriage scanning direction, for example, in the vertical direction between the printing heads in a serial printer which has the printing heads and forms an image by scanning the printing heads with respect to a printing medium, not printing in the forward scan and the reverse scan but printing by the first head and the second head is performed. Similarly to the case of printing registration in the above-described bi-directional printing, a pattern, in which the vertical and horizontal directions in the bi-directional printing are reversed, is used for printing registration.

In the case of the optimum printing registration, either in automatic printing registration or in the manual printing registration by a user, it is important that the results of the first printing and the second printing on the printing medium should exceed a predetermined density. Namely, it is important to vary the ink ejection amount depending upon the higher density ink or the lower density ink. In this way, a predetermined density can be obtained irrespective of the ink, to permit optimum printing registration. The density of the printed portion depends on the property of the printing medium, the kind of ink, the volume of ink droplets to be ejected from the printing head onto the printing medium, and the like. Accordingly, in order to achieve precise printing registration by the plurality of heads, it is desirable to significantly vary the density of the printed portion on the printing medium according to variations of the printing registration condition between the heads.

Therefore, it is preferable that the densities of the respective printed portions by the plurality of heads registered for printing should be substantially equal. However, when the printing registration pattern is printed with the ink having a high density and the ink having a low density, the relative difference in density of the printed portion between the heads becomes significant. Namely, even if the relative printing position between the heads is varied, the result of printing with the high density ink becomes dominant to make it impossible to obtain density variations required for judgment of printing registration so as to cause difficulty in selecting the optimum printing position.

Before the printing registration pattern is printed on the printing medium, a plurality of uniform patterns are printed while varying the ink ejection amount, and then, the sensor mounted on the carriage measures the densities of the printed patterns, thereby determining the ink ejection condition region where the density variation rate is optimum. The printing registration pattern is printed in the region of the ink ejection condition while varying the printing position. Subsequently, the density is measured, the highest density is calculated, thus selecting the optimum printing position.

The ink loaded previously in the printing head, the ink amount required for printing registration by the head and so on are stored in advance in the printing head. Under such condition, the printing registration pattern is printed while varying the printing position, and then, the highest density is calculated to select the optimum printing position.

Concerning printing registration in the case where a plurality of colors of inks are used, a difference in sensitivity may be caused by the combination of the inks, the printing medium and the sensor to be used for reflection density detection.

Therefore, in advance of printing of the printing registration pattern on the printing medium, a plurality of uniform patterns, in which respective colors are uniform, are printed while varying the discharge amount, the ejection amount and the number of times of ejection. Then, the densities of the patterns are measured by the density sensor mounted on the carriage to select two colors of the optimum density variation. The printing registration patterns are printed with the two colors of inks, thereby calculating the highest density so as to achieve optimum printing registration.

With the combination of all colors, a plurality of uniform patterns are printed while varying the discharge amount, the ejection amount and the number of times of ejection. Then, the densities of the patterns are measured by the density sensor mounted on the carriage, determining the combination where the variation amount of the density is largest. Next, the ejection condition region where the density variation is largest is determined, and then, the printing registration pattern is printed in the ejection condition region while varying the printing position. Consequently, the optimum printing position can be selected.

Printing registration by using a plurality of colors of inks can be performed by using not only colored inks but also transparent ink which can vary the density by causing dilution or a change in composition when overlapped with the colored inks.

In a serial printer as another embodiment according to the present invention which has a plurality of printing heads and forms an image by scanning the printing heads with respect to a printing medium, the present invention is applicable even to the case where printing registration is performed visually by a user without using any optical sensor. When printing registration is performed in the carriage scanning direction between the heads, not the above-described printing pattern but rules indicative of variation of the relative positional relationship of the first print and the second print are printed. In printing the rules, ink ejecting conditions are varied according to the density of the ink of each of the heads to be registered. With the variation in ink ejection amount, an optimum printing registration condition can be selected.

Concerning printing registration in a direction perpendicular to the carriage scanning direction, the present invention can be implemented by reversing the vertical and lateral directions of the printing patterns used in the foregoing two embodiments. Similarly to the above-described embodiment, in a serial printer which forms an image by scanning a plurality of printing heads on a printing medium, printing registration can be implemented by performing printing by the first head and the second head. Printing registration in the bi-directional printing can be similarly performed in any of the foregoing embodiments by using the first print and the second print.

Preferred embodiments according to the present invention will be explained hereinafter with reference to the drawings.

Like reference numerals designate like or corresponding parts throughout the drawings.

[First Embodiment]

In a first embodiment according to the present invention, printing registration between a printing position in the forward scan and a printing position in the reverse scan is performed in a printing system for forming an image by performing complementary printing in the forward scan and the reverse scan by means of one printing head. In this embodiment, one kind of printing medium is used.

(First Construction of Printing Apparatus)

FIG. 1 is a schematic perspective view showing the construction of main parts of an ink-jet printing apparatus in one preferred embodiment, to which the present invention is applied.

In FIG. 1, a plurality (four) of head cartridges 1A, 1B, 1C and 1D are mounted on a carriage 2 in a replaceable manner. Each of the head cartridges 1A to 1D has a printing head and an ink tank, and also has a connector for transmitting or receiving a signal for driving the printing head. It should be noted that, in the following explanation, all or an arbitrary one of the head cartridges 1A to 1D is simply referred to as a printing head 1 or a head cartridge 1.

The plurality of head cartridges 1 are adapted to perform printing with different colors of inks, respectively. Inks of different colors such as black, cyan, magenta and yellow are contained in the ink tanks of the head cartridges 1, respectively. Each head cartridge 1 is positioned and mounted on the carriage 2 in a replaceable manner. In the carriage 2, a connector holder (electrical connecting portion) is provided for transmitting a drive signal or the like to each head cartridge 1 via the connector.

The carriage 2 is guided and supported by a guide shaft 3 extending in a primary scanning direction in an apparatus body for bi-directional movement along the guide shaft 3. The carriage 2 is driven by a primary scanning motor 4 via a driving mechanism such as a motor pulley 5, a driven pulley 6 and a timing belt 7, and the position and motion of the carriage 2 is controlled. A printing medium 8 such as printing paper or a plastic thin film is fed (paper feeding) through a position (printed portion) facing the ejection opening surface of the head cartridge 1 by rotation of two sets of transporting rollers 9, 10 and 11, 12. It should be noted that the back surface of the printing medium 8 is supported by a platen (not shown) so as to form a flat printing surface in the printed portion. In this case, each head cartridge 1 mounted on the carriage 2 is held in parallel with the printing medium 8 between the two sets of transporting rollers with the ejection opening surface projecting downward from the carriage 2. Moreover, a reflection type optical sensor 30 is mounted on the carriage.

The head cartridge 1 is an ink-jet head cartridge for ejecting ink utilizing thermal energy, in which an electro-thermal transducer is provided for generating thermal energy. Namely, the printing head of the head cartridge 1 performs printing by ejecting the ink through the ejection openings using pressure of bubbles generated by film boiling caused by the thermal energy applied by the electro-thermal transducer.

The reflection type optical sensor 30 is offset to the head cartridge 1A, 1B, 1C, 1D in a scanning direction of the carriage 2 and is adapted to detect density of an image printed by ejecting the ink from the respective print heads. It should be noted that a layout of the reflection type optical sensor 30 and the respective head cartridge may realized as many kinds of modifications as described later.

(Second Construction of Printing Apparatus)

Figure 2:
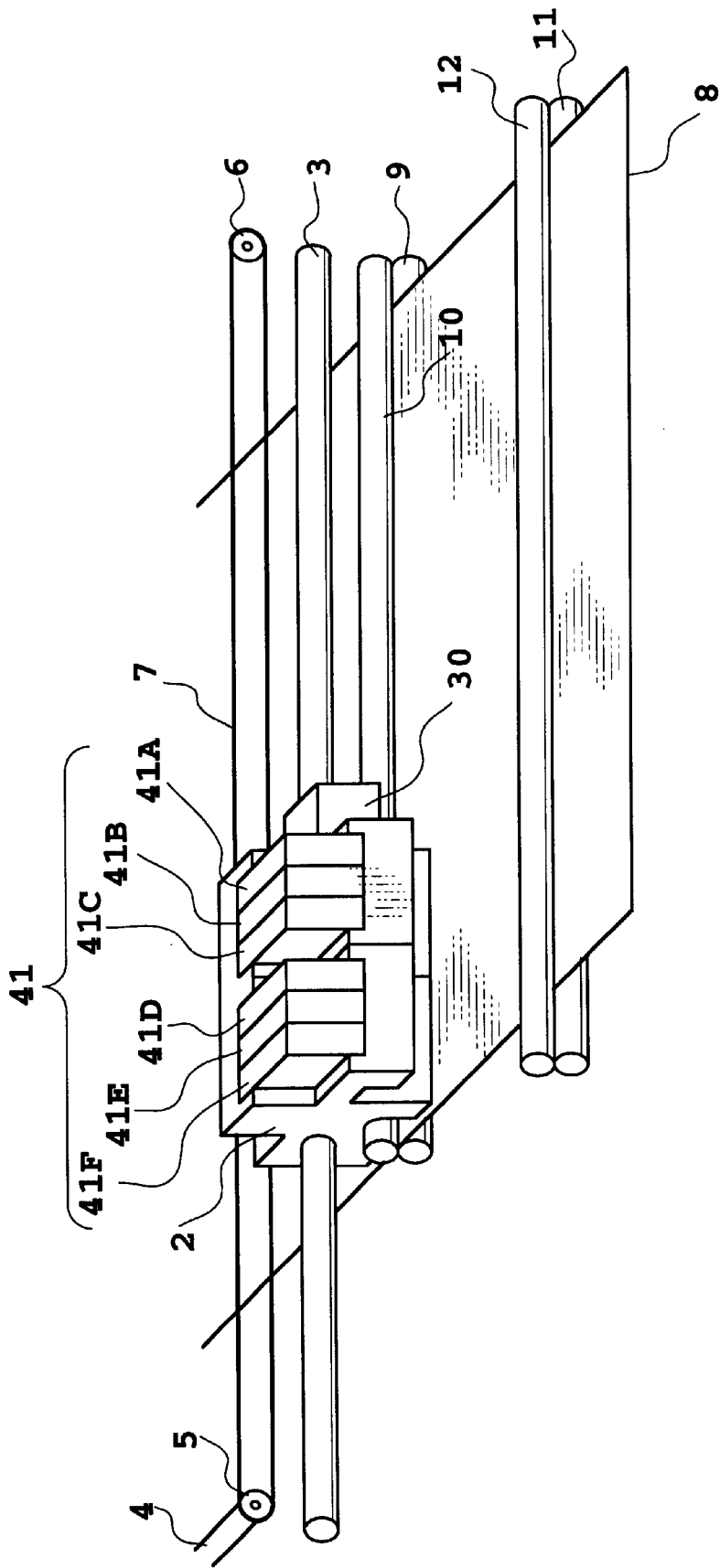
FIG. 2 is a perspective view, partly broken away, showing a schematic construction of an ink-jet printing apparatus in another preferred embodiment according to the present invention.

FIG. 2 is a schematic perspective view showing the construction of main parts of another preferred embodiment of an ink-jet printing apparatus, to which the present invention is applied. In FIG. 2, since parts designated by the same reference numerals as those in FIG. 1 have the same functions, a description is omitted.

In FIG. 2, a plurality (six) of head cartridges 41A, 41B, 41C, 41D, 41E and 41F are mounted on a carriage 2 in a replaceable manner. Each of the head cartridges 41A to 41F has a connector for receiving a signal for driving a printing head. It should be noted that, in the following explanation, all or an arbitrary one of the head cartridges 41A to 41F is simply referred to as a printing head or a head cartridge 41. A plurality of head cartridges 41 are adapted to perform printing with different colors of inks, respectively. Inks of different colors such as black, cyan, magenta, yellow, light cyan and light magenta are contained in ink tanks of the head cartridges 41, respectively. Each head cartridge 41 is positioned and detachably mounted on the carriage 2. In the carriage 2, a connector holder (electrical connecting portion) is provided for transmitting a drive signal or the like to each head cartridge 41 via the connector.

A positional relationship between the reflection type optical sensor 30 and the respective head cartridge is similar to that shown in FIG. 1. This layout also may have many kinds of modifications.

Figure 3:
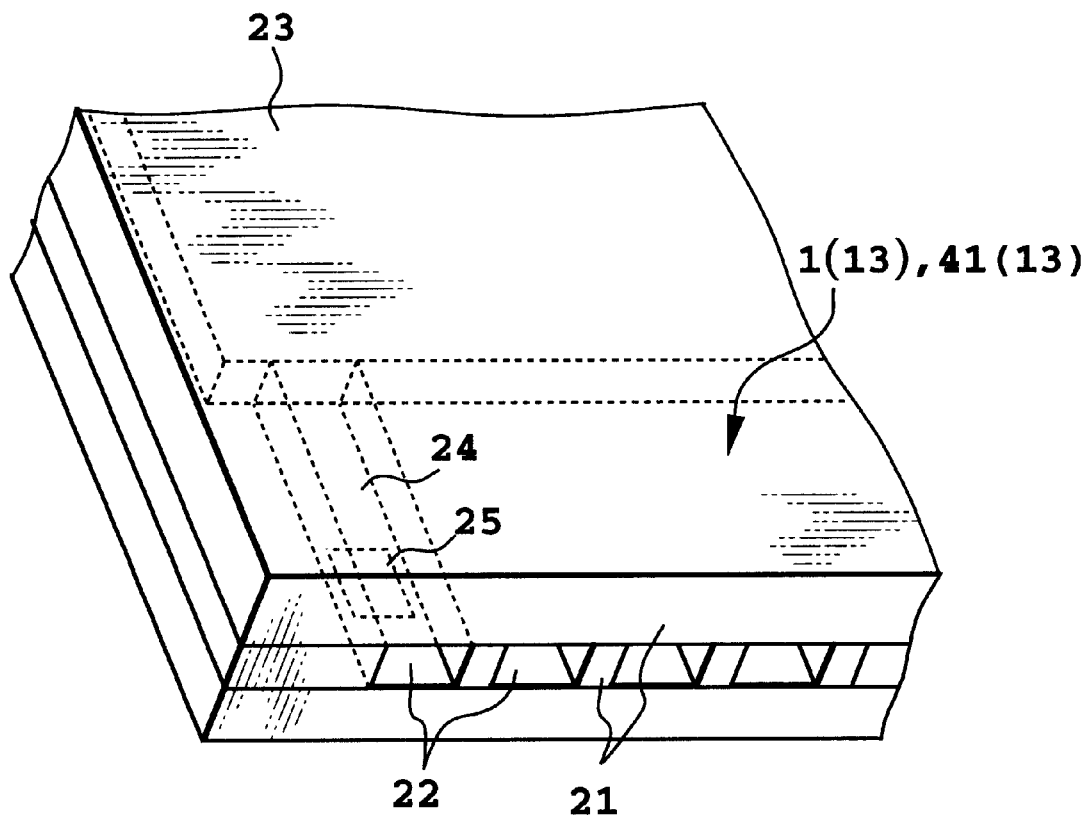
FIG. 3 is a perspective view schematically showing the structure of main parts of a printing head shown in FIG. 1 or FIG. 2.

FIG. 3 is a schematic perspective view partly showing the construction of the main parts of the head cartridge 13 of the head cartridge 1 or 41.

In FIG. 3, in an ejection opening surface 21 facing a printing medium 8 with a predetermined clearance (e.g., about 0.5 to 2.0 mm), a plurality of ejection openings 22 are formed at predetermined pitches. The electro-thermal transducer (a heating resistor or the like) 25 for generating energy to be used for ink ejection is arranged along the wall surface of a liquid passage 24 for communicating a common liquid chamber 23 and the ejection opening 22 with each other. In the present embodiment, the head cartridge 1 or 41 is mounted on the carriage 2 in the positional relationship, in which the ejection openings 22 are aligned in a direction intersecting with the scanning direction of the carriage 2. Thus, the corresponding electro-thermal transducer 25 (hereinafter also referred to as "an ejection heater") is driven (energized) on the basis of an image signal or an ejection signal to cause film boiling in the ink within the liquid passage 24, thereby constituting the printing head 13 for ejecting the ink through the ejection openings 22 under pressure generated during the film boiling.

Figure 4:
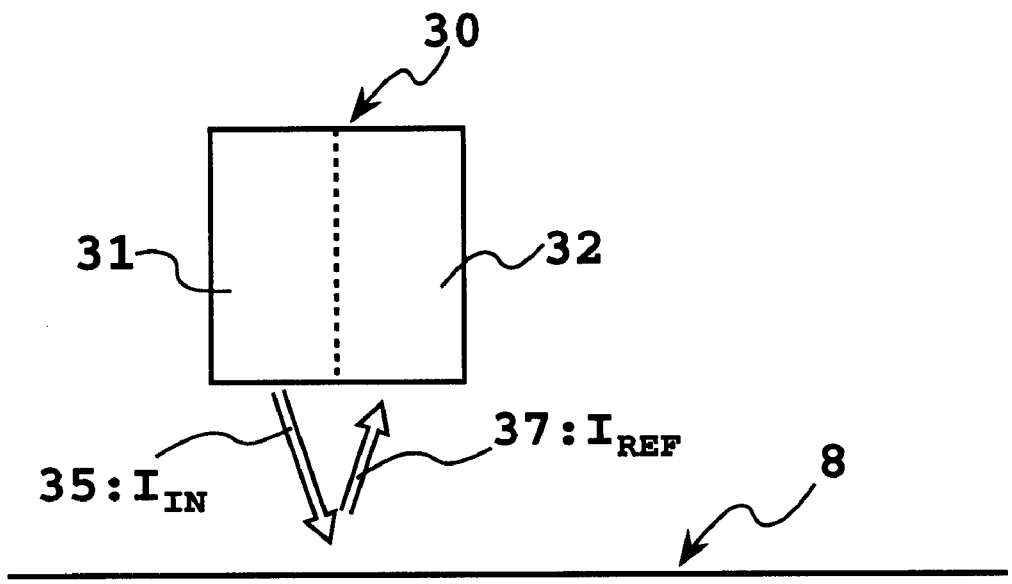
FIG. 4 is a schematic illustration for explaining an optical sensor shown in FIG. 1 or FIG. 2.

FIG. 4 is a schematic view illustrating the reflection type optical sensor 30 shown in FIG. 1 or FIG. 2.

As shown in FIG. 4, the reflection type optical sensor 30 is mounted on the carriage 2, as set forth above. The optical sensor 30 includes a light emitting portion 31 and a photo-sensing portion 32. Light (incident light) Iin 35 emitted from the light emitting portion 31 is reflected on the printing medium 8, and reflected light Iref 37 can be detected by the photo-sensing portion 32. Then, a detection signal is transmitted to a control circuit configured on a circuit board of the printing apparatus via a flexible cable (not shown), and then, is converted into a digital signal by an A/D converter. The location for mounting the optical sensor 30 is described later in Other Embodiment. Since a sensor having relatively low resolution can be used as the optical sensor 30, a cost for the sensor may become low.

Figure 5:
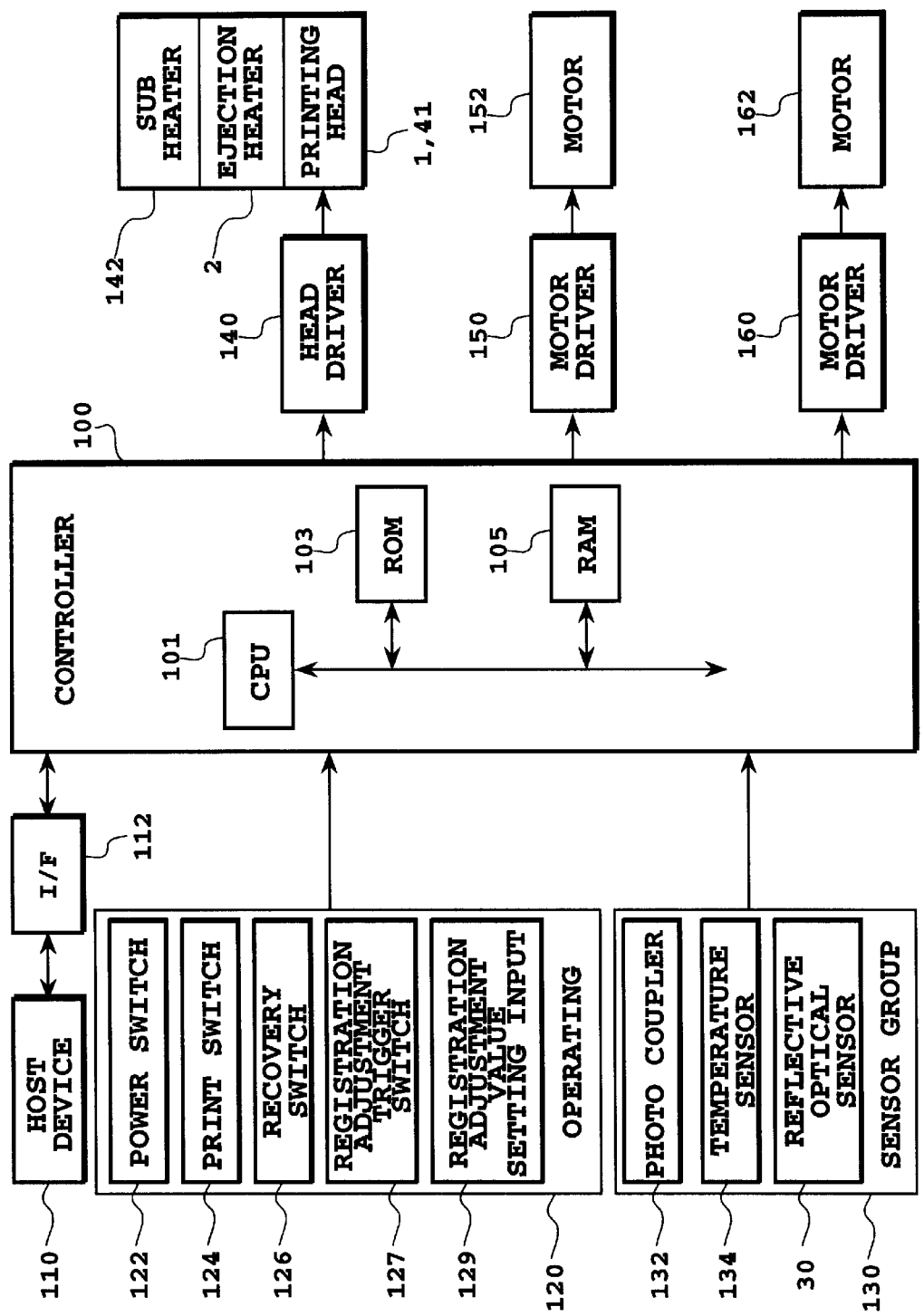
FIG. 5 is a block diagram illustrating a schematic construction of a control circuit of an ink-jet printing apparatus in one preferred embodiment according to the present invention.

FIG. 5 is a block diagram illustrating the schematic construction of the control circuit in the above-described ink-jet printing apparatus.

In FIG. 5, a controller 100 is a main control unit comprising a CPU 101 in the form of, e.g., a micro-computer, a ROM 103 for storing therein programs, required tables and other fixed data, and a RAM 105 having an image data developing area or a working area. A host device 110 is a supply source of image data (it may be a computer for creating and processing image data associated with printing, or a reader for reading image data). Image data, other commands, status signals and the like are sent to and received from the controller 100 via an interface (I/F) 112.

An operating unit 120 consists of switches for receiving command inputs from an operator: a power switch 122, a switch 124 for instructing the start of printing, a recovery switch 126 for instructing the start of suction recovery, a registration starting switch 127 for manual registration, a registration value setting input 129 for manually inputting a registration value, and the like.

A sensor group 130 includes sensors for detecting the status of the apparatus: the above-described reflector type optical sensor 30, a photo coupler 132 for detecting a home position, a temperature sensor 134 disposed at an appropriate position for detecting the ambient temperature, and the like.

A head driver 140 is a driver for driving the ejecting heater 25 of the printing head 1 or 41 according to printing data or the like. The head driver 140 comprises a shift register for aligning the print data corresponding to the position of the ejecting heater 25, a latch circuit for latching at appropriate timings, logic circuit devices for actuating the ejecting heater in synchronism with a driving timing signal, and a timing setter for appropriately setting a driving timing (ejection timing) for dot forming registration.

The printing head 1 or 41 is provided with a sub heater 142. The sub heater 142 performs temperature adjustment for stabilizing ejection characteristics of ink. It may be formed on the printing head substrate together with the ejection heater 25 and/or fixed to the printing head body or the head cartridge.

A motor driver 150 is a driver for driving a main scanning motor 152. A sub scanning motor 162 is a motor for feeding (sub scanning) the printing medium 8. Another motor driver 160 is a driver for the motor 162.

(Print Pattern for Printing Registration)

In the following explanation, a ratio of a region printed by the printing apparatus to a predetermined region on the printing medium will be referred to as "an area factor." For example, when dots are formed at the overall area within the predetermined region on the printing medium, the area factor is 100%; when no dot is formed within the predetermined region, the area factor is 0%; and, when the area where the dots are formed is a half of the predetermined region, the area factor is 50%.

Figure 6A:
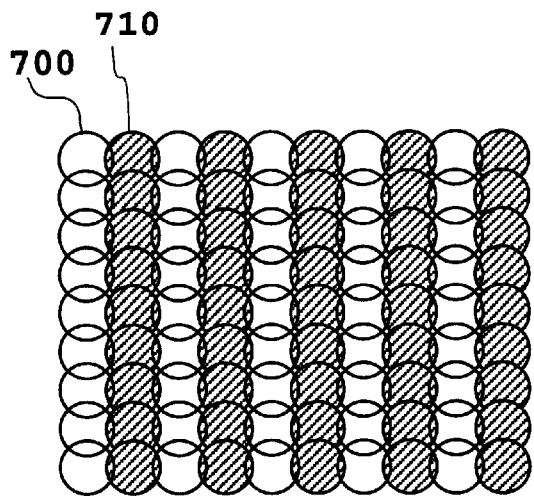
Figure 6B:
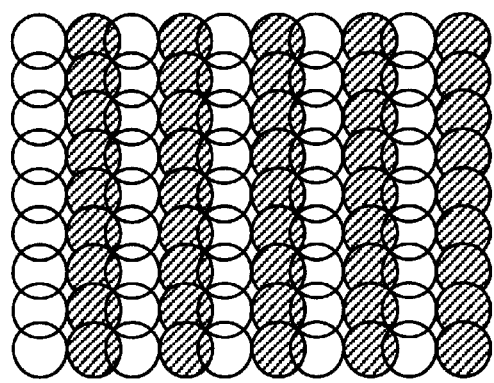
Figure 6C:
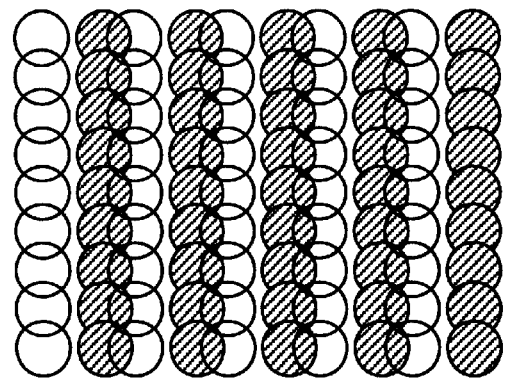

FIGS. 6A to 6C schematically illustrate printing patterns for printing registration to be used in the present embodiment.

In FIGS. 6A to 6C, white dots 700 represent dots formed on the printing medium during the forward scan (first printing) and hatched dots 710 represent dots formed on the printing medium during the reverse scan (second printing). It should be noted that although in FIGS. 6A to 6C the dots are hatched or not for the purpose of illustration, the dots are formed with the ink ejected from the same printing head, irrespective of the color or density of the ink. FIG. 6A shows the dots printed in the state in which printing positions in the forward scan and the reverse scan are well registered; FIG. 6B, the printing positions are registered with a slight offset; and FIG. 6C, the printing positions are registered with a greater offset. As is obvious from the FIGS. 6A to 6C, in the present embodiment, the dots are complementarily formed in the forward and reverse scan. Namely, the dots in the odd number of columns are formed in the forward scan, and the dots in the even number of columns are formed in the reverse scan. Accordingly, FIG. 6A, in which the dots formed in the forward scan and the reverse scan are separated by about the diameter of the dot, shows the well registered state.

The printing pattern is designed to reduce the density of the overall printed portion as the printing position is offset. Namely, within a range of a patch as the printing pattern of FIG. 6A, the area factor is about 100%. As the printing positions are offset as shown in FIGS. 6B and 6C, the overlapping amount of the dot (white dot) of the forward scan and the dot (hatched dot) of the reverse scan becomes greater to enlarge the not-printed region, i.e., a region not formed with the dots, thereby decreasing the area factor so as to reduce the density on average.

In the present embodiment, the printing positions are offset by shifting the timing of printing. It is possible to offset on printing data.

In FIGS. 6A to 6C, although one dot in the scanning direction is taken as a unit, a unit may be appropriately set according to precision of printing registration or precision of printing registration detection.

Figure 7A:
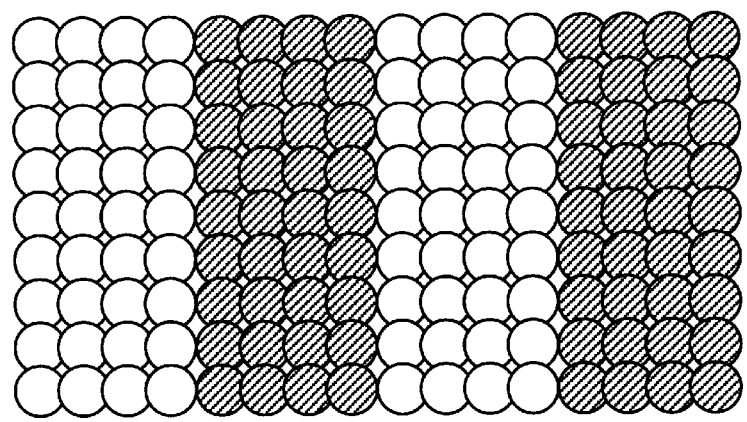
Figure 7B:
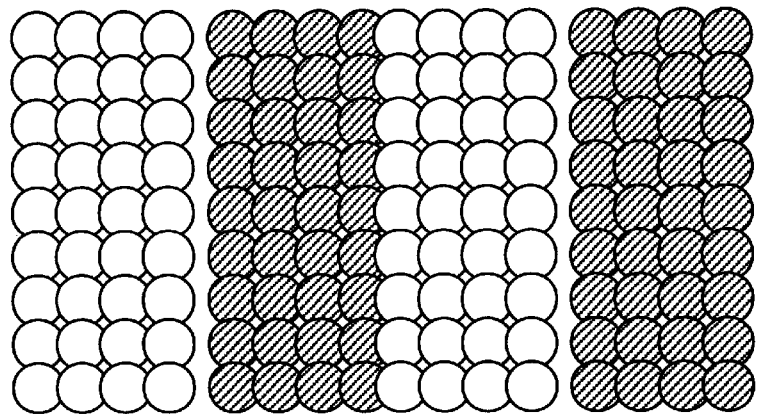
Figure 7C:
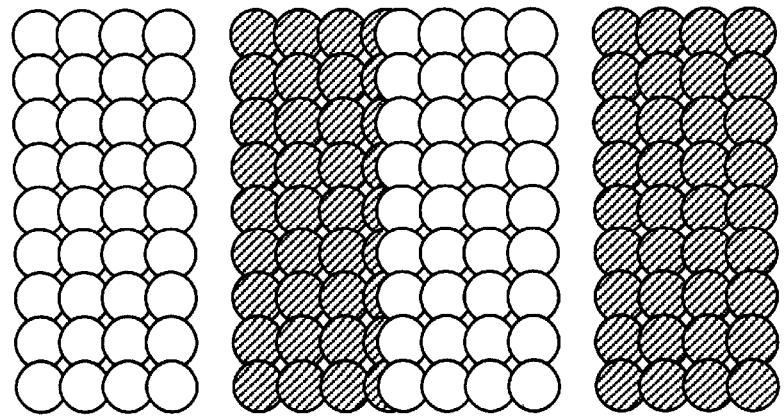

FIGS. 7A to 7C show the case where four dots are taken as a unit. FIG. 7A shows the dots printed in the state in which printing positions in the forward scan and the reverse scan are well registered; FIG. 7B, the printing positions are registered with a slight offset; and FIG. 7C, the printing positions are registered with a greater offset.

What is intended by this pattern is that the area factor is reduced with respect to an increase in mutual offset of the printing positions in the forward scan and the reverse scan. This is because the density of the printed portion is significantly dependent on variations of the area factor. Namely, although the dots are overlapped with each other so as to increase the density, an increase in not-printed region has a greater influence on the average density of the overall printed portion.

Figure 8:
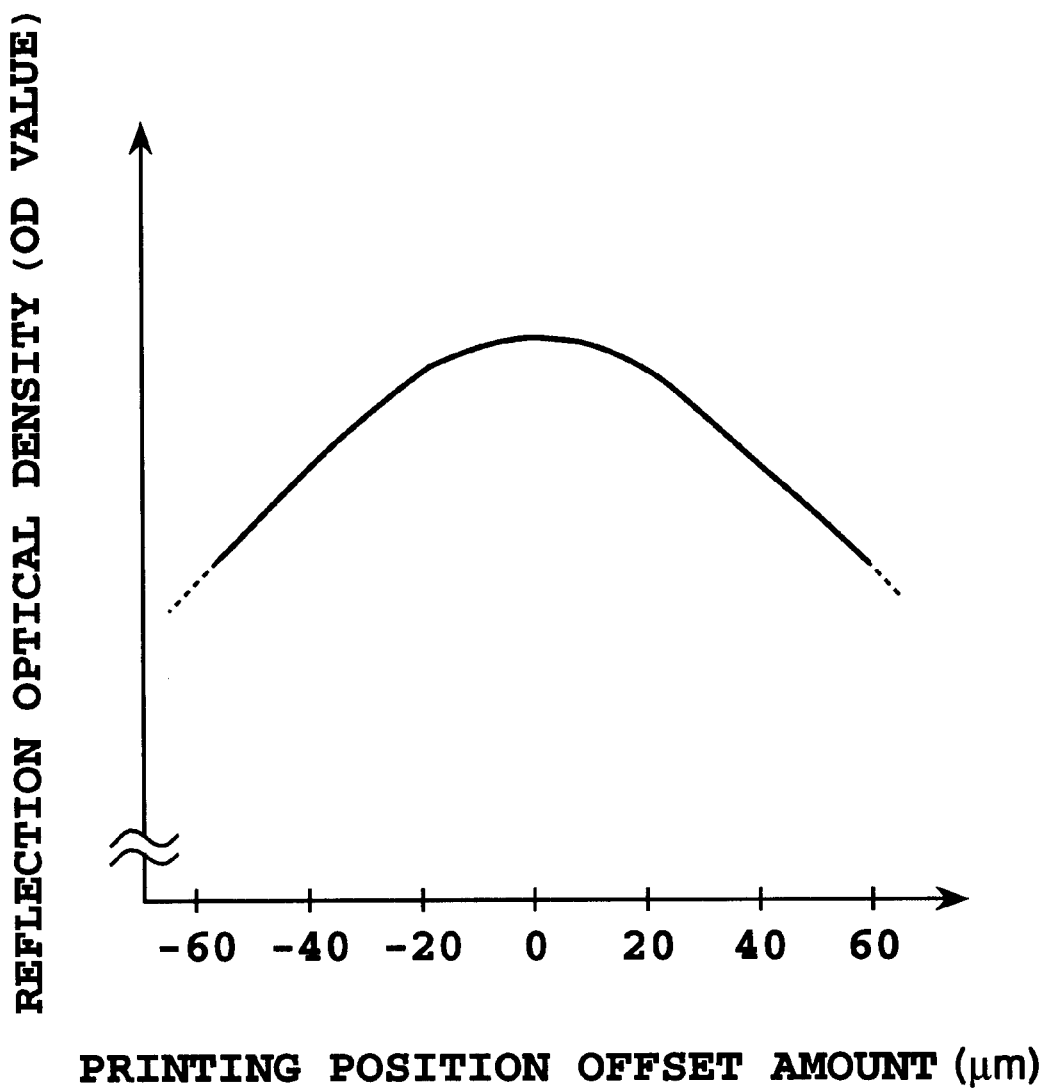
FIG. 8 is a graph illustrating the relationship between a printing position offset amount and a reflection optical density in the printing patterns in the first embodiment according to the present invention.

FIG. 8 is a graph schematically illustrating the relationship between a deviation amount of the print location and a reflection optical density in the printing patterns shown in FIGS. 6A to 6C and 7A to 7C in the present embodiment.

In FIG. 8, the vertical line represents a reflection optical density (OD value); and the horizontal line, a print location deviation(offset) amount ($\mu$m). Using the incident light Iin 35 and the reflection light Iref 37 shown in FIG. 4, a reflection index R=Iref/Iin and a transmission index T=1−R.

Assuming that d represents a reflection optical density, $R=10^{-d}$. When the amount of printing position offset is zero, the area factor becomes 100%, and therefore, the reflection index R becomes minimum, i.e., the reflection optical density d becomes maximum. The reflection optical density d decreases as the printing position offsets relatively to any of the plus and minus directions.

(Printing Registration Processing)

Figure 9:
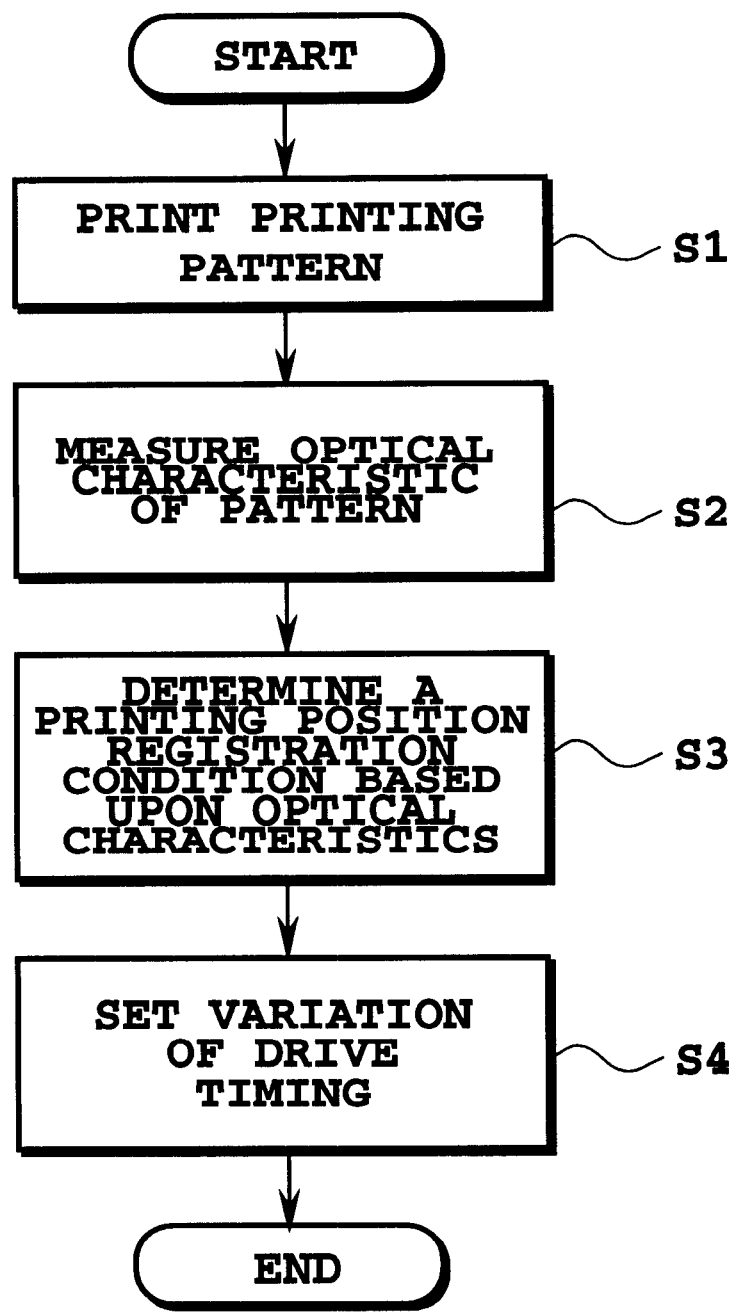
FIG. 9 is a flowchart illustrating schematic processing in the first embodiment according to the present invention.

FIG. 9 is a flowchart of printing registration processing.

Referring to FIG. 9, first of all, the printing patterns are printed (step S1). Next, the optical characteristics of the printing patterns are measured by the optical sensor 30 (step S2). An appropriate printing registration condition is determined based on the optical characteristics obtained from the measured data (step S3). As graphically shown in FIG. 11 (described later), the point of the highest reflection optical density is found, two straight lines respectively extending through both sides of data of the point of the highest reflection optical density are found by the method of least squares, and then, the intersection point P of these lines is found. Like the above approximation using straight lines, approximation using a curved line as shown in FIG. 12 (described later) may be used. Variations of drive timing are set based on the printing position parameter with respect to the point P (step S4).

Figure 10:
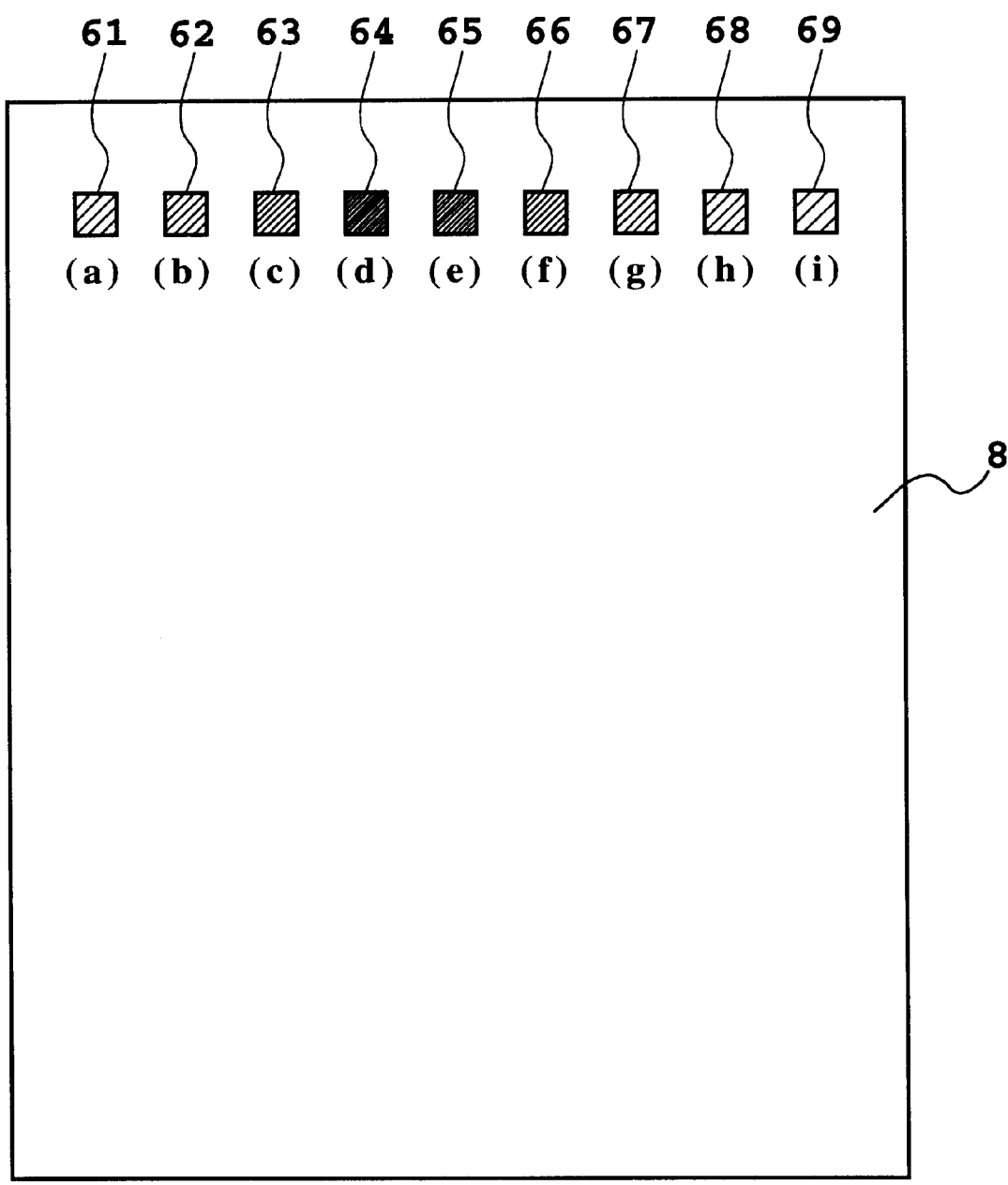
FIG. 10 is a schematic view illustrating the state in which the printing pattern is printed on a printing medium in the first embodiment according to the present invention.

FIG. 10 is an illustration showing the state in which the printing patterns shown in FIGS. 7A to 7C are printed on the printing medium 8. In the present embodiment, nine patterns 61 to 69 different in relative position offset amount between the dots printed in the forward scan and the reverse scan are printed. Each of the printed patterns is also called a patch, for example, a patch 61, a patch 62 and so on. Printing position parameters corresponding to the patches 61 to 69 are designated by (a) to (i). The nine patterns 61 to 69 may be formed by fixing the printing start timing in the forward scan and setting the nine printing start timings in the reverse scan, i.e., a currently set timing, four timings earlier than the currently set timing and four timings later than the currently set timing. Setting of such printing start timings and printing of the nine patterns 61 to 69 on the basis of the printing start timings can be executed by a program triggered by a predetermined command input.

Then, the printing medium 8 and the carriage 2 are moved such that the optical sensor 30 mounted on the carriage 2 may be placed at positions corresponding to the patches 61–69 as the printed patterns thus printed. In the state in which the carriage 2 is stopped, the optical characteristics are measured. In this way, since the optical characteristics are measured in the state in which the carriage 2 is stopped, the influence of noise caused by the driving of the carriage 2 can be avoided. A distance between the sensor 30 and the printing medium 8 is increased to widen a measurement spot of the optical sensor 30 more than the dot diameter, thereby averaging variations in local optical characteristics (for example, the reflection optical density) on the printed pattern so as to achieve highly precise measurement of the reflection optical density of the patch 61, etc.

In order to relatively widen the measurement spot of the optical sensor 30, it is desired that a sensor having a resolution lower than a printing resolution of the pattern, namely, a sensor having a measurement spot diameter greater than the dot diameter be used. Furthermore, from the viewpoint of determination of an average density, it is also possible to scan a plurality of points on the patch by means of a sensor having a relatively high resolution, i.e., a small measurement spot diameter and to take an average of the thus measured densities as the measured density.

In order to avoid any influence of fluctuations in measurement, it may be possible to measure the reflection optical density of the same patch a plurality of times and to take an average value of the measured densities as the measured density.

In order to avoid any influence of fluctuations in measurement due to the density variations on the patch, it may be possible to measure a plurality of points on the patch to average or perform other operations on them. Measurement can be achieved while the carriage 2 is moved for time saving. In this case, in order to avoid any fluctuation in measurement due to electric noise caused by the driving of the motor, it is strongly desired to increase the times of samplings and average or perform other operations.

Figure 11:
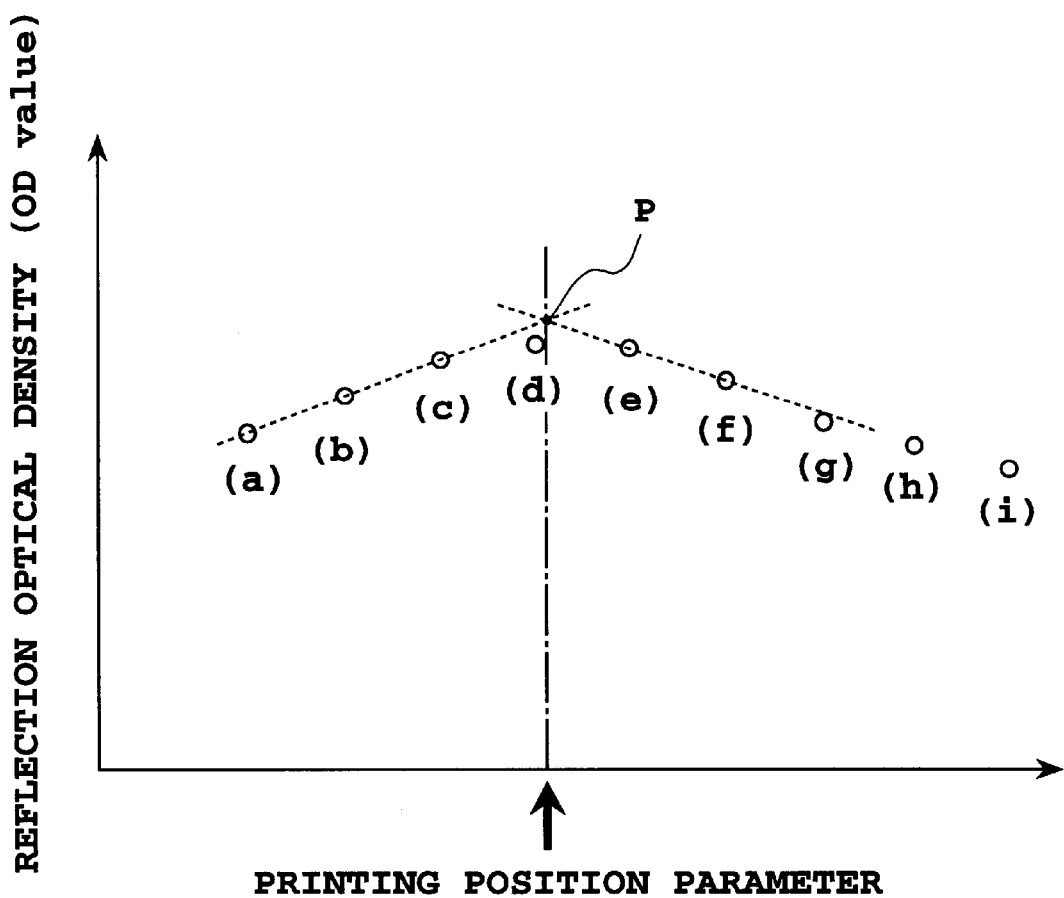
FIG. 11 is a graph illustrating a method for determining a printing registration condition in the first embodiment according to the present invention.
Figure 12:
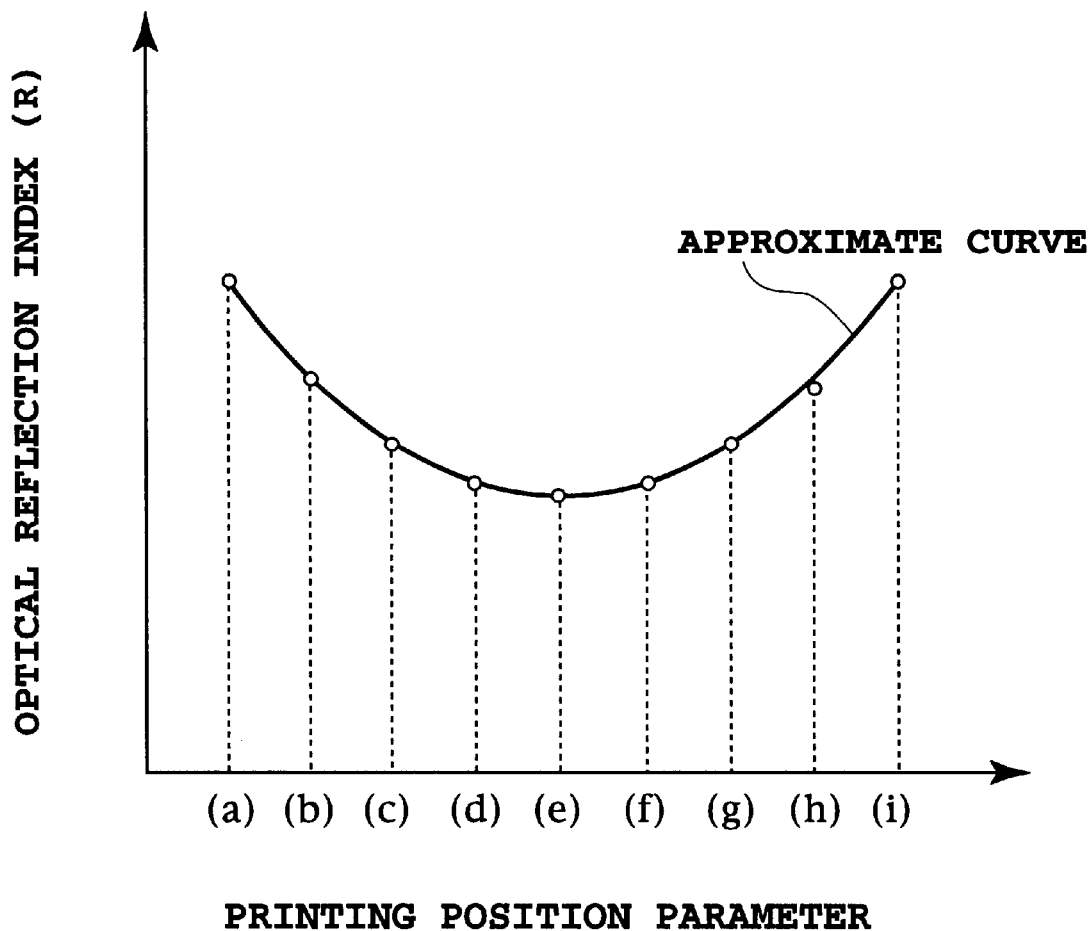
FIG. 12 a graph illustrating the relationship between measured optical reflection indexes and printing position parameters.

FIG. 11 is a graph schematically illustrating an example of data of the measured reflection optical densities.

In FIG. 11, the vertical line represents a reflection optical density; and the horizontal line represents a parameter for varying the relative print locations (positions) in the forward scan and the reverse scan. The parameter is adapted to advance or retard the printing start timing of the reverse scan with respect to the fixed printing start timing of the forward scan.

When measurement results shown in FIG. 11 is obtained in the present embodiment, the intersection point P of the two straight lines respectively extending through two points (the points respectively corresponding to printing position parameters (b), (c) and (e), (f) of FIG. 11) on both sides of the point where the reflection optical density is highest (the point corresponding to a printing position parameter (d) in FIG. 11) is taken as the printing position where the best printing registration is attained. In the present embodiment, the corresponding printing start timing of the reverse scan is set based on the printing position parameter corresponding to this point P. But, when strict printing registration is neither desired nor needed, the printing position parameter (d) may be used.

As graphically shown in FIG. 11, by this method, the printing registration condition can be selected at a pitch smaller or a resolution higher than those of the printing registration condition used for printing the printing pattern 61 etc.

In FIG. 11, the density is not varied significantly irrespective of the variations of the printing condition between the points where the density is high corresponding to printing position parameters (c), (d) and (e). To the contrary, between the points corresponding to printing position parameters (a), (b) and (c) or (f), (g), (h) and (i), the density is varied sensitively relative to the variations of the printing registration condition. When the characteristics of the density close to symmetry as in the present embodiment are exhibited, printing registration can be achieved with higher precision by determining the printing registration condition with the points indicating the variations of the density sensitive to the printing registration condition.

A method according to the present invention for determining the printing registration condition is not limited to the foregoing method. It may be intended that numerical calculation is performed with continuous values on the basis of a plurality of multi-value density data and information of the printing registration condition for use in the pattern printing, and then, the printing registration condition is determined with precision higher than a discrete value of the printing registration condition for use in the pattern printing.

For example, as an example other than linear approximation shown in FIG. 11, a polynomial approximate expression in which the method of least squares with respect to a plurality of printing registration conditions is obtained by using the density data for printing. The condition for attaining the best printing registration may be determined by using the obtained expression. It is possible to use not only the polynomial approximation but also spline interpolation.

Even when a final printing registration condition is selected from the plurality of printing registration conditions used for the pattern printing, printing registration can be established with higher precision with respect to fluctuations of various data by determining the printing registration condition through numerical calculation using the above-described plurality of multi-value data. For example, in a method for selecting the point of the highest density from the data of FIG. 11, it is possible that the density at the point corresponding to the printing position parameter (d) is higher than that of the point corresponding to the printing position parameter (e) due to the fluctuations. Therefore, in a method for obtaining an approximate line from three points on each of both sides of the highest density point to calculate an intersection point, the influence of fluctuation can be reduced by performing calculation using data of more than two points.

Next, another method for determining printing registration condition shown in FIG. 11 is explained.

FIG. 12 shows an example of data of measured optical reflection indexes.

In FIG. 12, the vertical line represents an optical reflection ratio; and the horizontal line, printing position parameters (a) to (i) for varying the relative printing positions in the forward scan and the reverse scan. For example, a printing timing of reverse scan is advanced or retarded to vary a printing position. In the example, a representative point on each patch is determined from the measured data, and the overall approximate curve is obtained from the representative point and a minimum point of the curve is determined as a matched point of the printing position.

Although the square or rectangular patterns (patches) are printed with respect to the plurality of printing registration conditions as shown in FIG. 10 in the present embodiment, the present invention is not limited to the construction. It is sufficient that there is only an area where the density can be measured with respect to the printing registration conditions. For example, all of the plurality of printing patterns (patches 61 etc.) in FIG. 10 may be connected to each other. With such pattern, an area of the printing pattern can be made smaller.

However, in the case where such pattern is printed on the printing medium 8 by the ink-jet printing apparatus, the printing medium 8 is expanded depending upon the kind of printing medium 8 if the ink is ejected to an area in excess of a predetermined quantity, to possibly deteriorate the precision of deposition of the ink droplets ejected from the printing head. The printing pattern used in the present embodiment has the merit of avoiding such phenomenon as much as possible.

In the printing patterns in the present embodiment shown in FIGS. 6A to 6C, a condition where the reflection optical density varies most sensitively relative to the offset of the printing position is that the printing positions in the forward scan and the reverse scan are registered (the condition shown in FIG. 6A), wherein the area factor becomes substantially 100%. Namely, it is desirable that the region where the pattern is printed should be covered substantially completely with the dots.

However, the foregoing condition is not essential for the pattern, the reflection optical density of which becomes smaller as the offset of the printing positions becomes greater. But, it is desired that a distance between the dots respectively printed in the forward scan and the reverse scan in the state in which the printing positions in the forward scan and the reverse scan are registered should range from a distance where the dots are contacted to a distance where the dots overlap over the dot radius. Therefore, according to the offset from the best condition of printing registration, the reflection optical density varies sensitively. As described below, the distance relationship between the dots is established depending upon the dot pitch and the size of the dots to be formed, or the distance relationship is artificially established in pattern printing when the dots to be formed are relatively fine.

The printing patterns in the forward scan and the reverse scan are not necessarily aligned in the vertical direction.

Figure 13A:
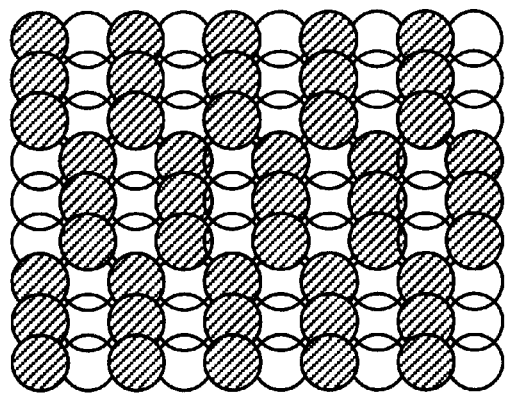
Figure 13B:
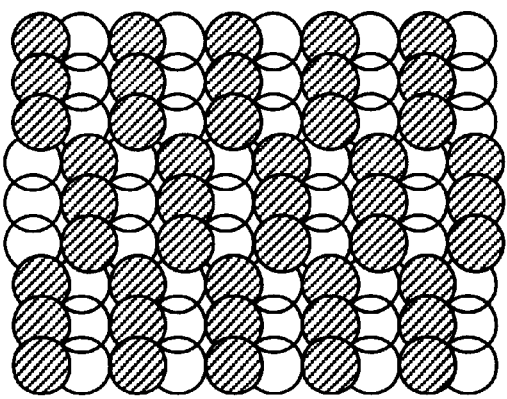
Figure 13C:
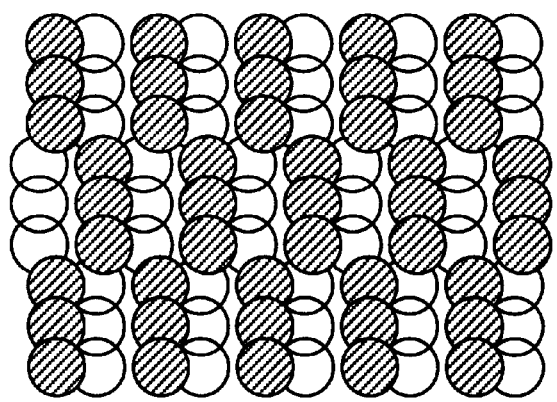

FIGS. 13A to 13C show patterns in which the dots to be printed in the forward scan and the dots to be printed in the reverse scan are intricate mutually. It is possible to apply the present invention to these patterns. FIG. 13A shows the state in which printing positions are well registered; FIG. 13B, the printing positions are registered with a slight offset; and FIG. 13C, the printing positions are registered with a greater offset.

Figure 14A:
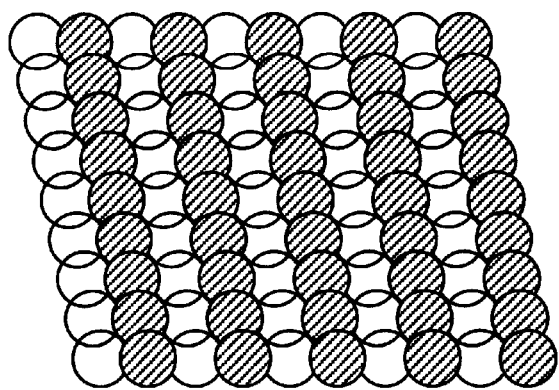
Figure 14B:
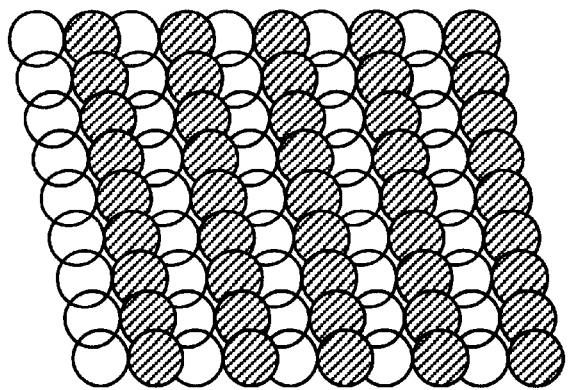
Figure 14C:
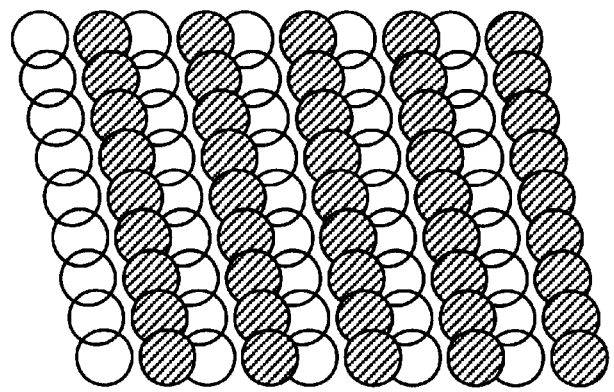

FIGS. 14A to 14C show patterns where dots are formed obliquely. It is possible to apply the present invention to these patterns. FIG. 14A shows the state in which printing positions are well registered; FIG. 14B, the printing positions are registered with a slight offset; and FIG. 14C, the printing positions are registered with a greater offset.

Figure 15A:
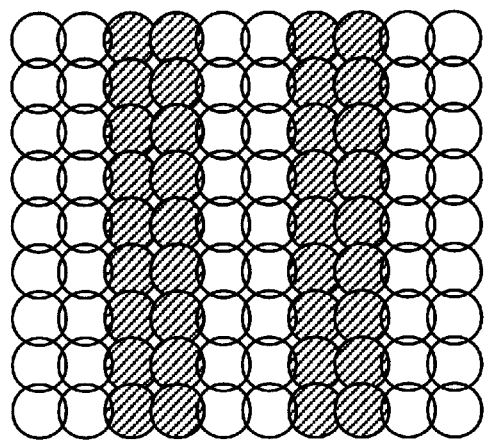
Figure 15B:
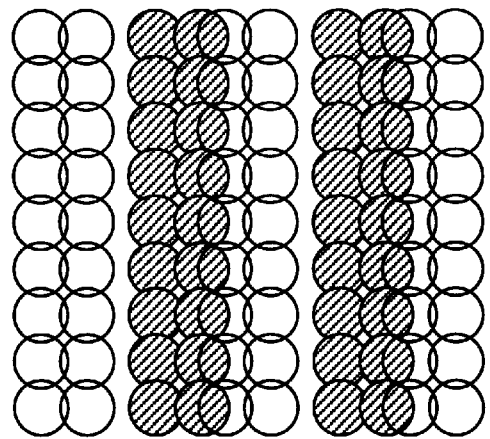
Figure 15C:
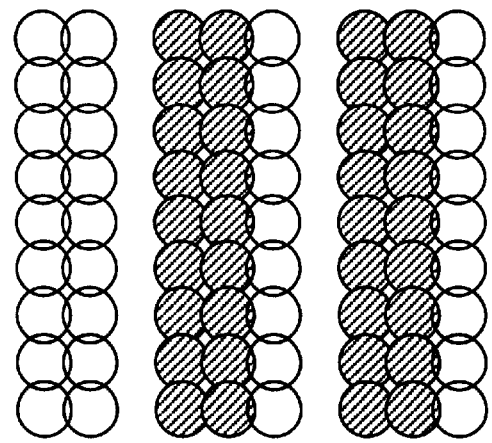

FIGS. 15A to 15C show patterns in which dots are formed at a plurality of columns in forward and reverse scan with respect to printing position offsetting.

FIG. 15A illustrates dots in the case where the printing positions are well registered; FIG. 15B, where the printing positions are registered with a slight offset; and FIG. 15C, where the printing positions are registered with a greater offset. When printing registration is performed by varying the printing registration condition over a greater range such as a printing start timing, the patterns shown in FIGS. 15A to 15C are effective. In the printing patterns shown in FIGS. 6A to 6C, since the set of the dot arrays to be offset is one for each of the forward scan and the reverse scan, the dot array may overlap with the dot array of another set as the offset amount of the printing position is increased. The reflection optical density does not become further smaller even when the offset amount of the printing position becomes greater. In contrast to this, in the case of the patterns shown in FIGS. 15A to 15C, it is possible to enlarge the distance of the offset of the printing position to cause the dot array to overlap with the dot array of another set in comparison with the printing patterns of FIGS. 6A to 6C. By this, the printing registration condition can be varied in greater range.

Figure 16A:
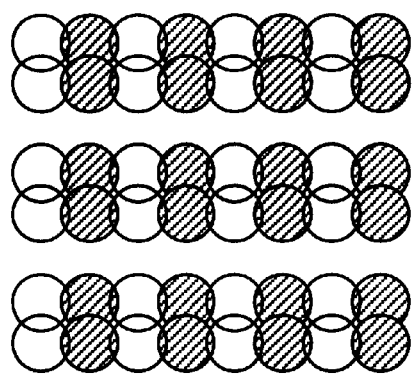
Figure 16B:
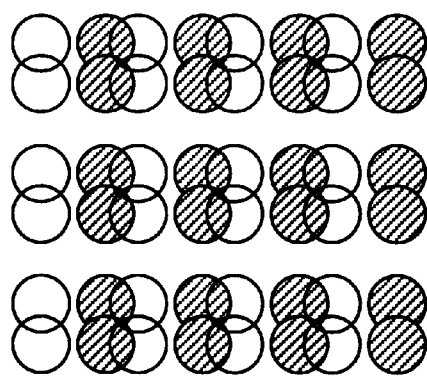
Figure 16C:
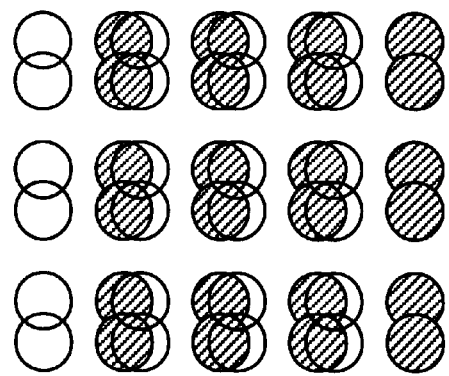

FIGS. 16A to 16C show printing patterns in which dots are thinned on each column.

FIG. 16A illustrates dots in the case where the printing positions are well registered; FIG. 16B, where the printing positions are registered with a slight offset; and FIG. 16C, where the printing positions are registered with a greater offset. It is also possible to apply the present invention to these patterns. This pattern is effective in the case where the density of the dot formed on the printing medium 8 is great, and the density as a whole becomes too great to measure a difference in density according to the offset of the dots by the optical sensor 30 when the patterns shown in FIGS. 6A to 6C are printed. Namely, by reducing the dots as shown in FIGS. 16A to 16C, a not-printed region on the printing medium 8 is increased to lower the density of the overall patch.

Conversely, when the printing density is too low, the dots are formed by performing printing twice at the same position or only at a part.

The characteristics of the printing pattern to reduce the reflection optical density as the offset amount of the printing position is increased require a condition where the dot printed in the forward scan and the dot printed in the reverse scan are matched in contact in the carriage scanning direction. However, it is not necessary to satisfy such condition. In such case, the reflection density may be lowered as the offset amount of the printing positions in the forward scan and the reverse scan is increased.

[Second Embodiment]

A second embodiment according to the present invention concerns a printing position in a carriage scanning direction between different heads. Furthermore, it relates to printing registration in the case where a plurality of kinds of printing mediums, inks, printing heads and so on are used. Namely, the size and density of dots to be formed may be varied depending upon the kind of printing medium or the like to be used. Therefore, in advance of judgment of a printing registration condition, judgment is made as to whether a measured reflection optical density is suitable for the judgment of the printing registration condition. As a result, if it is judged that the measured reflection optical density is not suitable for the judgment of the printing registration condition, the level of the reflection optical density is adjusted by thinning the dots in the printing pattern or overprinting the dots, as described above.

In advance of judgment of the printing registration condition, judgment is made as to whether or not the measured reflection optical density is sufficiently lowered according to the offset amount of the printing position. As a result, if judgment is made that the reflection optical density is inappropriate for performing judgment of the printing registration condition, the dot interval in the varying direction of the offset, in this case, in the carriage scanning direction set in advance in the printing pattern is modified to again print the printing pattern and measure the reflection optical density.

(Printing Registration Processing)

In the present embodiment, concerning the printing pattern explained in the first embodiment, the first one of the two printing heads for the printing registration prints the dots printed in the forward scan, while the second printing head prints the dots printed in the reverse scan, thereby achieving printing registration.

Figure 17:
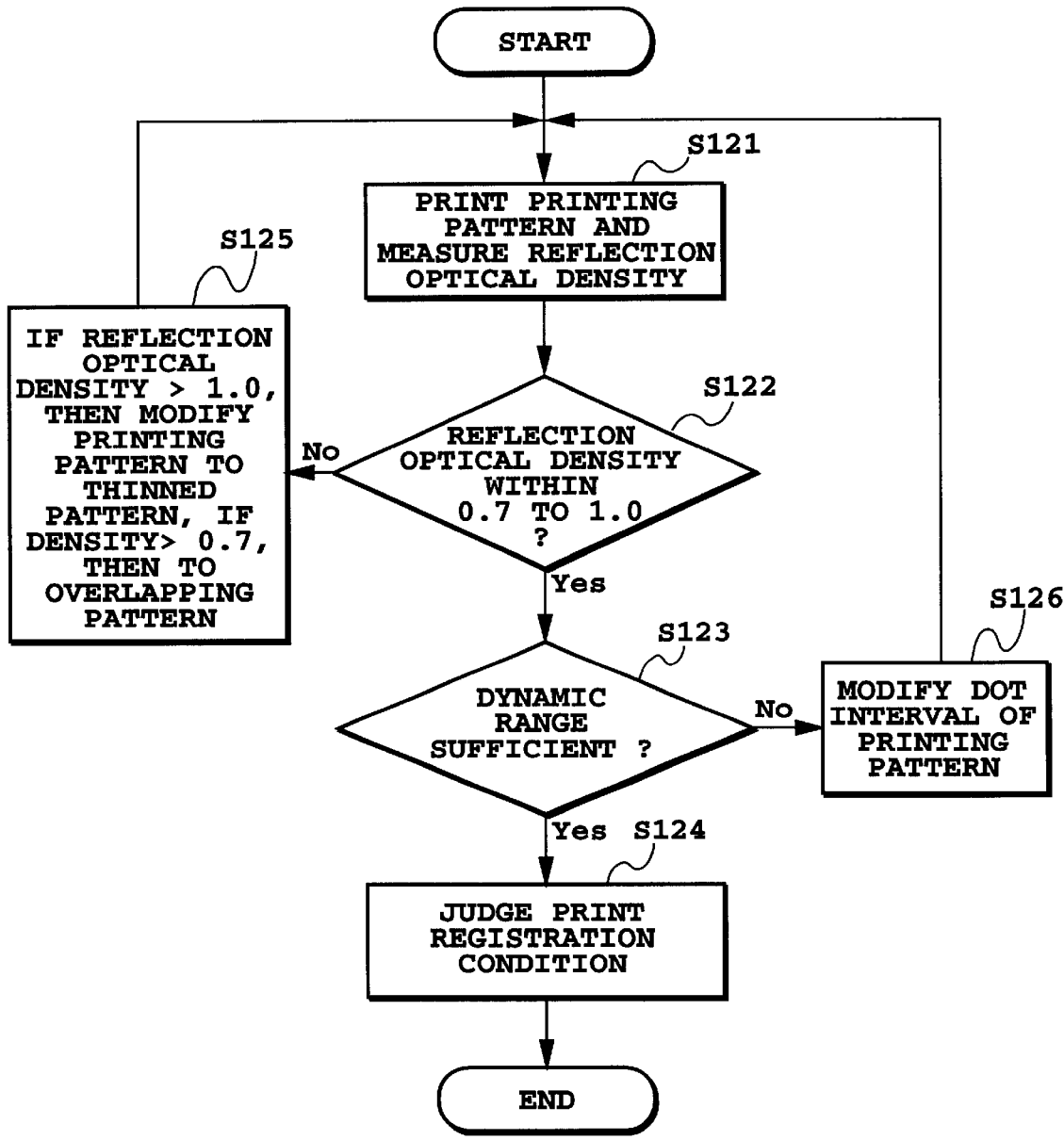
FIG. 17 is a flowchart illustrating printing registration condition judgment processing in a second embodiment according to the present invention.

FIG. 17 is a flowchart illustrating printing registration processing in the second embodiment.

As shown in FIG. 17, at step S121, the nine patterns 61–69 shown in FIG. 10 are printed as the printing patterns. The reflection optical density of the printing pattern is measured in the same manner as in the first embodiment.

Next, at step S122, a decision is made as to whether or not the highest one among the measured reflection optical densities falls within a range of 0.7 to 1.0 of an OD value. If the value falls within the predetermined range, the operation proceeds to a next step S123.

If the result at step S122 is that the reflection optical density does not fall within the range of 0.7 to 1.0, the operation proceeds to step S125. At step S125, the printing pattern is modified to patterns shown in FIGS. 16A to 16C where the dots of the printing pattern are thinned to two thirds when the value is greater than 1.0, and then, the operation is returned to step S121. On the other hand, if the reflection optical density is smaller than 0.7, the printing pattern shown in FIGS. 16A to 16C is overprinted over the printing pattern shown in FIGS. 6A to 6C.

It is also possible to prepare a large number of printing patterns for further modifying the printing pattern so as to repeat the loop from step S121 to step S125 when inappropriateness is judged even in the second judgment. However, in the present embodiment, on the assumption that three kinds of patterns cover almost all cases, the operation proceeds to the next step even when inappropriateness is judged in the second judgment. Even if the printing medium 8, the printing head or the density of the pattern to be printed with ink is varied, printing registration adapting to such variation becomes possible by the judgment processing at step S122.

Next, at step S123, a decision is made as to whether or not the measured reflection optical density is sufficiently lowered with respect to the offset amount of the printing position, namely, whether or not a dynamic range of the value of the reflection optical density is sufficient. For example, in the case where the value of the reflection optical density shown in FIG. 11 is obtained, a decision is made as to whether or not a difference between the maximum density (the point corresponding to the printing position parameter (d) in FIG. 11) and two next values (the difference between points corresponding to printing position parameters (d) and (b), the difference between points corresponding to printing position parameters (d) and (f) in FIG. 11) is greater than or equal to 0.02. If the difference is smaller than 0.02, judgment is made that the interval of the printing dots of the overall printing pattern is too short, namely, that the dynamic range is not sufficient. Then, the distance between the printing dots is enlarged at step S126, and the processing from step S121 onward is performed.

The processing at steps S123 and S124 will be explained in greater detail with reference to FIGS. 18A to 18C, FIGS. 19A to 19C and FIG. 20.

Figure 18A:
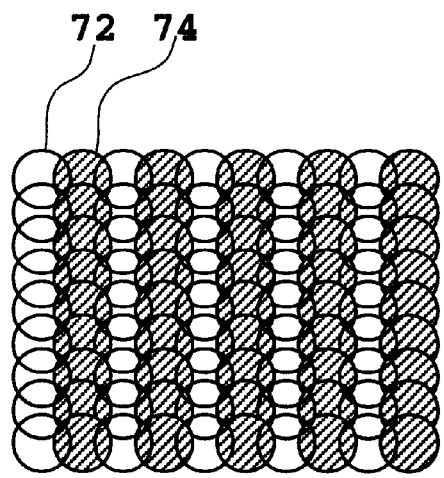
Figure 18B:
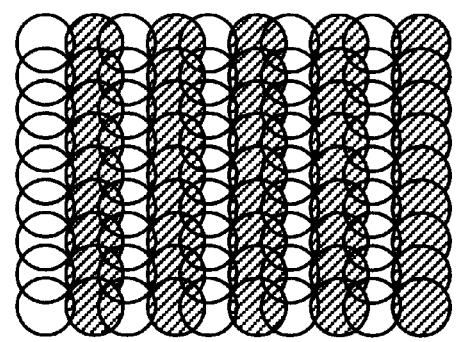
Figure 18C:
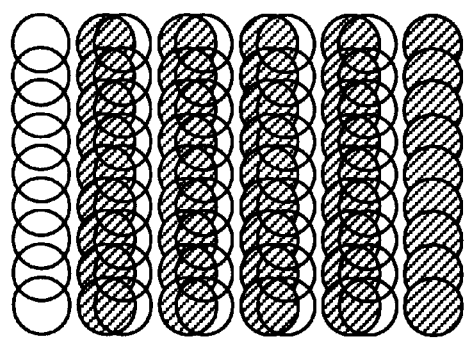

FIGS. 18A to 18C schematically illustrate the printed portion in the case where the printing dot diameter of the printing pattern shown in FIGS. 6A to 6C is large.

In FIGS. 18A to 18C, white dots 72 represent dots printed by the first printing head, and hatched dots 74 represent dots printed by the second printing head. FIG. 18A illustrates dots in the case where the printing positions are well registered; FIG. 18B, where the printing positions are registered with a slight offset; and FIG. 18C, where the printing positions are registered with a greater offset. As is obvious from comparison of FIGS. 18A and 18B, when the dot diameter is large, the area factor is maintained at substantially 100% even if the printing positions of the white dots and the hatched dots are slightly offset, and thus, the reflection optical density is hardly varied. Namely, the condition where the reflection optical density is sensitively decreased according to variation of the offset amount of the printing position, as described in the first embodiment, is not satisfied.

Figure 19A:
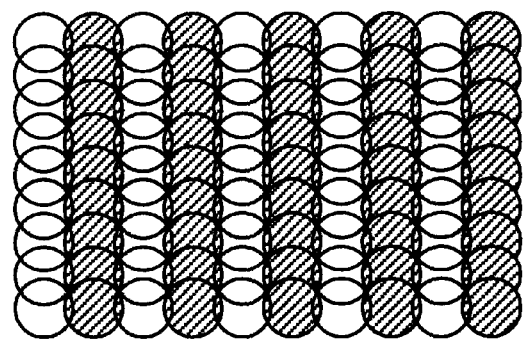
Figure 19B:
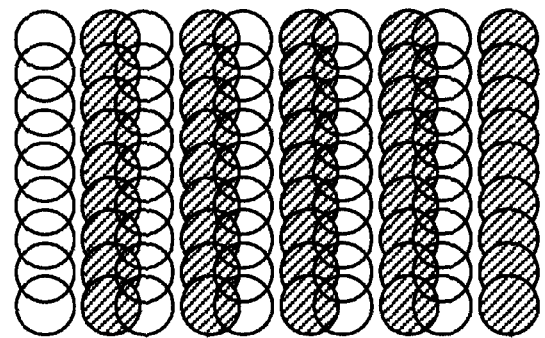
Figure 19C:
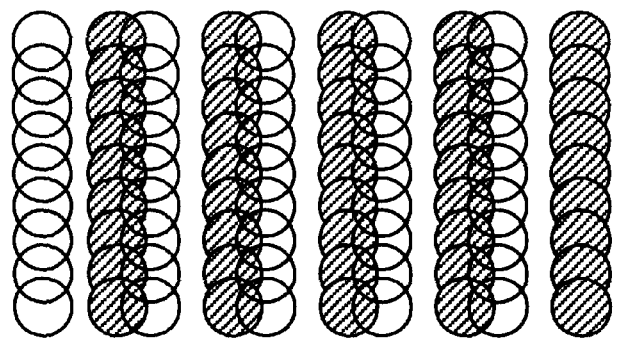

On the other hand, FIGS. 19A to 19C show the case where the respective distances between the respective dots in the carriage scanning direction in the overall printing pattern is gradually enlarged without changing the dot diameter. FIG. 19A illustrates dots in the case where the printing positions are well registered; FIG. 19B, where the printing is performed in a condition that a slight print position offset occurs; and FIG. 19C, where the printing is performed in a condition that a greater print position offset occurs. In the third case, the area factor is reduced according to occurrence of the deviation of the print location of respective dots to lower the entire reflection optical density. Also, it is understood that the dots are arranged with the greater distance, the more sensitive the reflection optical density varies to the print location deviation.

Figure 20:
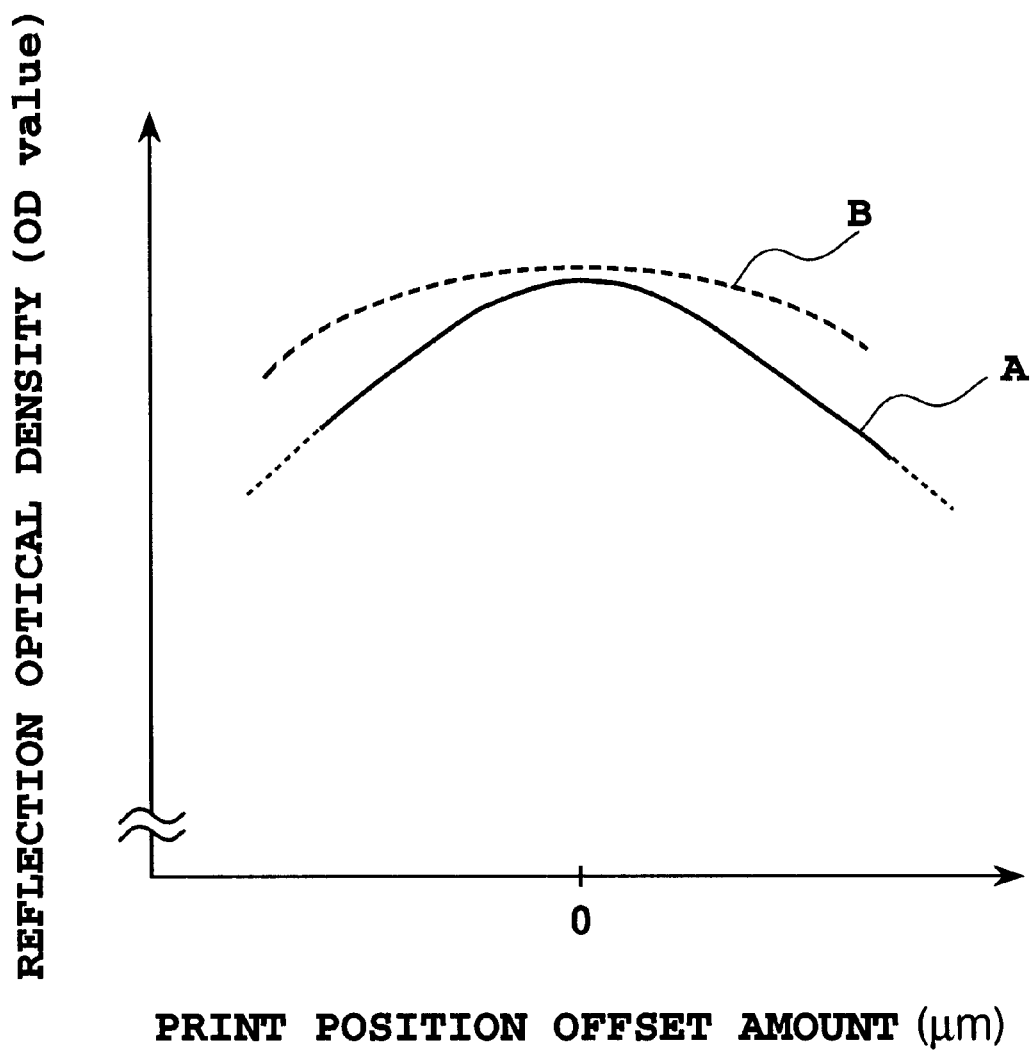
FIG. 20 is a graph illustrating the relationship between a printing position offset amount and a reflection optical density according to the distance between the dots of the printing pattern in the second embodiment according to the present invention.

FIG. 20 is a graph schematically illustrating the behavior of the density characteristics in the case where the printing patterns shown in FIGS. 18A to 18C and 19A to 19C are used.

In FIG. 20, the vertical line represents an optical reflection density; and the horizontal line, an offset amount of the printing position. A solid line A indicates variations of the value of the reflection optical density in the case where the printing is performed under a condition where the reflection optical density is sensitively lowered according to the variation of the offset amount of the printing position as set forth in the first embodiment, and a broken line B indicates variations of the value of the reflection optical density in the case where the dot interval is smaller than the former case. As can be clear from FIG. 20, when the dot interval is too small, the reflection optical density cannot be varied too much for the above-described reason even if the printing registration condition is deviated from the ideal condition. Therefore, in the present embodiment, the decision at step S123 of FIG. 17 is made to enlarge the distance between the dots based on the result of the decision, thereby establishing the printing condition suitable for performing judgment of the printing registration condition.

In the present embodiment, the initial dot distance (interval) is set short. Then, the dot interval is gradually enlarged until the proper dynamic range of the reflection optical density can be attained. However, if the proper dynamic range of the reflection optical density is not obtained even after the dot interval is enlarged four times, the operation proceeds to the next step for making judgment of the printing registration condition. In the present embodiment, the dot interval is adjusted by varying the driving frequency of the printing head while maintaining the scanning speed of the carriage 2. Consequently, the distance between the dots becomes longer as the driving frequency of the printing head becomes lower. In another method for adjusting the distance between the dots, the scanning speed of the carriage 2 may be varied.

In any case, the driving frequency or scanning speed for printing the printing pattern is different from that to be used in actual printing operation. Therefore, after the printing registration condition is judged, the difference in driving frequency or scanning speed must be corrected accordingly. This correction may be performed arithmetically. Alternatively, it is possible to preliminarily prepare data of printing timings relating to the actual driving frequency or scanning speed for each of the nine patterns 61–69 shown in FIG. 10 so as to use the data based on the result of the printing registration condition. Otherwise, in the case shown in FIG. 11, the printing timing to be used for printing can be obtained by linear interpolation.

A method of judgment of the printing registration condition is similar to that of the first embodiment. In printing registration in the forward scan and the reverse scan in bi-directional printing in the first embodiment, varying the distance between the dots of the printing pattern with respect to the dot diameter as performed in the present embodiment is effective similarly to the present embodiment. In this case, the printing patterns for the forward scan and the reverse scan are prepared for respective printing patterns of several kinds of distances between the dots to be used. Then, data of the printing timings are prepared for the respective printing patterns and the distances between the dots, thus determining the printing timing to be used in printing by performing linear interpolation based on the result of the judgment of the printing position.

It should be noted that the flowchart of FIG. 17 also is applicable to the following embodiments which are appropriately modified.

[Third Embodiment]

A third embodiment of the present invention concerns printing registration between a plurality of heads in a direction perpendicular to a carriage scanning direction. It should be noted that explanation will be given of a printing apparatus using only one kind of printing medium, printing head and ink.

(Method for Correcting Printing Position)

In the printing apparatus in the present embodiment, in order to perform correction of a printing position in the direction perpendicular to the carriage scanning direction (auxiliary scanning direction), ink ejecting openings of the printing head are provided over a range wider than a width (band width) in the auxiliary scanning direction of an image formed by one scan so as to permit correction of the printing position at each interval between the ejection openings by shifting the range of the ejection openings to be used. Namely, as a result of shifted correspondence between the data (image data or the like) to be output and the ink ejection openings, it becomes possible to shift the output data per se.

(Printing Pattern)

In the foregoing first and second embodiments, the printing pattern, in which the measured reflection optical density becomes maximum when the printing position is registered, is used. However, in the present embodiment, the reflection optical density becomes minimum when the printing positions are registered. With an increasing offset amount of the printing positions, the reflection optical density in the pattern is increased.

Even in the case of printing registration in a paper feeding direction as in the present embodiment, similarly to the foregoing first and second embodiments, it is possible to use a pattern, in which the density becomes maximum under the condition where the printing positions are registered and is decreased with an increasing offset amount of the printing positions. For example, it becomes possible to perform printing registration while paying attention to dots formed by ejection openings in the adjacent positional relationship in the paper feeding direction between two heads, for example.

Figure 21A:
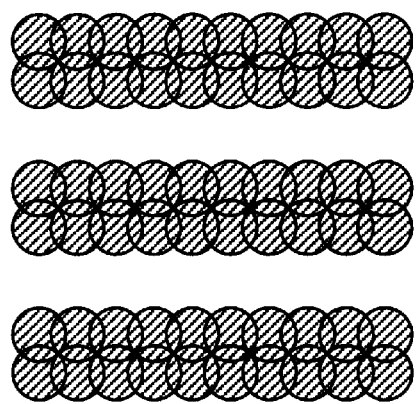
Figure 21B:
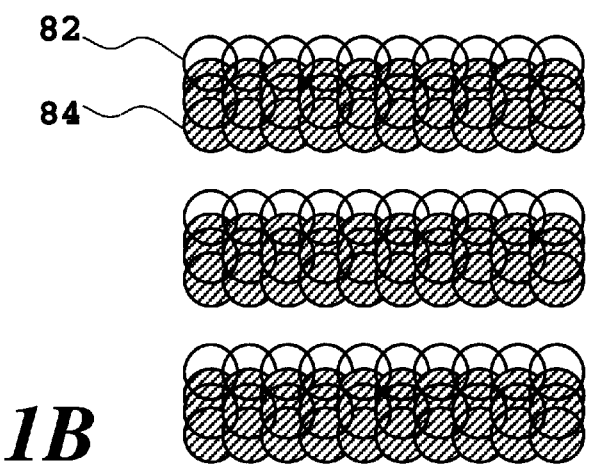
Figure 21C:
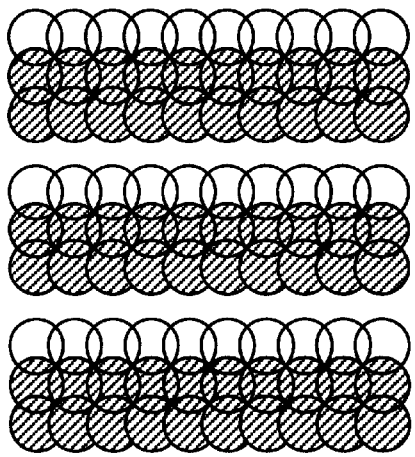

FIGS. 21A to 21C schematically show the printing pattern to be used in the present embodiment.

In FIGS. 21A to 21C, a white dot 82 represents a dot printed by a first printing head, and a hatched dot 84 represents a dot printed by a second printing head, respectively. FIG. 21A illustrates dots in the case where the printing positions are registered, wherein since the above-described two kinds of dots are overlapped, the white dot is not visually perceived; FIG. 21B, where the printing positions are slightly offset; and FIG. 21C, where the printing positions are further offset. As can be seen from FIGS. 21A to 21C, with an increasing offset amount of the printing positions, the area factor is increased to increase an average reflection optical density as a whole.

(Printing Registration Processing)

By offsetting the ejection openings of one of the two printing heads concerned in printing registration, five printing patterns are printed while varying printing registration condition with respect to offsetting. Then, the reflection optical density of the printed patch is measured.

Figure 22:
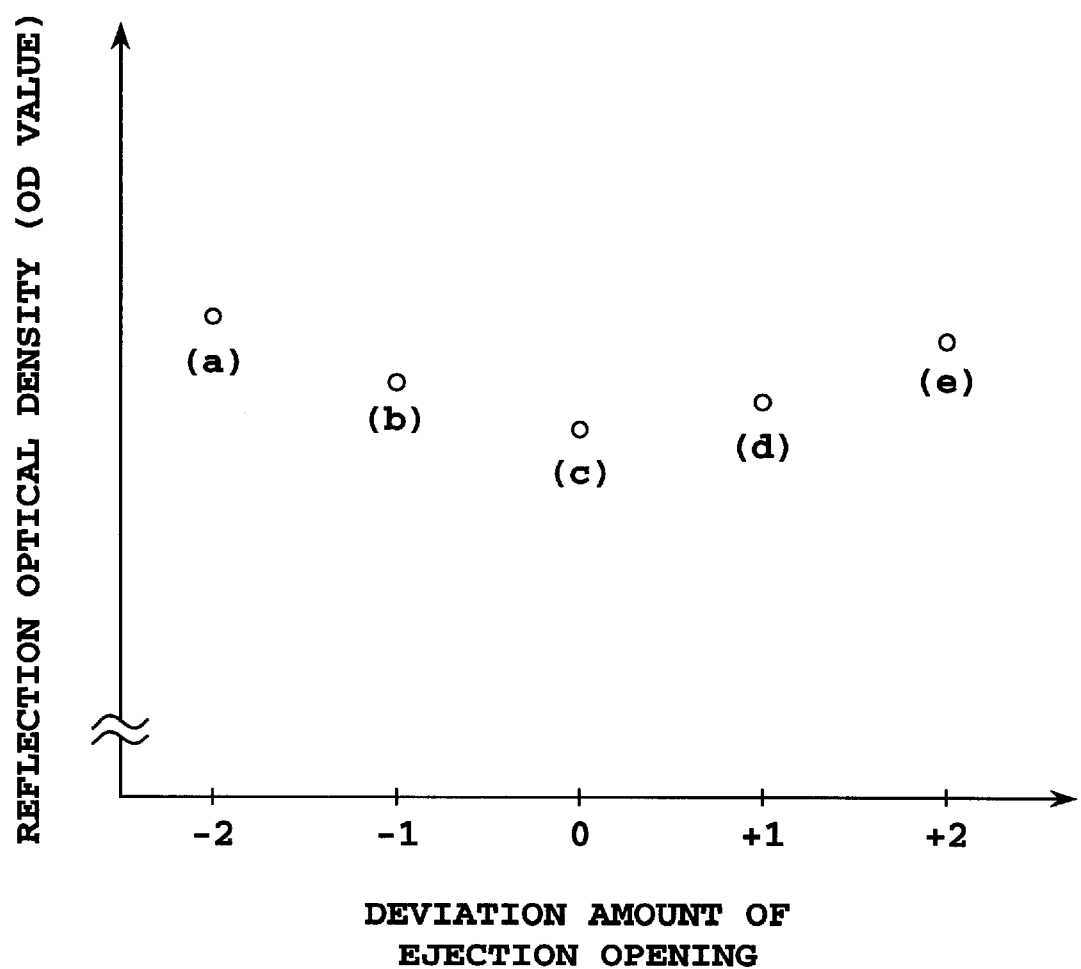
FIG. 22 is a graph illustrating the relationship between a printing ejection opening offset amount and a reflection optical density in the third embodiment according to the present invention.

FIG. 22 graphically shows an example of the measured reflection optical density.

In FIG. 22, the vertical line represents a reflection optical density; and the horizontal line, a deviation amount of the printing ejection openings.

Among the measured reflection optical densities in the present embodiment, the printing condition where the reflection optical density becomes the minimum ((c) in FIG. 22) is selected as the condition where the best printing registration is established.

Although in each of the foregoing embodiments, the printing apparatus in which the image is formed by ejecting the ink from the printing head on the printing medium 8 has been illustrated, the present invention is not limited to such construction. The present invention is effectively applicable to any printing apparatus in which the relative movement between the printing head and the printing medium 8 allows formation of the dots and then printing.

The various printing patterns shown in the first embodiment are not specified for printing registration in bi-directional printing, and can be applicable to printing registration in the longitudinal and transverse directions between the printing heads shown in the second and third embodiments.

Although the second and third embodiments show examples concerning the relationship between the two printing heads, they may be equally applicable to the relationship among three or more printing heads. For example, with respect to three heads, printing registration is established between the first head and the second head, and then, printing registration is established between the first head and the third head.

[Fourth Embodiment]

(Optimum Ejection Duty Judgment Pattern)

In printing registration of the forward scan and the reverse scan, if the user uses oozy ink or printing medium, the area factor in the patch cannot be changed too much due to oozing even if the relative printing registration condition is varied for the forward scan and the reverse scan in a region where dots printed in the first printing in the forward scan and dots printed in the second printing in the reverse scan are located adjacent to each other in the pattern for printing registration. Accordingly, it is difficult to precisely establish printing registration, possibly causing erroneous judgment. For example, when printing is performed with oozy ink or on an oozy printing medium, dots formed in the forward scan and the reverse scan may be mixed due to oozing even when the printing positions in the forward scan and the reverse scan are changed, thus reducing a change in density. This makes it difficult to select the optimum printing positions. Concerning printing registration between a plurality of heads or printing registration in a direction perpendicular to the carriage scanning direction, different kinds of inks are basically used. Depending upon composition of the ink or the like, there are some combinations to easily cause oozing between the inks, with which printing is performed on the printing medium.

FIGS. 23A to 23D schematically illustrate printing patterns for judgment of an optimum ejection duty to be used in the present embodiment.

Figure 23A:
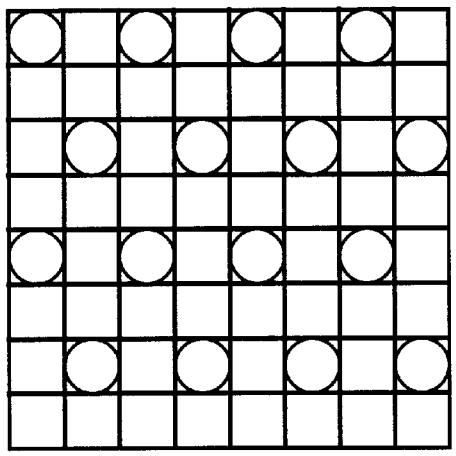
FIGS. 23A to 23D schematically illustrate printing patterns for determining an optimum ejection duty to be used in a forth embodiment according to the present invention, with area factors of 25%, 50%, 75% and 100%, respectively.
Figure 23B:
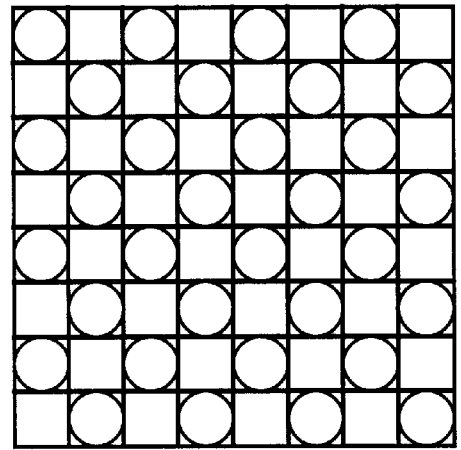
Figure 23C:
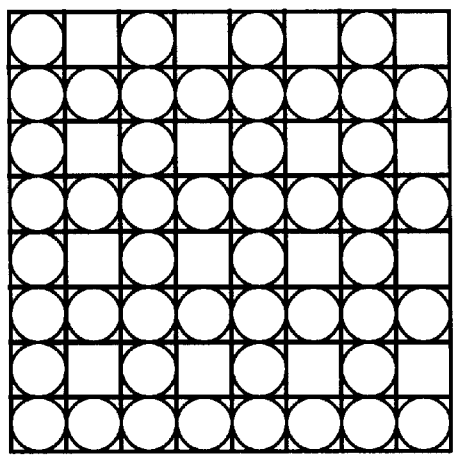
Figure 23D:
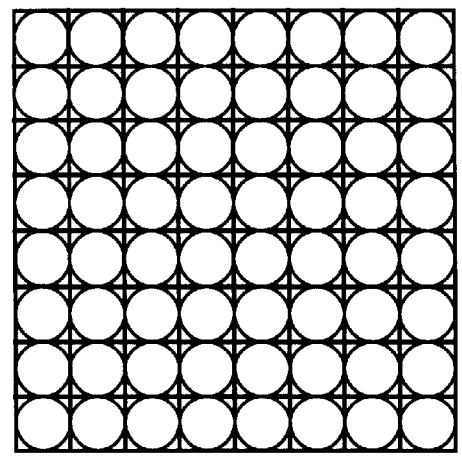

FIGS. 23A to 23D show results of printing with the area factor at intervals of 25% from 25% to 100%. FIG. 23A shows the printing result with an area factor of 25%; FIG. 23B, 50%; FIG. 23C, 75%; and FIG. 23D, 100%. The dots in the respective patterns may be thinned either uniformly or randomly.

Figure 24:
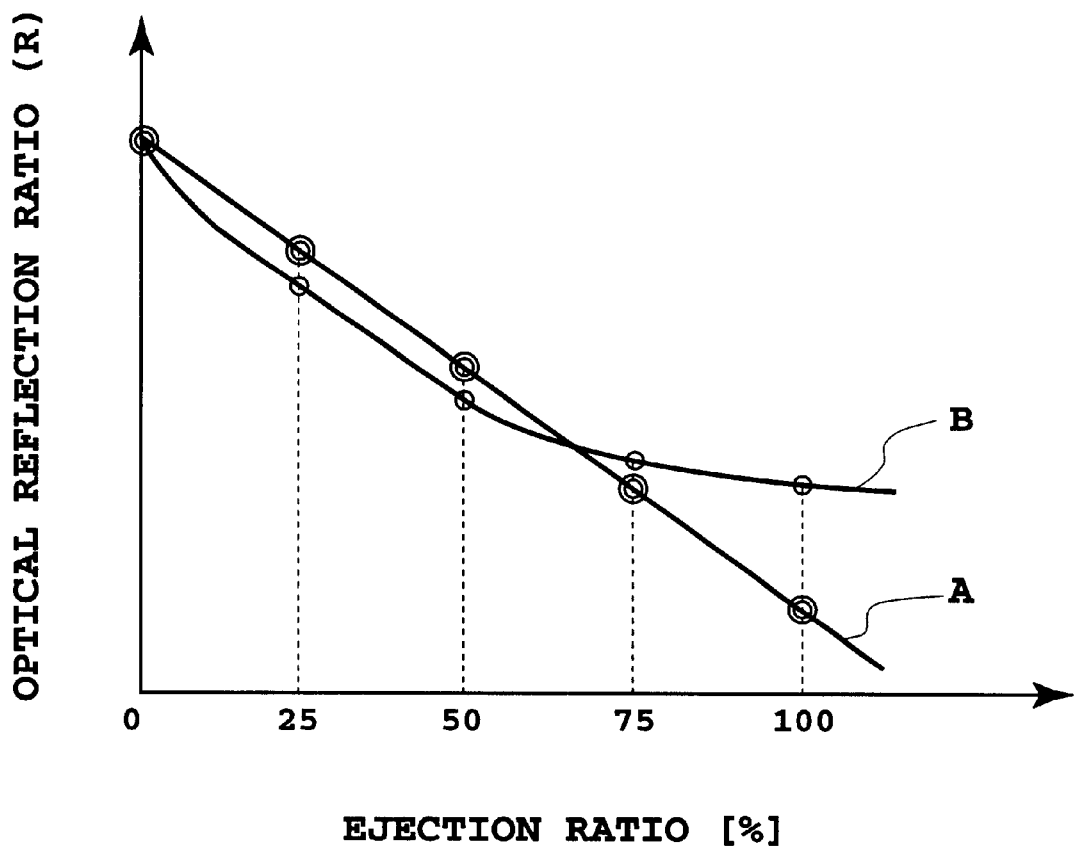
FIG. 24 is a graph illustrating the relationship between an ejection duty and an optical reflection factor in the forth embodiment according to the present invention.

FIG. 24 shows the result of measurement of the optical reflection index of the pattern. In the present embodiment, the patterns are formed with the same ink by the same printing head.

In FIG. 24, the vertical line represents an optical reflection index; and the horizontal line, an ink ejection duty. Depending upon the relationship between the printing medium 8 and the ink to be used, when variation of the optical reflection index shows linear relationship with the ink ejection duty, the pattern for printing registration is printed at an ejection duty of 100% as shown by a curve A. As shown by a curve B, it is possible that the optical reflection index enters into a saturation region at a certain ink ejection duty. In this case, the pattern for printing registration must be printed at the ink ejection duty not entering into the saturation region. By this, an optimum ink ejection duty depending upon the ink and printing medium to be used can be judged to print the printing registration pattern at the optimum ink ejection duty. Thus, printing registration can be well established.

It can be understood that it is preferable to use the region where the ejection duty is about 50%.

(Reflecting Ink Ejection Duty on Printing Registration Pattern)

Figure 25A:
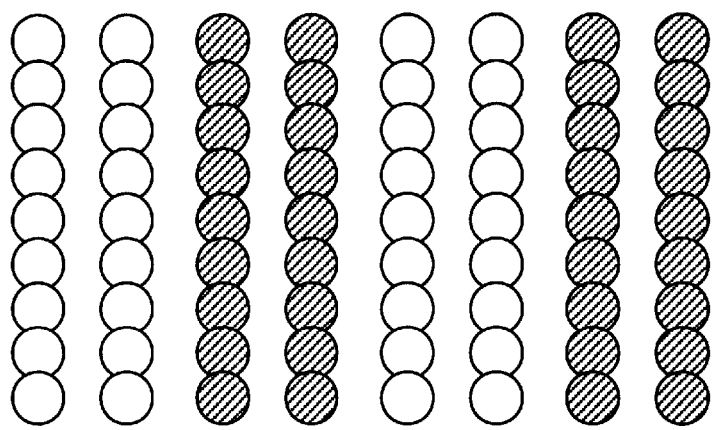
Figure 25B:
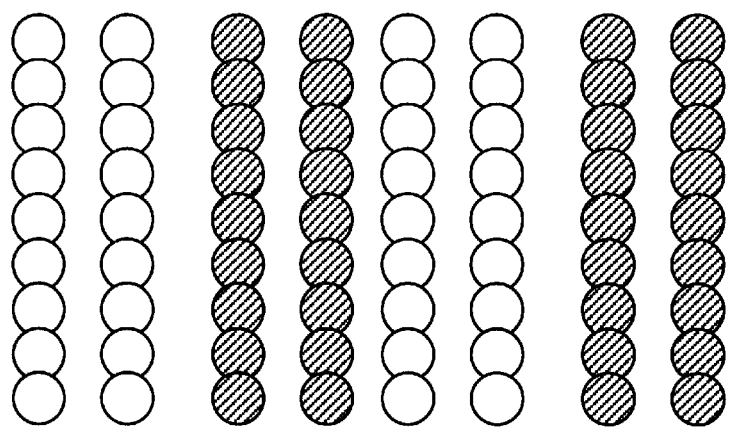
Figure 25C:
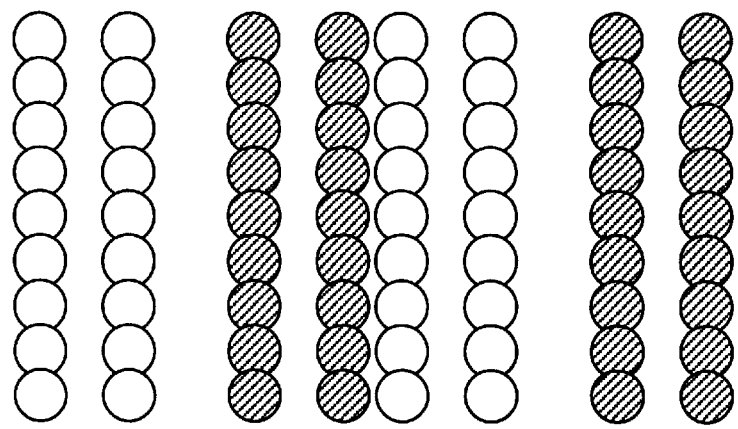

FIGS. 25A to 25C schematically illustrate patterns at an ejection duty of 50%, in which dots in the printing registration reference pattern are thinned into half in the scanning direction.

FIG. 25A illustrates dots in the case where the printing positions are well registered; FIG. 25B, where the printing positions are registered with a slight offset; and FIG. 25C, where the printing positions are registered with a greater offset. The dots are uniformly thinned in the carriage scanning direction of the printing pattern in bi-directional printing registration. The thinning rate may be determined on the basis of the result of judgment of the optimum ink ejection rate so that the printing registration pattern prepared previously is printed at the thinning rate suitable for the printing medium and the ink.

(Example of Simultaneously Performing Ejection Duty Determination and Printing Registration)

It is possible to simultaneously perform judgment of the optimum ink ejection duty and printing registration.

Figure 26A:
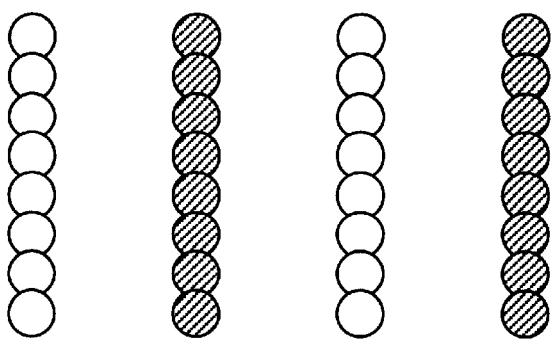
FIGS. 26A to 26D schematically illustrate patterns for performing optimum ejection duty determination and printing registration at the same time in the forth embodiment according to the present invention, at area factors of 25%, 50%, 75% and 100%, respectively.
Figure 26B:
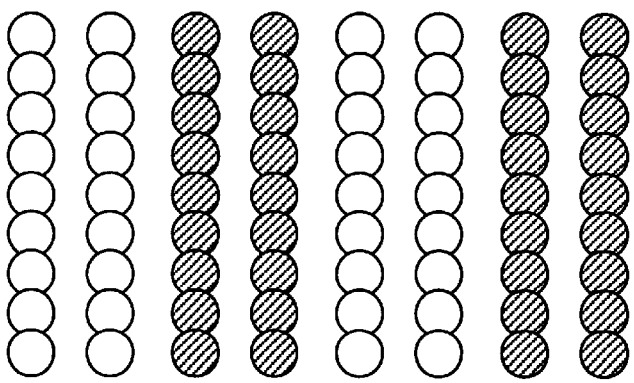
Figure 26C:
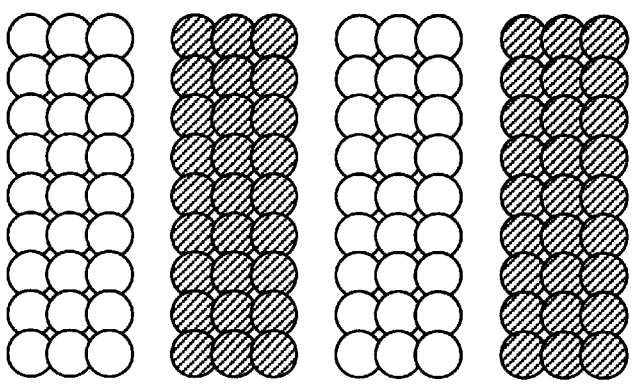
Figure 26D:
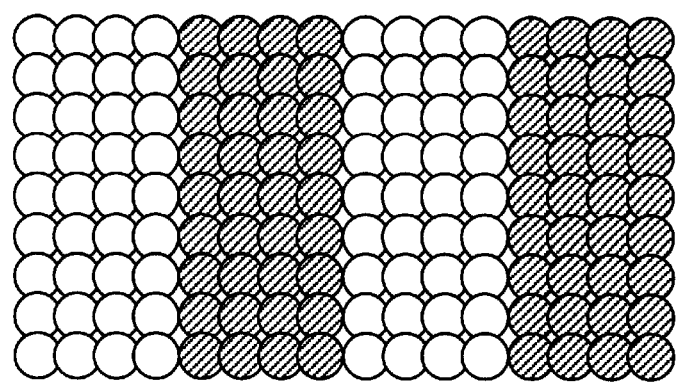

FIGS. 26A to 26D schematically show patterns for simultaneously performing the optimum ink ejection duty judgment and printing registration. FIG. 26A shows the case where the printing registration pattern to be printed by the first head and the second head is printed at an ink ejection rate of 25%. Similarly, FIGS. 26B to 26D show patterns printed at ink ejection duties of 50%, 75% and 100%, respectively.

Figure 27:
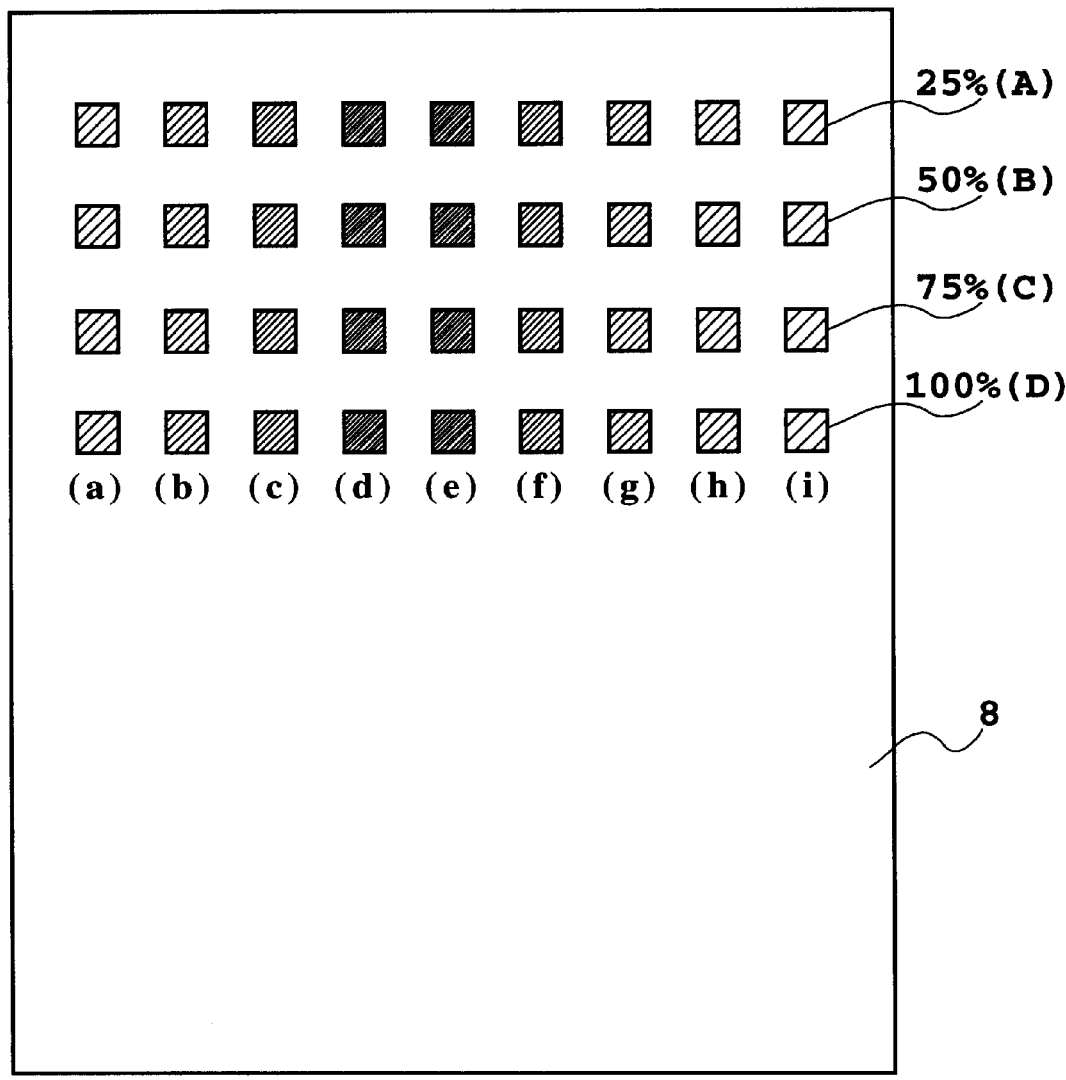
FIG. 27 is a schematic view illustrating the state in which the printing patterns are printed on a printing medium in the fourth embodiment according to the present invention.

FIG. 27 shows a condition where patterns (a) to (i) are printed at respective ink ejection duties.

In FIG. 27, the patches in the first row are printed at an ink ejection duty of 25%. Similarly, the patches in the second row are printed at 50%; the patches in the third row, at 75%; and the patches in the fourth row, at 100%, respectively.

Figure 28:
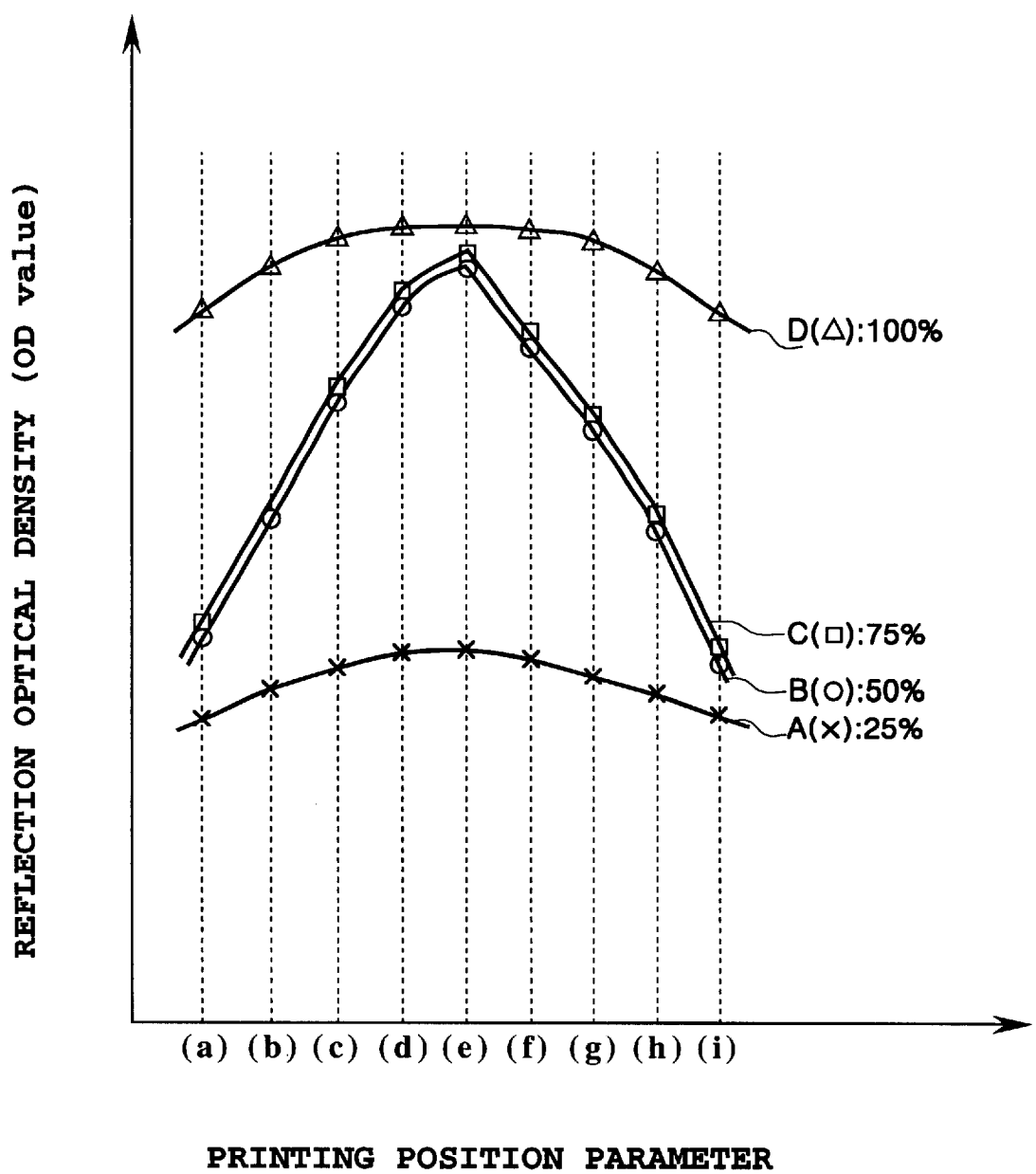
FIG. 28 is a graph illustrating the relationship between a relative offset amount of the printing registration pattern and a reflection optical density in the fourth embodiment according to the present invention.

FIG. 28 graphically shows the relationship between a relative offset amount of the printing registration pattern and the reflection optical density measured at each ink ejection duty. When the ink ejection duty is insufficient, even if the offset amount of the printing registration patterns is increased, sufficient contrast cannot be attained to make variation of the reflection optical density small (curve A). On the other hand, if the ink ejection duty is excessive, overlapping of the dots can be caused to make the variation amount of the optical reflection index too small even when the offset amount of the printing registration patterns is increased (curve D). From the curves of respective ink ejection duties, the ink ejection duty, at which the variation amount becomes largest, is calculated to perform optimum printing registration from the curve of the ink ejection duty.

In FIG. 28, both curves B and C show the same amount of variation, so any of the curves may be used. It is noted that in the same amount of variation, it is desired to use the curve B having a small ejection duty for suppressing the influence of cockling.

[Fifth Embodiment]

In a fifth embodiment, printing registration is performed between a plurality of heads in a carriage scanning direction.

(Explanation of Printing Registration Pattern)

Concerning the printing pattern explained in the fourth embodiment, dots printed in the forward scan is printed by a first head in the present embodiment, and the dots printed in the reverse scan is printed by a second head in the present embodiment, for performing printing registration. Judgment method of the printing registration condition is similar to that in the fourth embodiment.

(Optimum Ink Ejection Duty Judgment Pattern)

Concerning a plurality of heads to be used, the pattern for making judgment of the optimum ink ejection duty is printed similarly to the fourth embodiment, for measuring the optical reflection index for respective patches. A linear region where the optical reflection index with respect to the ink ejection duty is linearly varied is determined on the basis of the distribution of the optical reflection index. The ejection duty at which the optical reflection index is smallest in the linear region is calculated for each head. Subsequently, the printing registration is performed at the optimum ink ejection duty. By this, printing registration can be well established. The judgment method of the optimum ink ejection duty is similar to the fourth embodiment.

(Reflecting Ink Ejection Duty on Printing Registration Pattern)

On the basis of the result of judgment of the foregoing optimum ejection duty similarly to the fourth embodiment, a prepared printing registration pattern is printed at the thinning rate suitable for the printing medium and the ink. The dots are uniformly thinned in the longitudinal direction of the printing pattern in printing registration between the heads.

It is possible to simultaneously perform the optimum ink ejection duty judgment and printing registration similarly to the foregoing fourth embodiment. By varying the ink ejection duty and the condition for printing registration set forth above, printing is performed by the first head and the second head. Then, the optical reflection indexes of respective patches are measured by means of the optical sensor 30. On the basis of distribution of the optical reflection indexes, a linear region where the optical reflection index varies linearly is obtained. Then, the ink ejection duty, at which the optical reflection index becomes smallest in the linear region, is obtained to determine the optimum printing registration condition at the ink ejection rate.

[Sixth Embodiment]

In a sixth embodiment, printing registration is performed in a direction perpendicular to a carriage scanning direction between a plurality of heads.

(Explanation of Printing Registration Pattern)

In the present embodiment, there is used a printing pattern where the relationship between vertical and lateral directions is reversed in the printing pattern explained in the fifth embodiment. The judgment method of the printing registration condition is similar to that in the fourth embodiment.

(Optimum Ink Ejection Duty Judgment Pattern)

In the same manner as in the fifth embodiment, concerning a plurality of heads to be used, the pattern for making judgment of the optimum ink ejection duty is printed similarly to the fifth embodiment, for measuring the optical reflection index for respective patches. A linear region where the optical reflection index with respect to the ink ejection duty is linearly varied is determined on the basis of the distribution of the optical reflection index. The ejection duty at which the optical reflection index is smallest in the linear region is calculated for each head. Subsequently, the printing registration is performed at the optimum ink ejection duty. By this, printing registration can be well established. The judgment method of the optimum ink ejection duty is similar to the fourth embodiment.

(Reflecting Ink Ejection Duty on Printing Registration Pattern)

On the basis of the result of judgment of the foregoing optimum ejection duty similarly to the fourth embodiment, a prepared printing registration pattern is printed at the thinning rate suitable for the printing medium and the ink. The dots are uniformly thinned in the longitudinal direction of the printing pattern in printing registration between the heads.

It is possible to simultaneously perform the optimum ink ejection duty judgment and printing registration similarly to the foregoing fifth embodiment. By varying the ink ejection duty and the condition for printing registration set forth above, printing is performed by the first head and the second head. Then, the optical reflection indexes of respective patches are measured by means of the optical sensor. On the basis of distribution of the optical reflection indexes, a linear region where the optical reflection index varies linearly is obtained. Then, the ink ejection duty, at which the optical reflection index becomes smallest in the linear region, is obtained to determine the optimum printing registration condition at the ink ejection rate.

While examples of the printing apparatus in which the image is formed by ejecting the ink from the printing head to the printing medium have been illustrated in the present embodiment, the present invention is not limited to the construction. The present invention is applicable to the printing apparatus in which the dots are formed on the printing medium while performing operation of the printing head.

[Seventh Embodiment]

Seventh to tenth embodiments are suitable for performing printing using high density and low density inks in the printing apparatus shown in FIGS. 1 and 2.

Printing can be performed by using both of the high density ink and an ink diluted about three or four times with the high density ink (low density ink), or by using only the diluted ink (low density ink). In this case, the head must be frequently replaced for printing of an image primarily consisting of a text and for printing of an image primarily consisting of a graphic image, so that it becomes necessary to frequently perform printing registration.

However, when the user selects the condition where the printing positions are well registered by visual observation, the rules are printed on the printing medium with the high density ink and the low density ink. As a result, since the printing registration condition is determined by the user, it is possible to make it difficult to judge by visual observation when the low density ink is used.

FIGS. 29A to 29C show printing registration between the high density ink and the low density ink.

In FIGS. 29A to 29C, FIG. 29A illustrates dots in the case where the printing positions are well registered; FIG. 29B, where the printing positions are registered with a slight offset; and FIG. 29C, where the printing positions are registered with a greater offset. The solid circles represent the patterns formed by the high density ink and the broken circles represent the patterns formed by the low density ink. In automatic printing registration, in printing registration in the case where both the high density ink and the low density ink are used and printing registration in bi-directional printing between the heads, a difference in density of the printing result with the high density ink and the low density ink becomes large. Accordingly, even if the automatic printing registration pattern such as a patch is printed and the relative position of the high density ink (high density dots) and the low density ink (low density dots) is varied as shown in FIGS. 26A, 26B and 26C, the density of the high density ink is dominant. Therefore, the density variation corresponding to the variation cannot be obtained by the optical sensor, thereby inducing an impossibility of optimum automatic printing registration. Even in printing registration for bi-directional printing with the low density ink, a sufficient density cannot be obtained, thereby making printing registration impossible.

(Selection Processing of Printing Registration Condition)

When the reflection optical density of the pattern is measured after printing the patches as printing pattern for printing registration in the seventh embodiment, a minimum density value necessary for printing registration and a minimum density value necessary for printing registration in density variation in offsetting the relative positions of the dots formed by the first print and the second print are defined as predetermined values. When the result of measurement of the reflection optical density satisfies a predetermined condition, the operation proceeds to the following steps of printing registration.

Figure 30A:
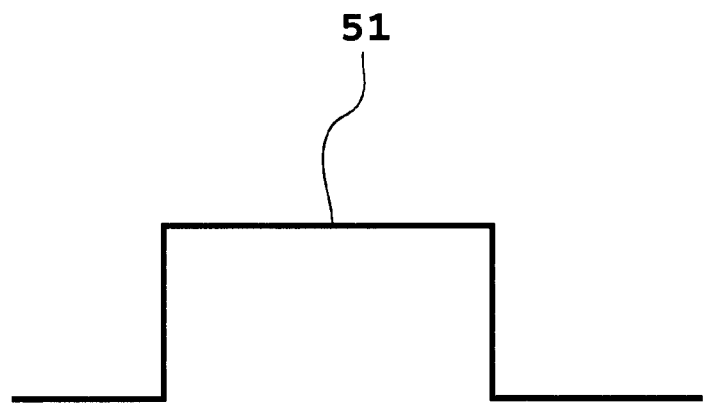
Figure 30B:
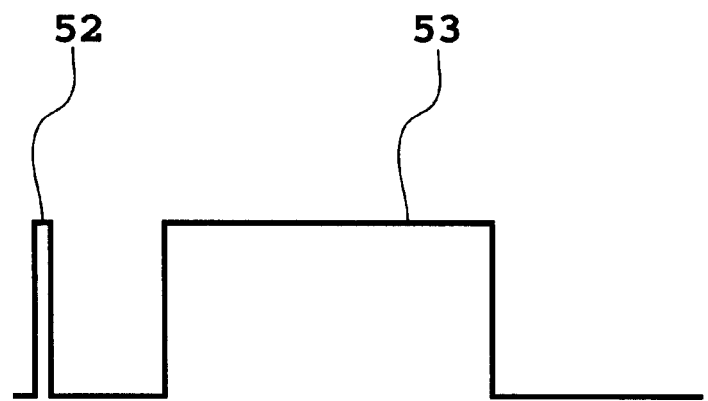

FIGS. 30A and 30B show drive pulses for a printing head. When a value exceeding the predetermined value cannot be obtained from the printing result, a pulse to be used for driving an electro-thermal transducer for the head is modified from a normal single pulse 51 shown in FIG. 30A to double pulses 52 and 53 shown in FIG. 30B. Subsequently, patches are printed again. Then, the reflection optical density is measured again. If the value exceeding the predetermined value is obtained through this processing, the operation proceeds to the printing registration processing similarly to the above manner. Even if the value exceeding the predetermined value is not obtained yet, the pulse width of the pre-heating pulse 52 is increased, so that the operation proceeds to the printing registration. In the present embodiment, the foregoing processing is established on the assumption that a sufficient density for printing registration can be obtained.

Japanese Patent Application Laid-open No. 092565/1993 discloses that the ejection amount of the ink can be varied by modulation from the single pulse 51 to the double pulses 52 and 53 and that the ink ejection amount can be varied by modulation of the pulse width of the pre-heating pulse 52.

In checking whether or not the ink density exceeds the predetermined value, simple patches for density measurement are prepared separately. By printing such simple patches in advance of printing registration, the density is measured. The operation may proceed to the processing of printing of the printing pattern for printing registration or selection of the printing position after varying the ejection amount in the foregoing method.

Adjustment of the printing density can be performed by varying not the ejection amount of the ink but the number of ink droplets. For example, if the dye density ratio of the high density ink to the low density ink is 3:1, a density approximate to the density obtained by ejecting one droplet of the high density ink can be obtained by ejecting three ink droplets of the low density ink. In consideration of oozing caused by the printing medium 8, two droplets of ink of the low density may be ejected.

The printing registration in the seventh embodiment is carried out in the same manner except that the forward scan and the reverse scan in the first embodiment are performed by the first print and the second print, respectively.

[Eighth Embodiment]

An eighth embodiment is directed to a printing method for performing printing respectively by the first printing and the second printing by a plurality of printing heads, to form an image. In detail, in a printing method for forming an image by performing printing in the forward scan and the reverse scan, relative printing registration of the printing positions in the forward scan and the reverse scan is established. The construction of a printing apparatus to be used in the present embodiment and the printing pattern for printing registration are similar to those in the foregoing seventh embodiment. Concerning printing registration processing, in place of the first print and the second print in the foregoing seventh embodiment, printing registration can be similarly established by using printing in the forward scan and printing in the reverse scan.

(Selection Processing of Printing Registration Condition)

Dots printed by the first and second printing heads in the seventh embodiment are printed in the forward scan and the reverse scan, for performing selection processing of the printing registration condition in the present embodiment.

Figure 31:
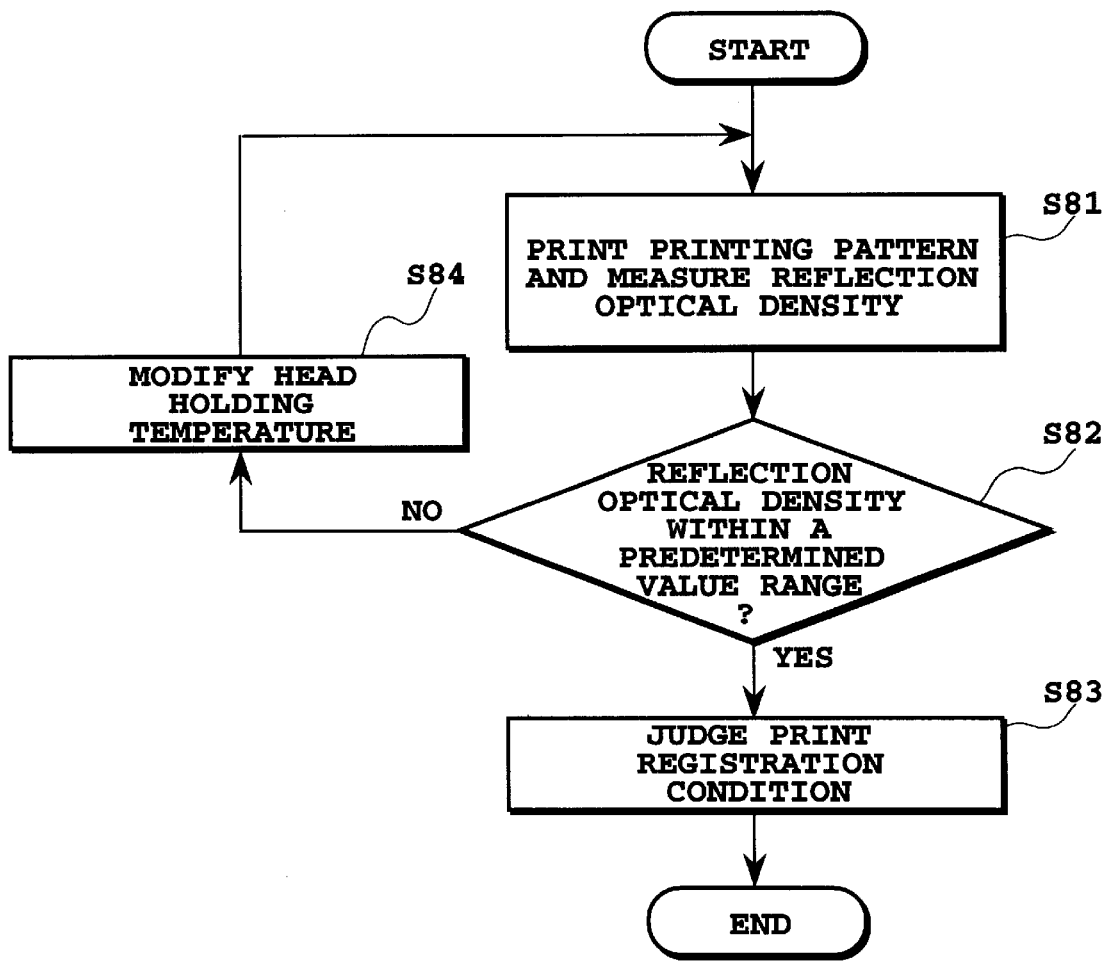
FIG. 31 is a flowchart illustrating printing registration condition judgment processing in an eighth embodiment according to the present invention.

FIG. 31 is a flowchart illustrating the selection processing of the printing registration condition in the present embodiment.

As illustrated in FIG. 31, the printing pattern is printed at step S81. Then, the reflection optical density of the printed pattern is measured similarly to the seventh embodiment.

Next, at step S82, judgment is made as to whether or not the highest one among the measured reflection optical densities falls within the predetermined value. If the result of judgment is affirmative, the operation proceeds to step S83.

If the reflection optical density is smaller than the predetermined value, the operation proceeds to step S84. By means of the sub-heater 142 (FIG. 5) mounted on the printing head 1, a holding temperature of the ink of the head is varied (from normal 23° C. to 30° C. for the first time, and from 30° C. to 35° C. for the second time) to elevate the temperature of the ink. After the ejection amount of the ink is increased by film boiling, the operation is returned to step S81.

A large number of varying patterns of the holding temperature are preliminarily set at fine temperature intervals. It is also possible to increase number of times of judgment by permitting further variation of the holding temperature when the reflection optical density is judged to be still inappropriate at the second judgment. However, in the present embodiment, variation patterns of the temperature are to be three (23° C., 30° C. and 35° C.). Even when it is judged that the result of the second judgment is still inappropriate, the operation proceeds to step S83 after varying the holding temperature.

In the present embodiment, the sub-heater 142 is used for holding the temperature of the ink. However, it is also possible to hold the temperature by driving the ejection heater 25 used for ejection of the ink.

In printing registration in the carriage scanning direction between the forward printing and the reverse printing, printing registration with higher precision can be performed by controlling an ejection amount of ink having a lower density in the first printing and the second printing.

[Ninth Embodiment]

A ninth embodiment is directed to a printing method for performing printing by a first head and a second head using a plurality of printing heads, to form an image. In detail, the ninth embodiment concerns printing registration in a carriage scanning direction between the different heads, i.e., the first head and the second head.

A construction of the printing apparatus to be employed in the present embodiment, the printing patterns for printing registration and the printing registration processing are similar to those of the seventh embodiment set forth above.

The density of ink to be loaded in the head and the condition for ejecting the ink amount required for printing registration using the ink are previously stored in the printing head. By printing the printing registration pattern under this condition, the printing registration processing is performed on the basis of the printing result. Thus, the optimum registration can be selected.

[Tenth Embodiment]

A tenth embodiment is directed to a printing method for performing printing by a first head and a second head using a plurality of printing heads, to form an image. In detail, the tenth embodiment concerns printing registration in a carriage scanning direction between the different heads, i.e., the first head and the second head.

At first, printing patterns, explained later, are printed on a printing medium 8 while varying relative printing registration condition of printing of the first head and the second head. Then, the user visually selects the condition where the best printing registration is established. Subsequently, the printing registration condition is set by operating the host computer.

The construction of the printing apparatus in the present embodiment is the same as that in the seventh embodiment except that the optical sensor 30 mounted on the carriage 2 schematically shown in FIG. 1 or 2 is removed.

(Printing Pattern for Printing Registration)

Figure 32:
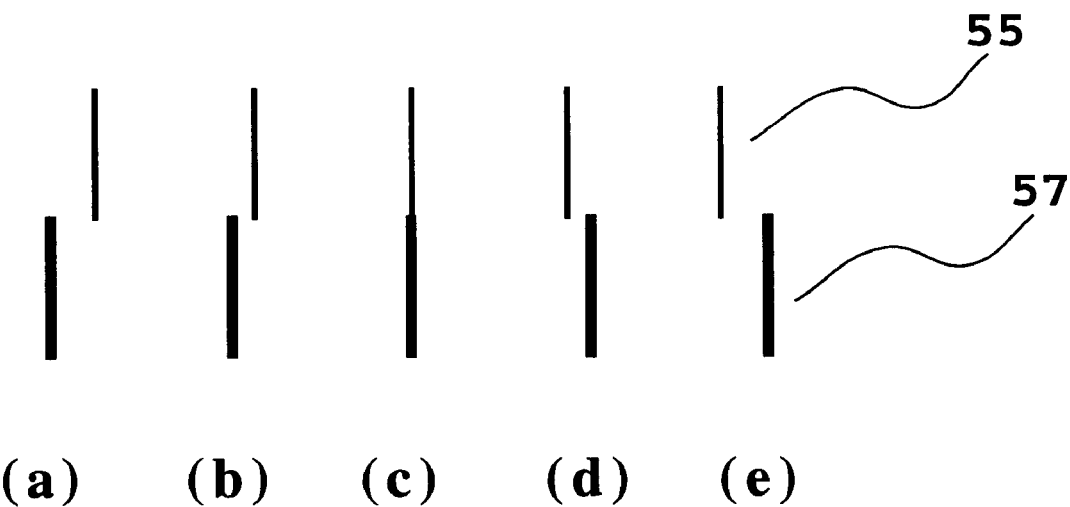
FIG. 32 is a view illustrating a printing pattern for printing registration in a tenth embodiment according to the present invention.

FIG. 32 illustrates a printing pattern for printing registration to be employed in the present embodiment.

In FIG. 32, an upper thin rule 55 is a rule printed on the printing medium by the first head, and a lower thick rule 57 is a rule printed on the printing medium by the second head. (a) to (e) represent printing positions. At the printing position (c), the rule is printed under the condition where the printing by the first head and the printing by the second head are matched. At the printing positions (b) and (d), rules are printed under the condition where the printing positions of the first and second heads are slightly offset. At the printing positions (a) and (e), rules are printed under the condition where the printing positions of the first and second heads are offset in greater amount.

(Selection of Printing Registration Condition and Printing Registration Processing)

In implementation of printing registration employing the printing registration pattern, the conditions such as the ink to be loaded on the head and an ejection amount for printing registration are previously stored in the printing head. At this time, the printing condition for printing registration is set in such a manner that if the loaded ink is the low density ink, the same pixel is printed twice. After printing the printing pattern for printing registration under this condition, the condition where the best printing registration is established is visually selected among the printed patterns by the user. Thereafter, the printing registration condition is set by operating the host computer.

The foregoing first to ninth embodiments may be used in appropriate combination for the purpose of better printing registration.

Concerning any one of the first to tenth embodiments, various conditions such as the driving frequency and the head temperature for printing the printing pattern for printing registration can be different from the driving frequency or the head temperature to be used in actual printing. Therefore, after judgment of the printing registration condition, correction is performed with respect to a difference in driving frequency, head temperature or the like, as required. The correction can be done arithmetically using some equations. Otherwise, data of the printing timing concerning actual conditions is prepared for each printing pattern. According to the result of judgment of condition of printing registration, the data is used as a printing timing as it is. Alternatively, the printing timing is obtained by interpolation.

Although in the above embodiments, the present invention is explained by the use of the printing head of an ink jet type, it may be applicable to printing heads of a thermal transfer type and a thermal sublimation type. Moreover, the printing head of the present invention includes an electrophotographic printing unit and the like. Therefore, the present invention may be applicable to an electrophotographic system.

According to the present invention, the printing density can be increased by increasing the ink ejection amount per se, using a plurality of kinds of inks and combining them, to enable printing registration between the heads having markedly different printing densities and printing registration in bi-directional printing.

As a result, the user can perform the printing registration without paying any attention to the density of the ink and the combination of a plurality of heads.

[Other Embodiments]

Next, respective embodiments following the embodiment 10, realized different modification of a layout of the reflection optical sensor 30 and the respective head cartridges. Here, the "layout" means two-dimensional location relationship in a plane extending in a direction substantially parallel with a printing medium.

The following respective embodiments selectively adjust the time interval from pattern formation to reading of density of the pattern formed, by using scanning time and auxiliary scanning time (intervals of respective scans). In order to set several sorts of time interval, various modifications of the layout of the reflection optical sensor 30 and the respective head cartridges are carried out. Moreover, in the following embodiments, the first printing pattern and the second printing pattern are not limited to those formed by scanning in different directions, but both patterns may be formed by scanning in the same direction or, further, by scanning another recording area (recording width).

Figure 33:
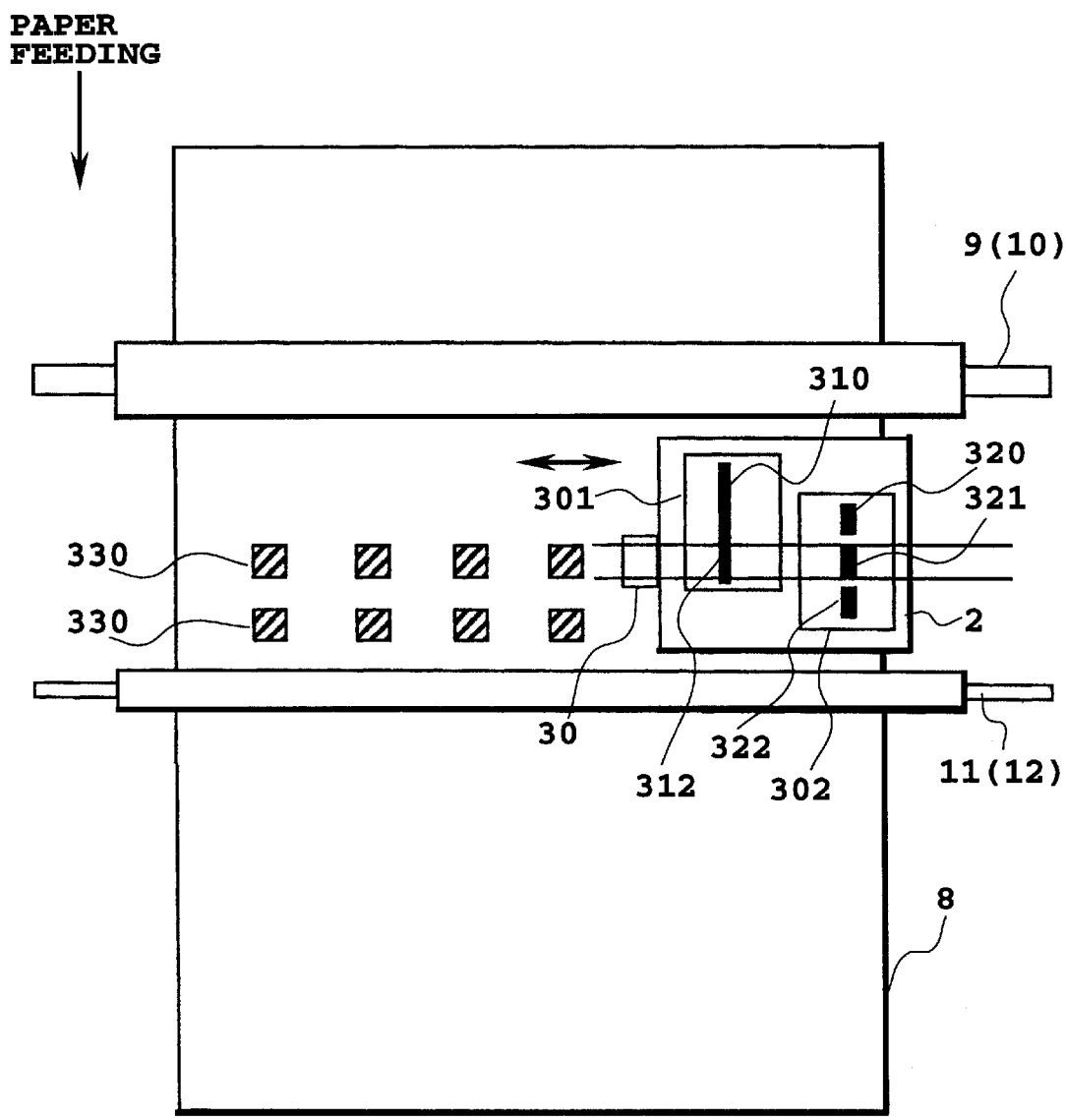
FIG. 33 is a schematic plan of one layout configuration of a sensor and a head according to another embodiment.

In FIG. 33, a printing medium 8 such as a printing paper or a plastic thin plate is transported (fed) downwards in the figure by means of two sets of feed rollers 9, 10 and 11, 12, and provided for printing by a print head mounted on a carriage 2 moving to right and left in the figure substantially vertically to the paper feed direction. In the following figures, the paper feed direction and the carriage moving direction are suppose to be similar to FIG. 33.

The carriage 2 installs a black cartridge 301 having a black head 310 and a color cartridge 302 having a yellow head 320, a cyan head 321, and a magenta head 322. Respective heads are an ink jet heads for ejecting ink using thermal energy.

A reflection optical sensor 30 is disposed at a left side portion of the carriage 2, a location of which is different from the installation locations of the respective heads. The installation location of the sensor 30 agrees substantially with that of the cyan head 321 in the paper feed direction, but does not agree with the cyan head( and the black, yellow, magenta heads). In other word, the heads and the reflection optical sensor 30 are offset only in the main scanning direction. Further, the reflection optical sensor 30 is installed so as to be apart from the printing medium 8 by a predetermined distance, while its measuring spot diameter is a size within a printing width which can be printed by one time scanning of the respective heads. It should be noted that in the following figures, the straight line parallel with the carriage moving direction and crossing with the pint head represents the portion of the respective print heads to be used for the same scanning.

Figure 34:
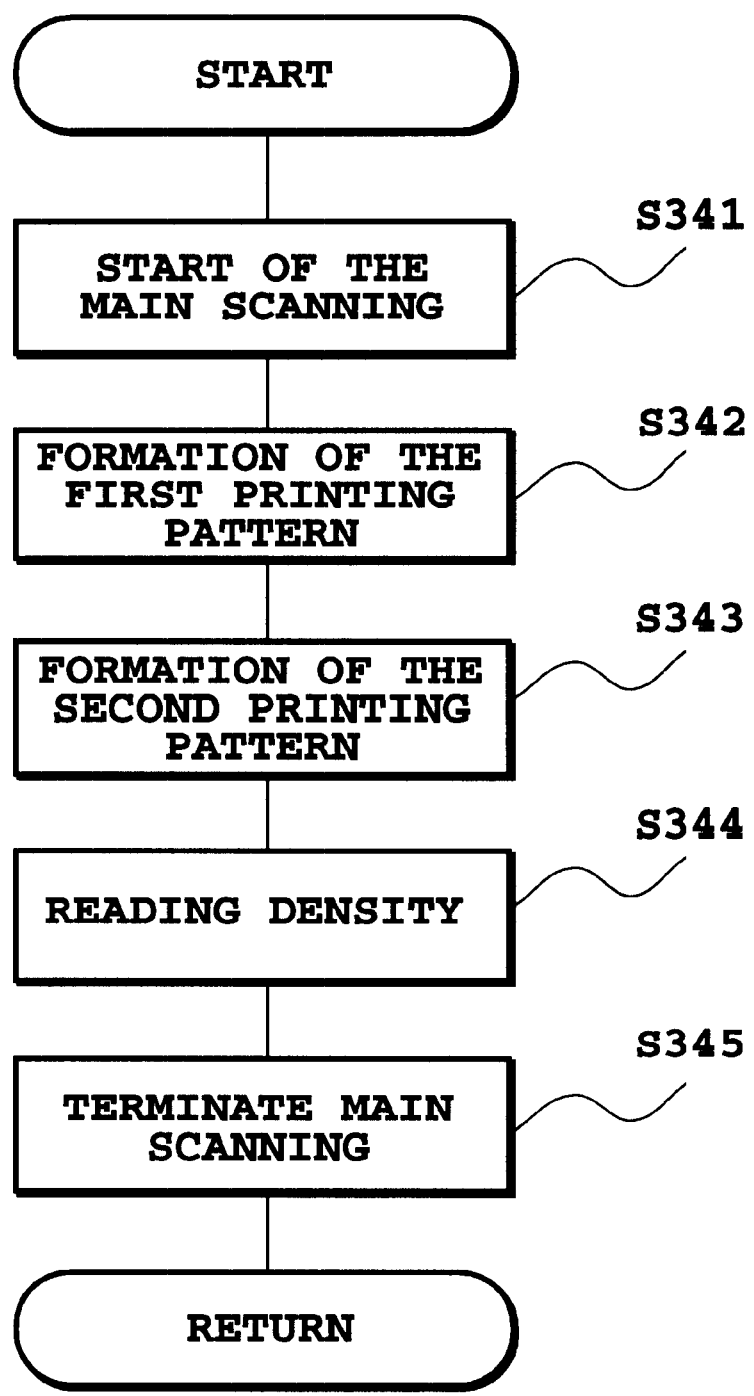
FIG. 34 is a scanning control flow-chart corresponding to the layout of FIG. 33.

In the case of the layout shown in FIG. 33, the completion of the formation of the first printing pattern and the second pattern, and further reading of density of the patterns thus formed by means of the reflection optical sensor 30, are performed during one scanning, according to procedure shown in a flow chart of FIG. 34.

In FIG. 34, while the scanning starts in the step S341 and terminates in the step S345, the first printing pattern is formed by means of the black head 310 (step S342) and the second printing pattern is formed by means of the cyan head 321 (step S343) to complete a patch 330 with both pattern, before reading it by means of the reflection optical sensor 30 in the step S344. It should be noted that, in FIG. 33 and in the following figures, the illustration of the patch is omitted for simplification of explanation. A plurality of patches which differ from each other in a deviation amount of the patterns are formed as the patch 330 according to the subject matter of the present invention.

According to the layout of FIG. 33, reading of the density of the patch is performed after an extremely short elapsed time depending upon a carriage moving speed and a installation distance between the heads and the reflection optical sensor, after completion of the patch 330.

It should be noted that, in the following description of this specification, an interval from the patch completion to the density reading in a same scan shall be represented by time S. The time S, being depending on the main scanning direction distance between the head that has completed the patch after the last pattern formation and the optical sensor and the carriage moving speed, may take two values in this embodiment. In other words, it may take a value determined by the distance between the cyan head 321 and the reflection optical sensor 30 and a value determined by the distance between the black head 310 and the reflection optical sensor 30.

Figure 35:
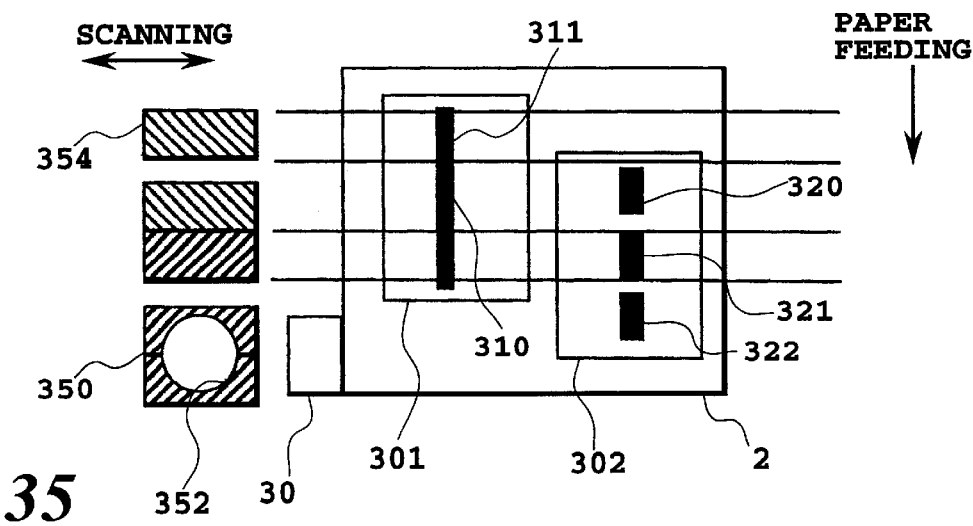
FIG. 35 is a schematic plan of another layout configuration of a sensor and a head according to another embodiment.

In the layout of FIG. 35, the offset direction of the reflection optical sensor 30 is changed from that of FIG. 33 and, the reflection optical sensor 30 is not only offset in the main scanning direction in respect of the head installation position, but also offset to a side of downstream in the paper feed direction. The first printing pattern is formed for the patch 350 by using a portion 311 of the black head 310 which portion exists on a side of an upstream in the paper feed direction, the second printing pattern is formed for the patch 350 by using the cyan head 321 in the following scan, and thereafter the patch 350 is read by a measuring spot 352 of the reflection optical sensor 30 during a following scanning after both scans for forming the patterns.

Moreover, in FIG. 35 and following figures, hatching attached to the patch 350 represents that the formation of the first and the second printing patterns (black and cyan) is completed, while another hatching 354 shaded in different direction represents that only the first print pattern (black) is formed.

On the other hand, as for a distance between the reflection optical sensor 30 and the printing medium (8), a installation distance of the reflection optical sensor to the printing medium is determined so that the distance is larger than that of FIG. 33. A diameter of measuring spot 352 of the reflection optical sensor 30 becomes larger than the printing width which can be formed one scanning of the head and covers the printing width of two times of scanning. This enlargement of the diameter of the measuring spot is realized by increasing the distance between the reflection optical sensor and the printing medium on taking into consideration of an optical characteristic of the reflection optical sensor. Such increase of the estrangement distance can prevent the optical characteristics of the reading section of the sensor 30 from deteriorating by splashed ink or the like, and then assure a stable detection of print location deviation.

Figure 36:
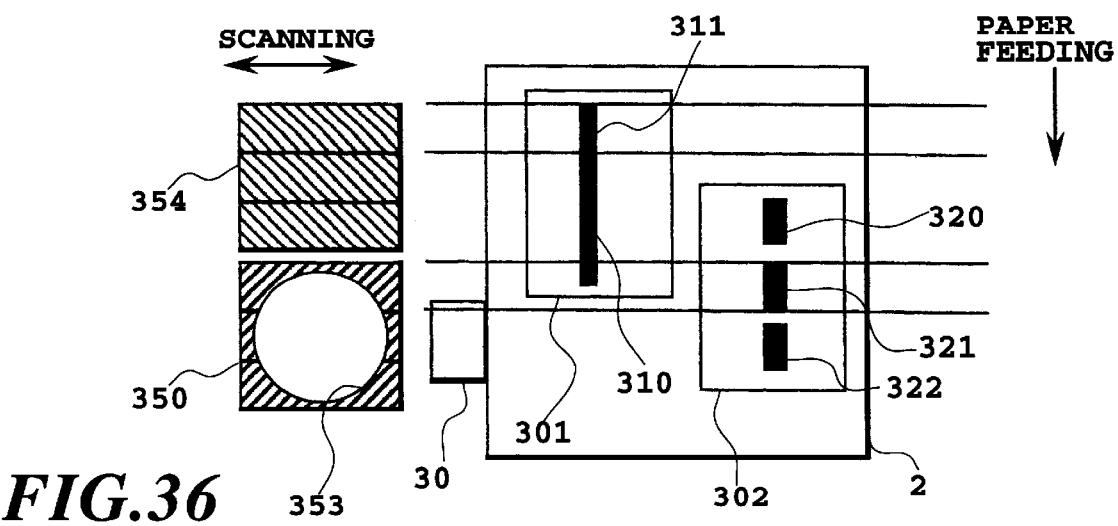
FIG. 36 is a schematic plan of another layout configuration of a sensor and a head according to another embodiment.

In the layout shown in FIG. 36, the offset direction of the reflection optical sensor 30 is similar to that of FIG. 35 and, additionally, the distance between the reflection optical sensor 30 and the printing medium (8) is made larger than that of FIG. 35. By this arrangement, the optical characteristic of the sensor 30 can be more effectively prevented from deteriorating due to the splashed ink or the like.

Consequently, the diameter of the measuring spot 353 of the reflection optical sensor 30 is larger than the printing width of two times of scanning, and covers the printing width of three times of scanning. The first pinging pattern formation, the second printing pattern formation and the reading of the density of the patch are performed during separate scanning similarly to the embodiment shown in FIG. 35.

It should be noted that how to control the completion of both the first and the second printing patterns by performing respective scanning and to control the density reading by means of the reflection optical sensor 30 will be described by referring a flow-chart mentioned below.

Figure 37:
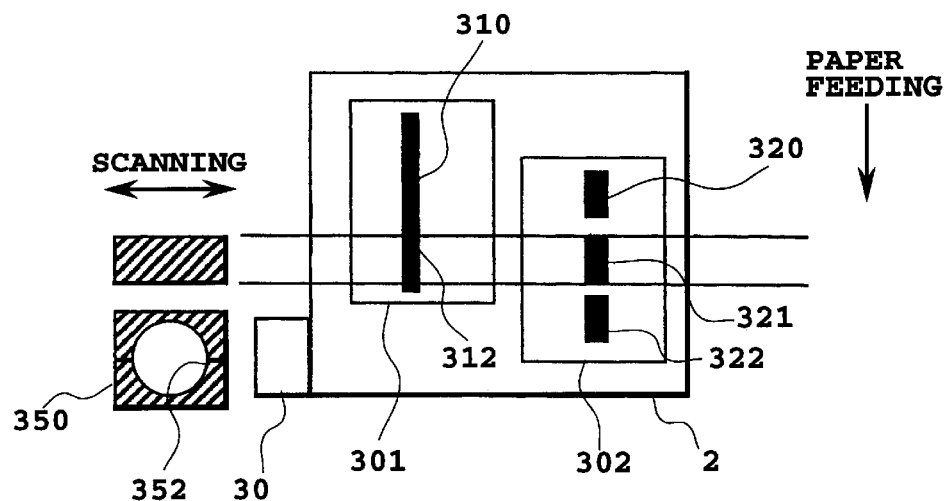
FIG. 37 is a schematic plan of another layout configuration of a sensor and a head according to another embodiment.

The layout of FIG. 37 is similar to that of FIG. 35. The distance between the reflection optical sensor 30 and the printing medium (8) is also similar to that of FIG. 35 and the diameter of the measuring spot 352 of the reflection optical sensor 30 covers the printing width corresponding to two times of scanning.

This layout is different from that of FIG. 35 in that the first and the second printing patterns are formed during the same scanning for a same printing region. The first printing pattern and the second printing pattern are formed for the patch 350 during the same scanning for the same printing region, by using the respective parts 321 and 312 of the respective cyan head 321 and black head 310, which parts correspond to paper feed direction downstream sides of the respective heads, and then the density of the patch is read by means of the measuring spot 352 of the sensor during a scanning which is performed two scans after the completion of both patterns.

Figure 38:
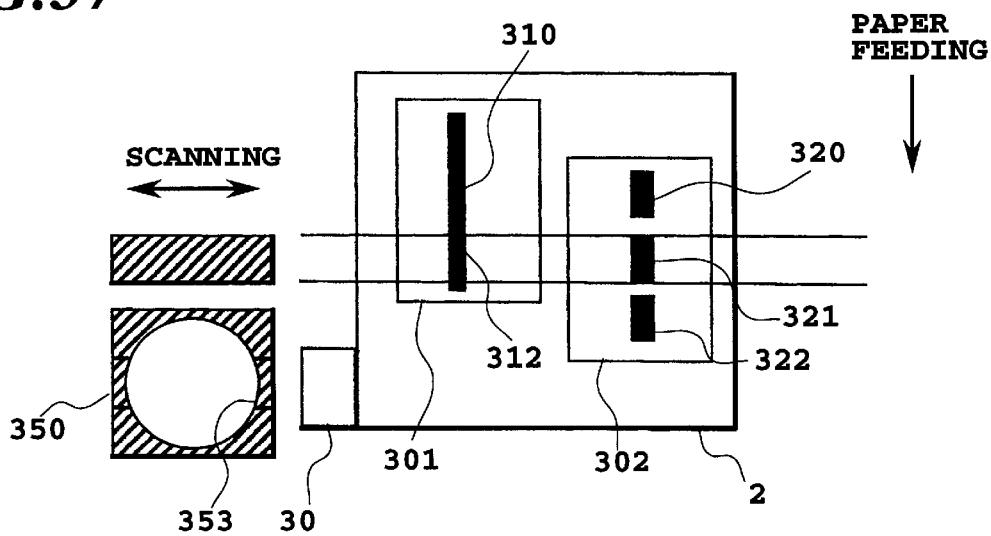
FIG. 38 is a schematic plan of another layout configuration of a sensor and a head according to another embodiment.

The layout of FIG. 38 is similar to that of FIG. 36. The distance between the reflection optical sensor 30 and the printing medium (8) is also similar to that of FIG. 36 and the diameter of the measuring spot 353 of the reflection optical sensor 30 covers the printing width corresponding to three times of scanning.

This layout is different from that of FIG. 36 in that the first and the second printing patterns are formed during the same scanning for the same printing region. The first printing pattern and the second printing pattern are formed for the patch 350 during the same scanning for the same printing region, by using the respective parts 321 and 312 of the cyan head 321 and the black head 310. The parts 321, 312 correspond to respective paper feed direction downstream sides. Then, the density of the patch is read by means of the measuring spot 353 during a scanning which is performed three scans after the completion of both patterns.

Figure 39:
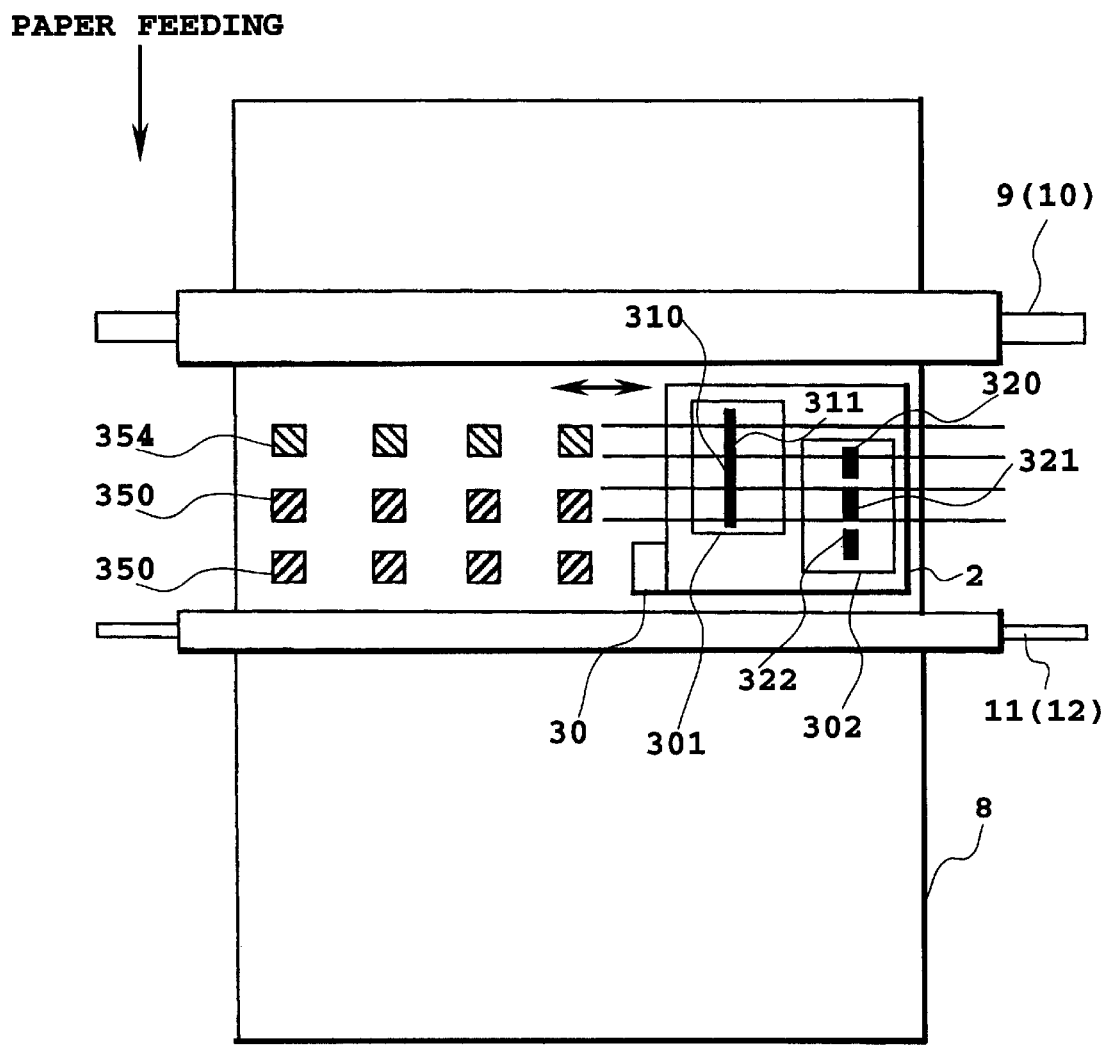
FIG. 39 is a schematic plan of another layout configuration of a sensor and a head according to another embodiment.

The layout of FIG. 39 is identical to that of FIG. 36, but the distance between the sensor 30 and the printing medium 8 is determined so that the sensor 30 can reads a region within the printing width corresponding to a width which can be printed during one scan of the heads. The formation of the first printing pattern and the second pattern for the same printing area and the density reading of the patch are performed during respective different scans according to the control flow-chart shown in FIG. 40. Reading of the density of the patch is performed after an elapse of a single scanning and the time S after the completion of both patterns.

Figure 40:
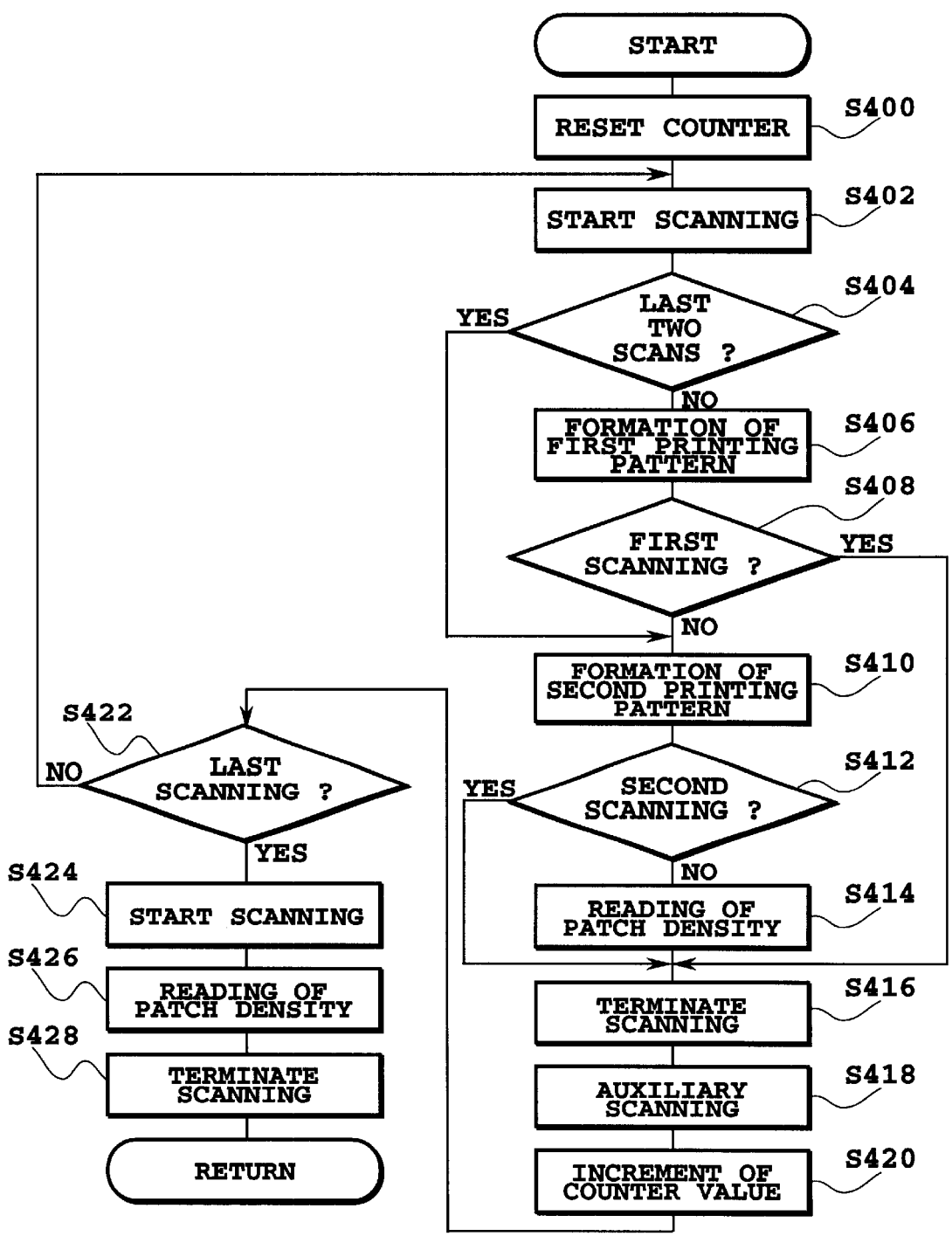
FIG. 40 is a scanning control flow-chart corresponding to the layout of FIG. 39.

In FIG. 40, at step S400, a counter value is reset while at step S420, the counter value is made increment. At Steps S404, S408, S412 and S422, referring to the counter value is performed to recognize a number of times of scanning for the same printing area and to branch according to the recognized number of times.

As for the first scanning for the same printing area, at step S402, scanning is started, at step S406, the first printing pattern is formed by means of the paper feed direction upstream side part 311 of the black head 310, at step S416, the first scanning is terminated and at step S418, an auxiliary scanning is performed.

After increment of the counter value at step S420, the processing branches at step S422 to proceed to step S402. At step S402, the second scanning is started, and at step S406, the first printing pattern is formed in a following another printing area and at step S410, the second printing pattern is formed by means of the cyan head 321 on the same printing area on which the first printing pattern has been formed during the first scanning so as to complete the patch consist of both patterns. Then, at step S416, the second scanning is terminated to successively perform the auxiliary scanning at step S418.

After another increment the counter value, the processing branches to proceed to step S402 to start the third scanning, and at step S410, the second printing pattern is formed in a following another printing area. At step S414, the density of the patch completed in the last scanning is read. That is, the reading is performed after an elapse of one scan and the time S from the completion of the patch consist of both patterns. In other words, the reading is performed after an elapse of two scans and the time S from the completion of the first printing pattern. At step S416, the third scanning is terminated to successively perform the auxiliary scanning at step S418.

Then, at step S424 and thereafter, during an interval from start of scanning at step S424 to termination of scanning at step S428, the first and second printing patterns formation and their reading are performed for respective separate printing areas at step S426. Here, the formation of both patterns (the formation of the patch) and the reading density thereof are performed similarly to the processing shown in the flowchart mentioned above. In the processing above, the first printing pattern is formed during each of the first to third scans, the second printing pattern is formed during each of the second to fourth scans, and the reading density is performed during each of the third to fifth scans.

The above-stated control is performed in the layout as shown in FIG. 39 so that the time interval between the pattern formation and the density reading can be adjusted selectively so as to read the patch density after the black ink and cyan ink fixed to the printing medium.

Figure 41:
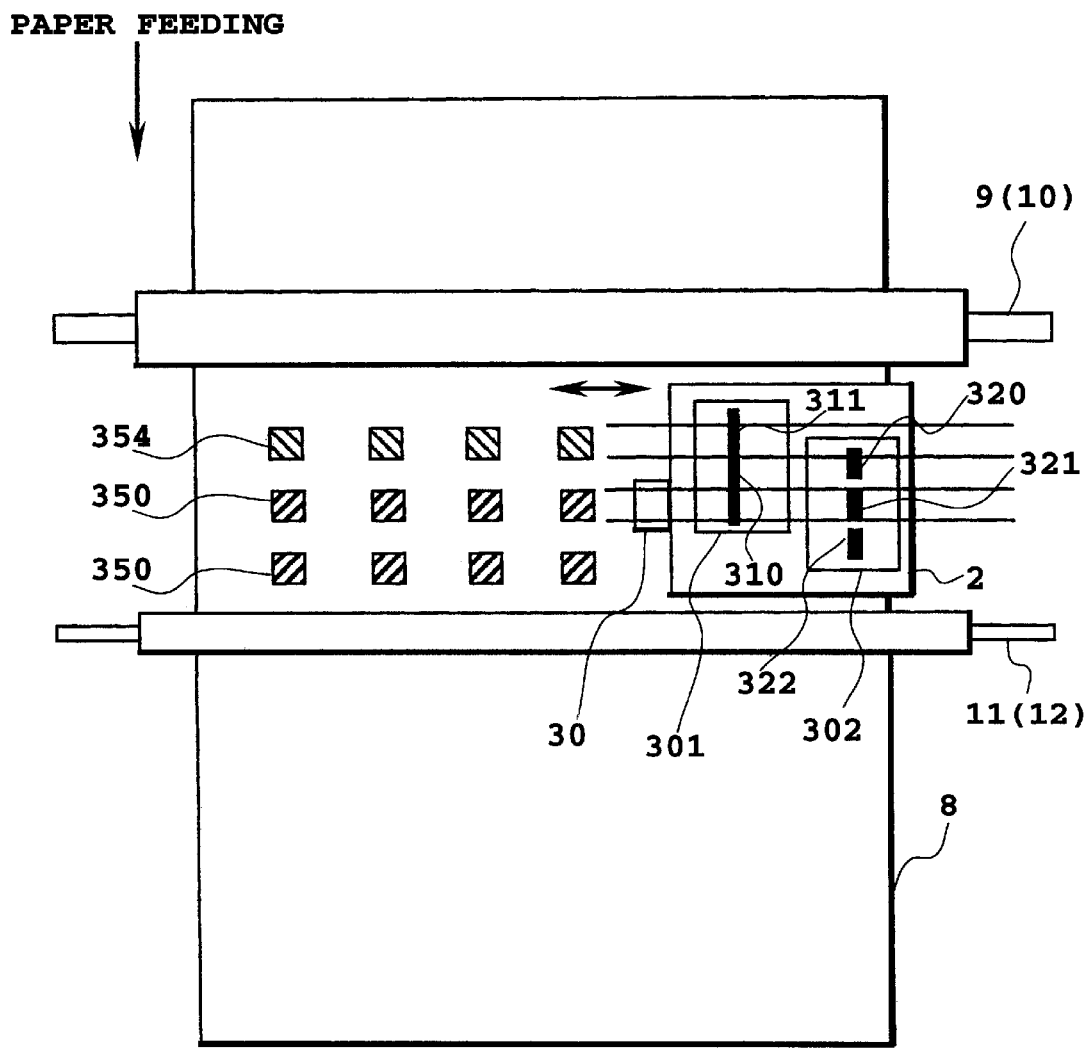
FIG. 41 is a schematic plan of another layout configuration of a sensor and a head according to another embodiment.

The layout of FIG. 41 is identical to that of FIG. 33, but is designed to allow the scanning to be controlled so as to leave an interval corresponding to substantially a single scanning between the formation of the first printing pattern and the formation of the second printing pattern for the same printing area.

In other words, the control is performed so that the second printing pattern is formed by using the cyan head 321 after an elapsed time corresponding to substantially a single scan after the completion of the first printing pattern by using the paper feed direction upstream side part 311 of the black head 310. Then, the density reading is performed after an elapse of one scan and the time S from the formation of the first printing pattern , and the density reading is performed after the elapsed time S after the completion of the first and second printing patterns.

Figure 42:
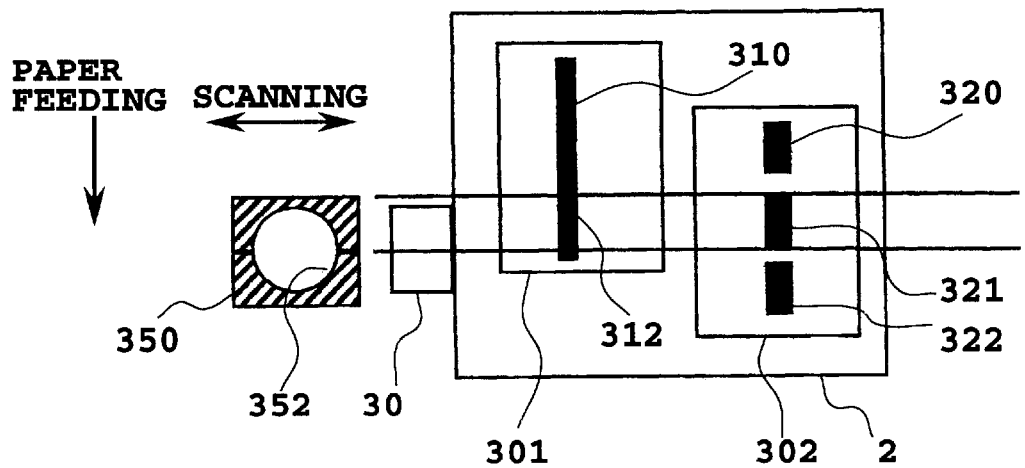
FIG. 42 is a schematic plan of another layout configuration of a sensor and a head according to another embodiment.

The layout of FIG. 42 is similar to that of FIG. 33, the distance between the reflection optical sensor 30 and the printing medium (8) is made large as in FIG. 35, so that the diameter of the measuring spot 352 covers the printing width corresponding to two times of scanning of the heads. For the same printing region, the first printing pattern and the second printing pattern are formed for the patch 350 during the same scanning by using the paper feed direction downstream side parts 312 of respective the cyan head 321 and the black head 310. Then, the density of patch is read by means of the measuring spot 352 during one scanning after the completion of the patch consist of both patterns.

Figure 43:
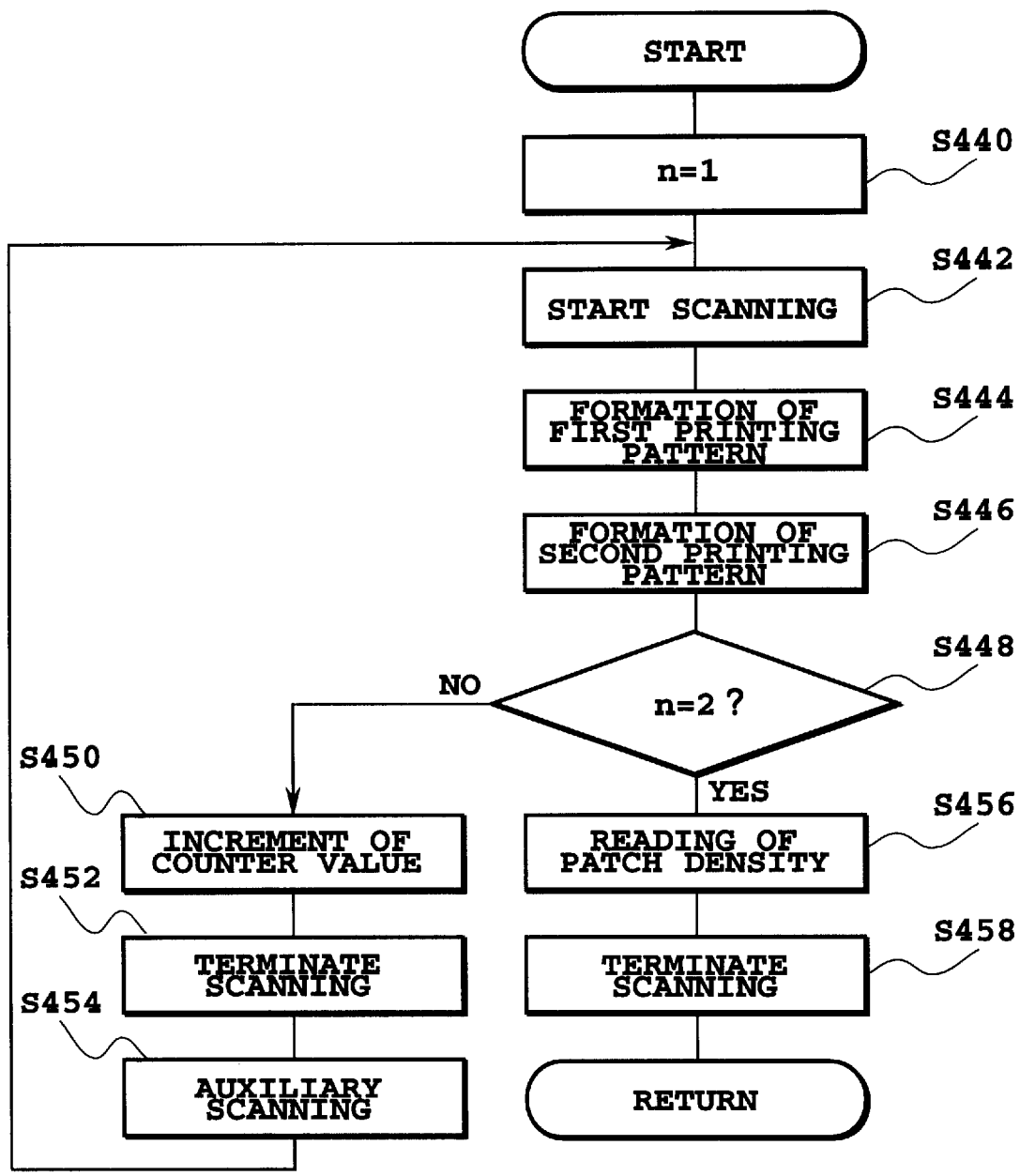
FIG. 43 is a scanning control flow-chart corresponding to the layout of FIG. 42.

Namely, processes from the completion of both patterns to the density reading are performed during two times of scanning according to the flowchart shown in FIG. 43.

In FIG. 43, at step S440, the counter value is reset and at step S450, the counter value is made increment. At step S448, this count value is referred to recognize the number of times of scanning for the same printing area and the processing branches in accordance with the recognized number of times.

As for the first scanning for the same recording area, at step S442, scanning is started to form the first printing pattern by means of the cyan head 321 at step S444, and then, at step S446, the second printing pattern is formed by using the paper feed direction downstream side part of the black head 310 so that both patterns are completed during a single scan.

In the first scanning, the processing branches from step S448 to step S450 to make the counter value increment, and then terminate scanning at step S452 and perform the auxiliary scanning at step S454.

Following the performance of the auxiliary scanning at step S454, the processing returns to step S442 to start the second scanning. The first printing pattern is formed on a following another printing area at step S444 and the second printing pattern is formed on the another printing area by means of the cyan head 321 at step S446. Thereafter, the processing branches form step 448 to step S456 to read the density of the patterns completed in the last scan, before terminating of the second scan at step S458.

Thus, the density of the patch completed in the last scan is read by the following scan. More specifically, the density reading is performed after an elapse of one scan and the time S from the completion of both patterns.

Figure 44:
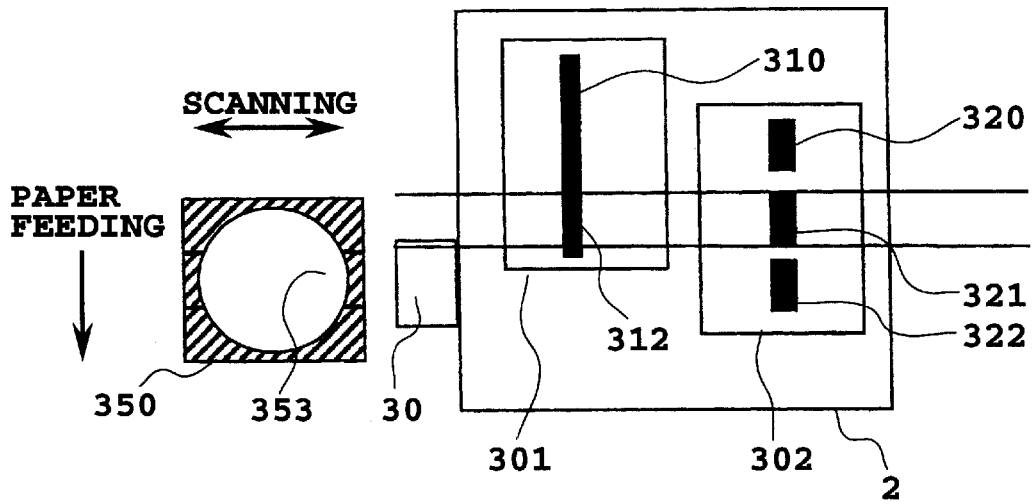
FIG. 44 is a schematic plan of another layout configuration of a sensor and a head according to another embodiment.

In the layout of FIG. 44, the offset direction of the reflection optical sensor 30 is similar to that of FIG. 42. The distance between the reflection optical sensor 30 and the printing medium (8) is made larger than that of FIG. 42, and the diameter of the measuring spot 353 covers the printing width corresponding to a width of three scans. In accordance with the diameter of the measuring spot, the offset amount of the sensor in the auxiliary scanning direction is larger than that of FIG. 42. For the same printing area, the first printing pattern and the second printing pattern are formed during the same scanning and the density reading by means of the measuring spot 353 of the reflection optical sensor 30 is performed at a scanning two scans after the completion of both patterns.

As for the layout of FIG. 44, the scanning may be controlled to leave an interval of approximately two times of scanning and the time S between the formation of the first printing pattern and the formation of the second printing pattern for the same printing area.

Figure 45:
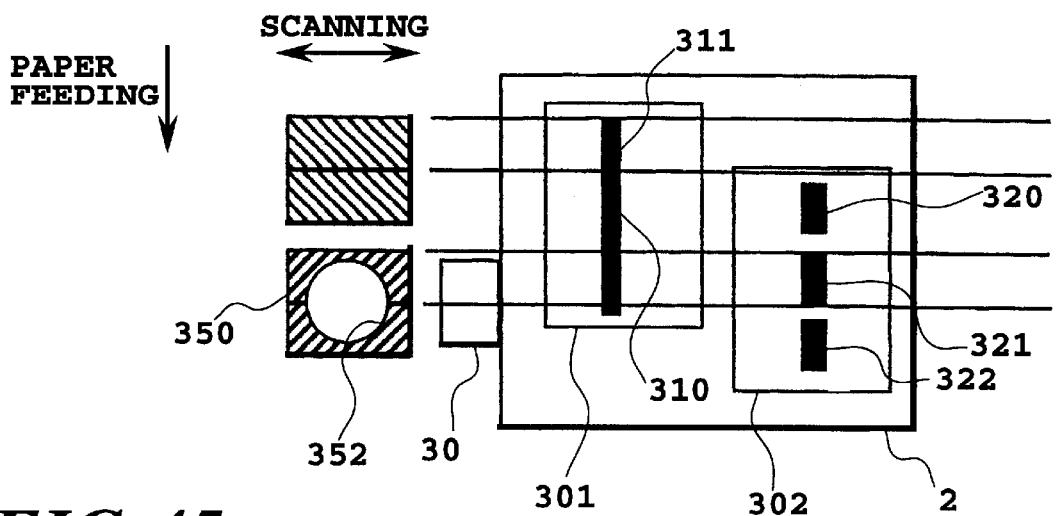
FIG. 45 is a schematic plan of another layout configuration of a sensor and a head according to another embodiment.

The layout of FIG. 45 is identical to that of FIG. 42, but is different in that the first printing pattern is formed by using the paper feed direction upstream side part 311 of the black head 310, and thereafter, the second printing pattern is formed by using the cyan head 321 during another scan, for the same printing area. The patch 350 completed by forming both patterns is read by means of the measuring spot 353 of the reflection optical sensor. The interval for the completion of both patterns and the density reading corresponds to a single scan and the time S.

Figure 46:
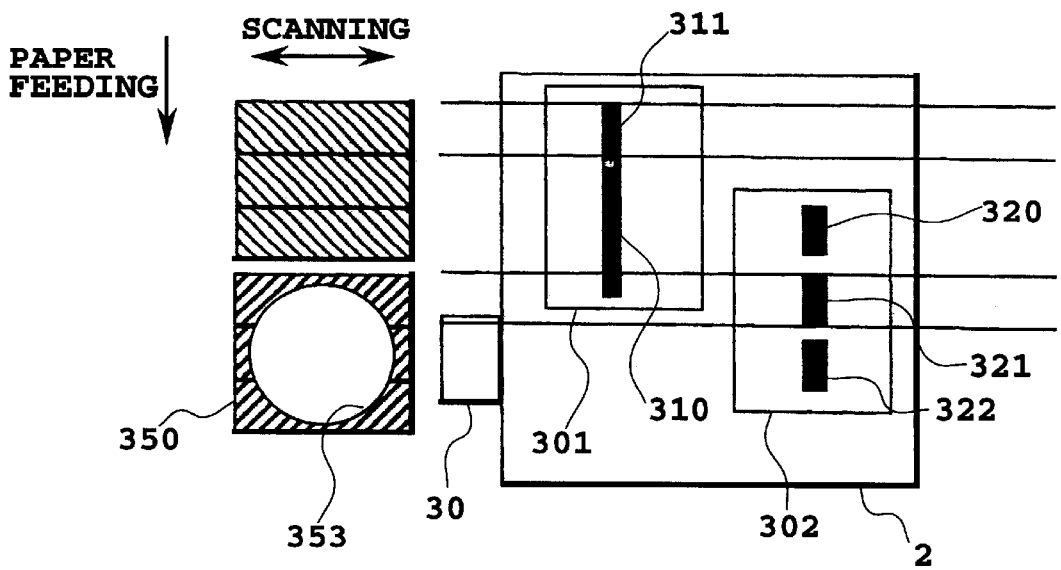
FIG. 46 is a schematic plan of another layout configuration of a sensor and a head according to another embodiment.

The layout of FIG. 46 is substantially identical to that of FIG. 43, but is different in that, for the same printing area, the first printing pattern is formed by using the paper feed direction upstream side part 311 of the black head 310, and thereafter, the second printing pattern is formed by using the cyan head 321 at another scan. The patch 350 completed by forming both patterns is read by means of the measuring spot 353 of the reflection optical sensor. The interval for the completion of both patterns and the density reading corresponds to two scans and the time S.

Figure 47:
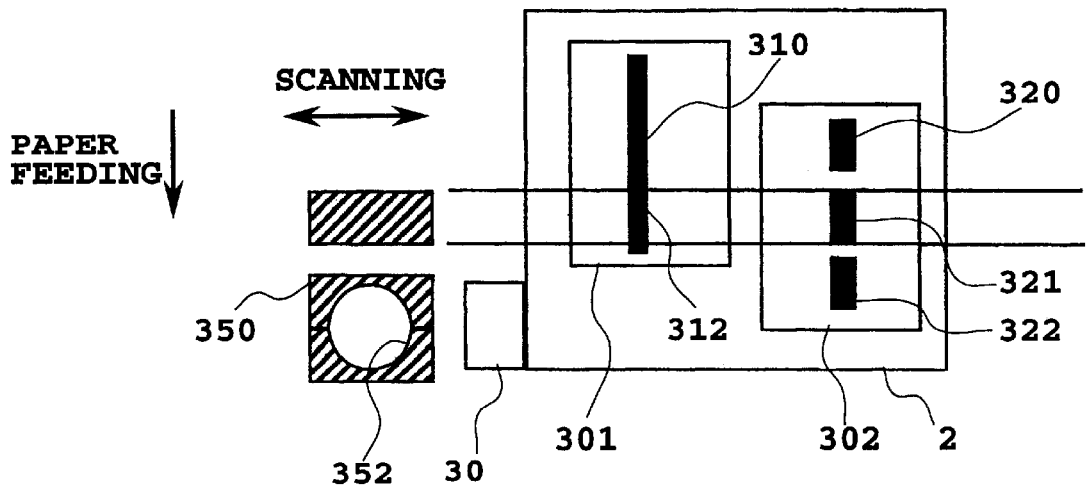
FIG. 47 is a schematic plan of another layout configuration of a sensor and a head according to another embodiment.

In the layout of FIG. 47, the offset amount of the reflection optical sensor 30 in the auxiliary scanning direction is larger than that of FIG. 42. The first printing pattern and the second printing pattern are formed for the patch 350 during the same scanning for the same printing area by using the paper feed direction downstream side part 312 of the cyan head 321 and the black head 310, and then the density of the patch is read by means of the measuring spot 353 of the reflection optical sensor 30 at a scanning two scans after the completion of both patterns. The interval for the completion of both patterns and the density reading corresponds to two scans and the time S.

Figure 48:
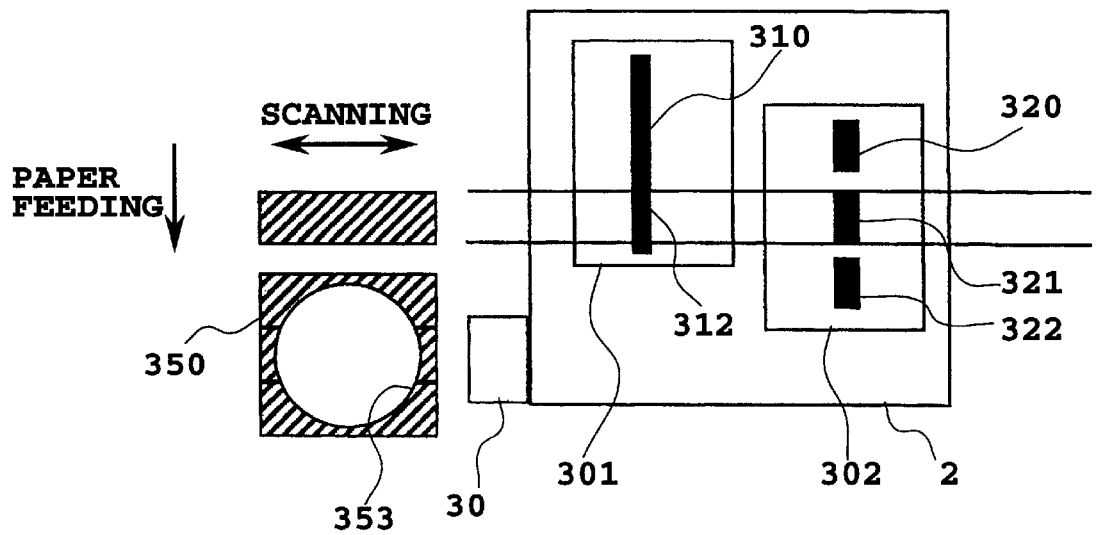
FIG. 48 is a schematic plan of another layout configuration of a sensor and a head according to another embodiment.

In the layout of FIG. 48, the offset amount of the reflection optical sensor 30 in the auxiliary scanning direction is enlarged by an amount equivalent to the printing width of one scanning with respect to the offset shown in FIG. 42. The first printing pattern and the second printing pattern are formed for the patch 350 during the same scanning for the same printing area by using the paper feed direction downstream side part 312 of the cyan head 321 and the black head 310. Then, the density of the patch is read by means of the measuring spot 353 of the reflection optical sensor 30 at a scanning three scans after the completion of both patterns. That is, the interval between the completion of both patterns and the density reading becomes an interval corresponding to three scans and the time S.

Figure 49:
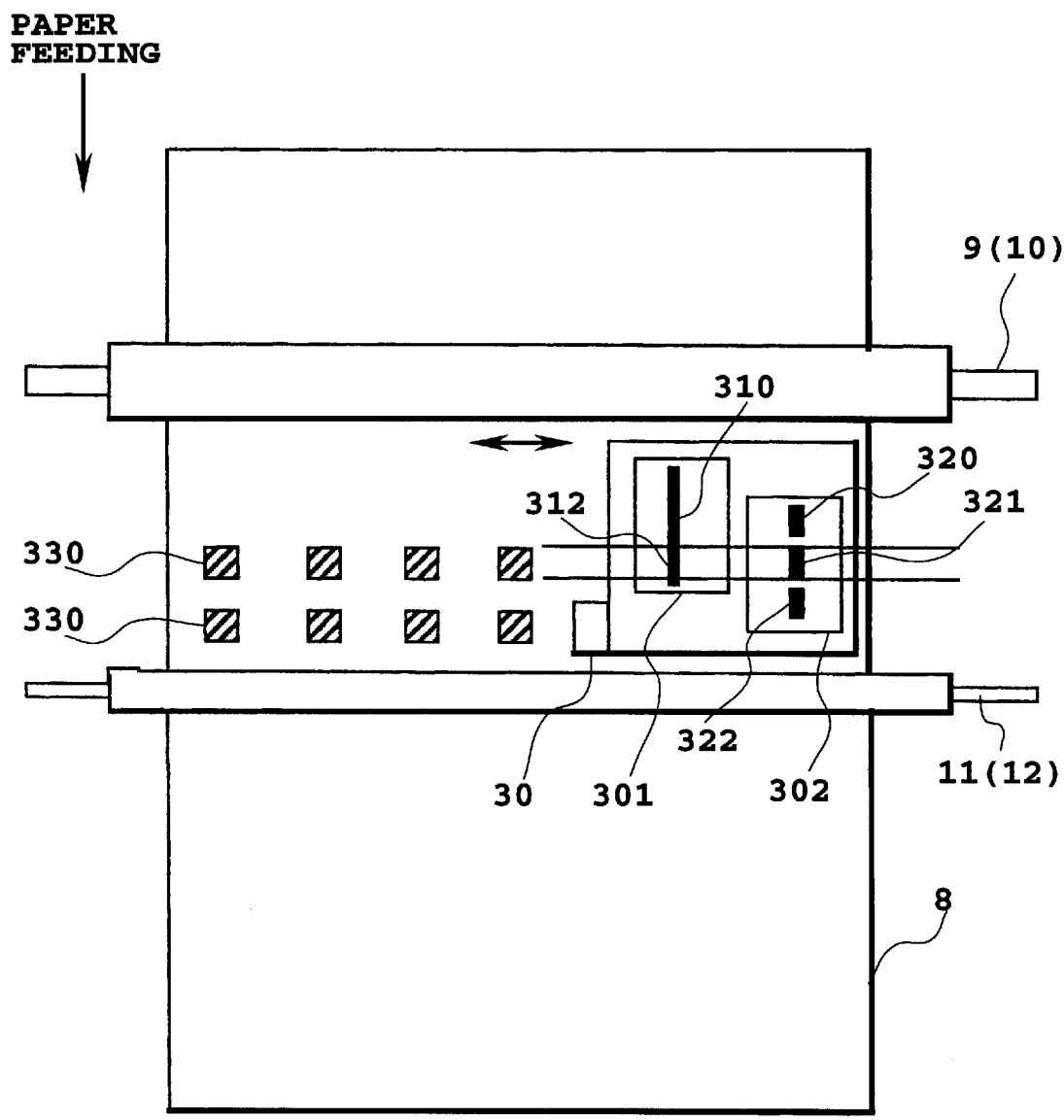
FIG. 49 is a schematic plan of another layout configuration of a sensor and a head according to another embodiment.

In the layout of FIG. 49, the offset direction of the reflection optical sensor 30 is obtained by modifying the offset layout of FIG. 33. More specifically, the reflection optical sensor 30 is offset not only in the main scanning direction in respect of the head installation position, but also is offset to downstream side in the paper feed direction by an amount of the printing width corresponding to one scan. This layout is similar to that of FIG. 35.

The embodiment shown in FIG. 49 is different from that of FIG. 35 in that the first printing pattern and the second printing pattern are formed for the patch 330 during the same scanning for the same printing area by using the paper feed direction downstream side part 312 of the cyan head 321 and the black head 310. Then, the density of the patch is read by means of the reflection optical sensor 30 at a scanning one scan after the completion of both patterns. The interval between the completion of both patterns and the density reading corresponds to one scan and the time S.

Thus, by means of various layouts shown in FIG. 33 to FIG. 49, the time interval from the pattern formation to the density reading can be adjusted selectively. As a result of this, reading the density of the patch is performed after ink has fixed to the printing medium and the printed image is stabilized, in accordance with characteristics of the ink. Moreover, it is preferable to set the distance between the sensor and the printing medium so that the reading performance may not be deteriorated by ink spots or the like.

It should be noted that in the structures of FIG. 33 to FIG. 49, the printing medium 8 and the carriage move together so that the print head and the printing medium move relatively to each other. However, the present invention may be applied to any structure provided with a means for moving both elements relatively to each other.

Various layouts of FIG. 33 to FIG. 49 allow the scanning time and the scan interval (time interval) to be utilized. However, the interval from patch completion to the density reading can be adjusted in a selective manner only. Therefore, in the following embodiments, the interval can be set arbitrarily by clocking the time by using a timer or the like so as to optimize the interval in accordance with printing medium to be used for printing, an ink nature, print head specifications, an environment for the printing apparatus, or others.

FIG. 50 is an illustration illustrating an example of setting interval (waiting time) from the patch completion to the density reading.

FIG. 50A is an illustration illustrating an example wherein setting the waiting time is modified according to a kind of printing medium 1, 2 or 3. The values shown in the figure are relative values and not absolute values. The printing medium 1 has a characteristic that the ink can be fixed easier than the printing medium 2, while the printing medium 2 has a characteristic which fixes the ink easier than the printing medium 3. On the other hand, patterns 1 and 2 are two kinds of patterns for forming the respective patches of different ink ejection rates to the printing medium, and the pattern 1 is a pattern whose ink ejection rate is lower than the pattern 2 and fixes rapidly.

As shown in FIG. 50A, the waiting time is set longer in the case that fixing condition for printing is less favorable. Similarly, FIG. 50B to FIG. 50D illustrate, respectively, examples of variation of setting the waiting time in accordance with kinds of print head (difference of ink ejection amount), kinds of ink and environmental conditions. In FIGS. 50A–50D, examples of larger value correspond to more unfavorable fixing conditions, and for which examples longer interval between the patch completion and the density reading is preferable.

Here, the environment means, for instance, the temperature in the vicinity of the print head. One of setting shown in FIG. 50D is selected by using the detection results by means of the temperature sensor 134, so that the waiting time is set shorter for higher temperature. Moreover, a humidity sensor may be provided for detecting humidity as the environment and the waiting time can be set longer for higher humidity.

It is also possible to modify the setting through the feedback of the density data (for patch formation) of an image printed on the printing medium so that S/N rate of density reading becomes high.

Figure 51:
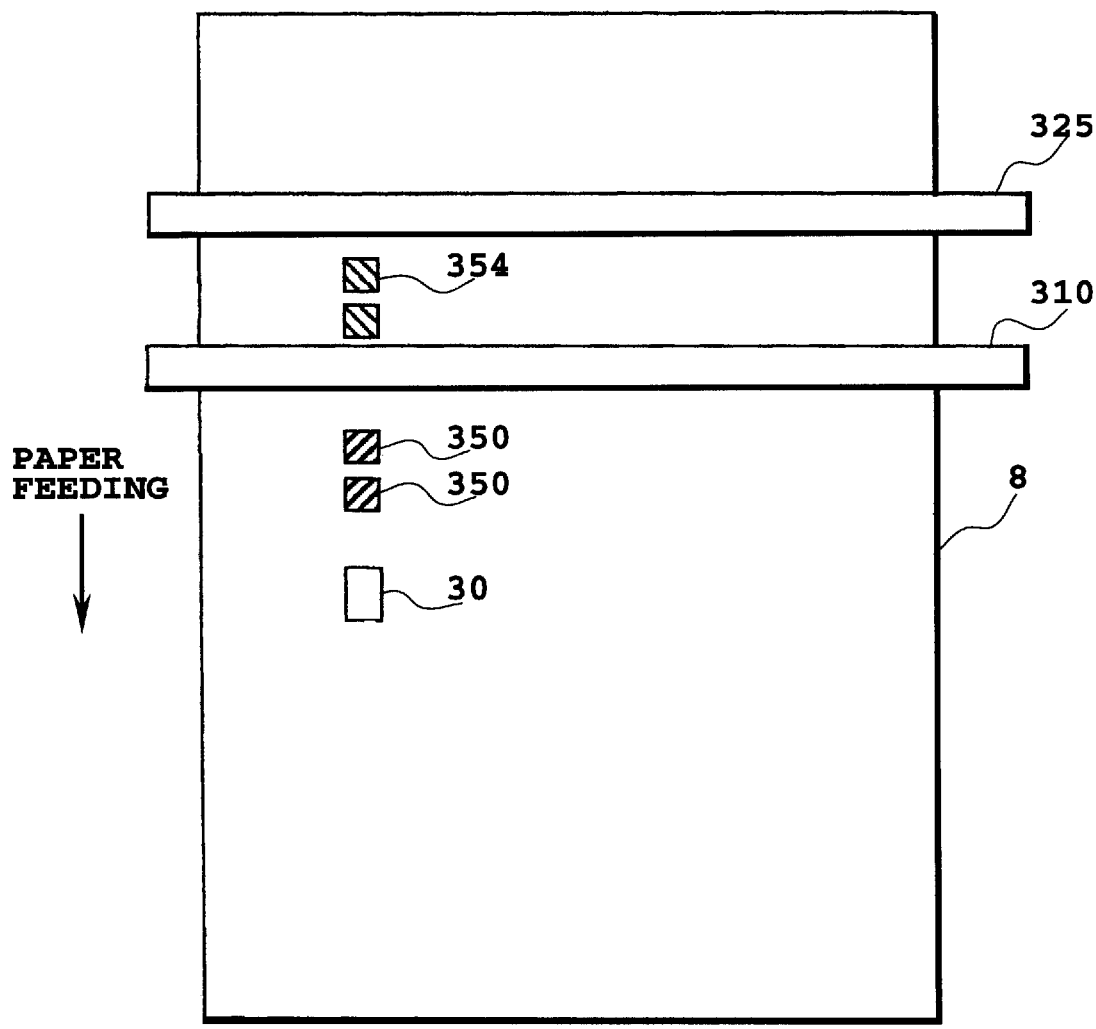
FIG. 51 is a schematic plan of another layout configuration of a sensor and a head in a line printer according to another embodiment.

FIG. 51 is a schematic diagram illustrating an example of a line printer wherein a relative movement is performed by moving only a printing medium. In this figure, components identical to those of FIG. 33 to FIG. 49 have same reference signs.

A printing medium 8 is transported (fed) in a direction designated by an arrow in the figure. First and second patterns are formed successively by means of a color head 325 and a black head 310 which are fixedly provided in the printer, and patch 350 consist of the first and second patterns is read by means of a reflection optical sensor 30. In this structure, a total of a time for transporting the patch formed on the printing medium from a position of the black head 310 to a position of the reflection optical sensor 30 and a time from arrival of the patch to a position for executing reading of density of the patch corresponds to an interval between a completion of both the first and second patterns and reading of the density.

Also in a layout of the reflection optical sensor and the heads described above, the interval can be set variously by stopping the transportation of the printing medium, or waiting for an operation after the arrival of the patch to the readable position through the use of a timer, for instance.

Additionally, in the respective layouts of FIG. 51 and FIG. 33 to FIG. 49, the total time from patch formation to density reading can further be reduced by selecting a head and an ink to be used for printing the patterns so that the penetration rate (penetration speed) of an ink to be used first for printing the first printing pattern is higher than the penetration rate of an ink used next for printing the second printing pattern.

Thus, according to the respective embodiments described on referring to FIG. 33 and thereafter, the interval can be optimized with respect to various conditions. More specifically, The interval from patch formation to density reading can be selected in accordance with the sensor layout and the scanning control to optimize the interval. Alternatively, the interval can be set by setting various parameters for the interval by a user through a use of time measuring means, such as timer, or by automatically setting the parameter through detecting the parameter, regardless of the sensor layout.

(Further Description)

The present invention achieves distinct effect when applied to a recording head or a recording apparatus which has means for generating thermal energy such as electro-thermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electro-thermal transducers, each disposed on a sheet or liquid passage that retains liquid (ink), and operates as follows: first, one or more drive signals are applied to the electro-thermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electro-thermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electro-thermal transducers is used as ejection orifices of the electro-thermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electro-thermal transducers or a combination of other heater elements and the electro-thermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of $30^-$m–$70^-$m so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electro-thermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

As described above, according to respective embodiment mentioned above, a plurality of patterns indicating the density corresponding to respective deviation amounts of print location are formed in correspondence with a plurality of deviating print positions. Then, a plurality of density of the plurality of patterns can be measured by means of optical characteristic measuring means without performing unnecessary scanning these patterns and a printing registration processing is performed on a basis of the measured density. As a result of this structure, for instance, the highest density condition or the lowest density condition among densities represented by the patterns can be set self-conclusively as a condition that printing can be performed with exact print locations.

Moreover, since the patterns are formed during a relative movement of a print head and a printing medium and an interval is adjusted so that the optical characteristics of the patterns are measured after a predetermined elapsed time from the formation of the patterns by means of the optical characteristic measuring means, the interval can be set based on the print head, printing medium and recording liquid to be used, printing duty of the formed patterns, environmental temperature and humidity. Then, a physically stable density measurement can be performed to realize a more precise printing registration.

As a result, the printing registration can be performed by a simple structure without requiring user intervention.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing apparatus for performing printing on a printing medium by using a print head, comprising:
   a scanning means for relatively moving the print head and the printing medium;
   a control means for controlling the print head to perform a first printing and a second printing, which are a subject of printing registration, so as to form a plurality of patterns, said plurality of patterns being formed in correspondence with a plurality of offset amounts in relative printing locations between said first printing and said second printing, respectively, and showing optical characteristics corresponding to said plurality of offset amounts, respectively;
   an optical characteristics measuring means provided on a location in the vicinity of said scanning means to measure the optical characteristics of each of the plurality of patterns formed by the print head controlled by said control means, the provided location of said optical characteristics measuring means being a location at which said optical characteristics measuring means measures the optical characteristics of the plurality of patterns after a predetermined time passes after formation of the plurality of patterns; and
   a printing registration means for performing printing registration processing of said first printing and said second printing based on the optical characteristics of said plurality of patterns measured by said optical characteristics measuring means.

2. A printing apparatus according to claim 1,
   wherein, said scanning means performs a main scanning in which the print head is moved in a predetermined direction while ejecting a printing liquid from an ejection means of said print head to the printing medium, and
   said optical characteristics measuring means is offset in said predetermined direction from said ejection means.

3. A printing apparatus according to claim 1,
   wherein, said scanning means performs a main scanning in which the print head is moved in a predetermined direction while ejecting a printing liquid from an ejection means of said print head to the printing medium, and
   said optical characteristics measuring means is disposed in an offset state from said ejection means in a direction different from said predetermined direction.

4. A printing apparatus according to claim 3,
   wherein, said scanning means performs said main scanning and an auxiliary scanning of relatively moving the print head and the printing medium in said different direction, at a predetermined cycle; and
   said optical characteristics measuring means is disposed at substantially same location in said different direction, as the formation position of the plurality of patterns completed by performing said main scanning and auxiliary scanning.

5. A printing apparatus according to claim 2 or 3,
   wherein said optical characteristics measuring means is disposed in an offset state in said predetermined direction or said different direction, so that the plurality of patterns are formed on the printing medium by means of the print head controlled by said control means during said relative movement and the optical characteristics of said plurality of patterns are measured by said optical characteristics measuring means after the formation of said plurality of patterns.

6. A printing apparatus for performing printing on a printing medium by using a print head, comprising:
   a scanning means for relatively moving the print head and the printing medium;
   a control means for controlling the print head to perform a first printing and a second printing, which are a subject of printing registration, so as to form a plurality of patterns, said plurality of patterns being formed in correspondence with a plurality of offset amounts in relative printing locations between said first printing and said second printing, respectively, and showing optical characteristics corresponding to said plurality of offset amounts, respectively;
   an optical characteristics measuring means provided on a location in the vicinity of said scanning means to measure the optical characteristics of each of the plurality of patterns formed by the print head controlled by said control means; and a printing registration means for performing printing registration processing of said first printing and said second printing based on the optical characteristics of a plurality of patterns measured by said optical characteristics measuring means, wherein, the printing apparatus further comprises an interval adjusting means for adjusting an execution interval, so that the plurality of patterns are formed on the printing medium by means of the print head controlled by said control means during said relative movement and the optical characteristics of said plurality of patterns are measured by said optical characteristics measuring means after a predetermined time passed from the formation of said plurality of patterns.

7. A printing apparatus according to claim 6, wherein said interval adjusting means further comprises:

a timer; and a means for inputting a measured time from said timer and making said optical characteristics measuring means wait to perform measuring the patterns until said predetermined time elapses after the completion of said patterns on said printing medium by means of the head controlled by said control means.

8. A printing apparatus according to claim 7, wherein, said scanning means performs a main scanning in which the print head is moved in a predetermined direction while ejecting a printing liquid from an ejection means of said print head to the printing medium, said optical characteristics measuring means is offset in said predetermined direction or said different direction from said ejection means, and said interval adjusting means adjusts a speed of the relative movement by said scanning means, so that the optical characteristics of said plurality of patterns are measured by said optical characteristics measuring means after said predetermined time passed from the formation of said plurality of patterns on the printing medium.

9. A printing apparatus according to claim 8, further comprising:

a setting means for variably setting said predetermined time.

10. A printing apparatus according to claim 9, wherein, said setting means sets said predetermined time to be longer when an amount of the printing liquid ejected from the ejection means becomes larger.

11. A printing apparatus according to claim 10, wherein, said setting means further sets said predetermined time to be longer in the case where the printing liquid is easy to fix to the printing medium than that in the case where difficult to fix.

12. A printing apparatus according to claim 11, wherein, said setting means further sets said predetermined time to be longer in the case where the printing medium has a property that the printing liquid is easily fixed than that in the case where the printing medium has a property that the printing liquid is hardly fixed.

13. A printing apparatus according to claim 12, wherein, said setting means further sets said predetermined time to be longer in a case where a printing duty of the ejection means is high, based upon the completion of said patterns, as compared to a case where the printing duty of the ejection means is low.

14. A printing apparatus according to claim 13, further comprising:

a temperature detection means for detecting temperature in the vicinity of said scanning means, wherein, said setting means further sets said predetermined time to be longer in a case where the detected temperature is low as compared to a case where the detected temperature is high.

15. A printing apparatus according to claim 14, further comprising:

a humidity detection means for detecting humidity in the vicinity of said scanning means, wherein, said setting means further sets said predetermined time to be longer in a case where the detected humidity is high as compared to a case where the detected humidity is low.

16. A printing apparatus according to claim 15, further comprising:

a means for varying said predetermined time set by said setting means, according to the measurement results of said optical characteristics measuring means.

17. A printing apparatus according to claim 16, wherein, said scanning means performs said main scanning and said auxiliary scanning by relatively moving the print head and the printing medium in said different direction, at a predetermined cycle.

18. A printing apparatus according to claim 17, wherein, said optical characteristics measuring means is offset in a direction different from said predetermined direction from said ejection means, and said interval adjusting means adjusts said execution interval according to the number of times of execution of the auxiliary scanning.

19. A printing apparatus according to claim 18, wherein, said scanning means performs a main scanning in which printing liquids are ejected from the first ejection means of a print head ejecting a first printing liquid having a fast penetration speed to the printing medium, and the second ejection means of a print head ejecting a second printing liquid having a penetration speed slower than said first printing liquid; and said control means controls the print heads to perform said first printing by means of said second ejection means using said second printing liquid and then performs said second printing by means of said first ejection means using said first printing liquid.

20. A printing apparatus according to claim 1, wherein, the print head has a thermal energy generation element to apply thermal energy to the printing liquid so that the printing liquid is ejected from-said print head to perform the printing.

* * * * *

UNITED STATES PATENT AND TRADEMARK OFFICE
CERTIFICATE OF CORRECTION

PATENT NO.    : 6,416,151 B1
DATED         : July 9, 2002
INVENTOR(S)   : Naoji Otsuka et al.

It is certified that error appears in the above-identified patent and that said Letters Patent is hereby corrected as shown below:

Title page,
Item [56], FOREIGN PATENT DOCUMENTS,
"59123670" should read -- 59-123670 --;
"59138461" should read -- 59-138461 --.

Column 1,
Line 58, "difference" should read -- differences --;
Line 61, "require" should read -- requires --;
Line 66, "can" should read -- can perform --.

Column 2,
Line 8, "during respective" should read -- respectively during --;
Line 9, "performed," should read -- is performed, --;
Line 43, "respective the" should read -- the respective --.

Column 3,
Line 57, "FIG. 12" should read -- FIG. 12 is --.

Column 4,
Lines 60 and 63, "forth" should read -- fourth --.

Column 5,
Lines 1 and 9, "forth" should read -- fourth --.

Column 7,
Line 16, "on" should be deleted.

Column 11,
Line 66, "realized" should read -- be realized --.

Column 14,
Line 3, "scan." should read -- scans. --.

UNITED STATES PATENT AND TRADEMARK OFFICE
CERTIFICATE OF CORRECTION

PATENT NO. : 6,416,151 B1
DATED : July 9, 2002
INVENTOR(S) : Naoji Otsuka et al.

It is certified that error appears in the above-identified patent and that said Letters Patent is hereby corrected as shown below:

Column 16,
Line 6, "is" should read -- are --.

Column 18,
Line 13, "scan" should read -- scans --.

Column 19,
Line 22, "again print" should read -- print again --.

Column 20,
Lines 44 and 46, "that" should read -- where --.

Column 24,
Lines 62 and 64, "is" should read -- are --.

Column 30,
Line 46, "an" should be deleted;
Line 53, "head( and" should read -- head (and --;
Line 62, "pint" should read -- print --.

Column 31,
Line 8, "pattern," should read -- patterns, --;
Line 24, "depending" should read -- dependent --;
Line 36, "in respect of" should read -- with respect to --;
Line 37, "downstream" should read -- a downstream --;
Line 53, "a" should read -- an --;
Line 58, "one" should read -- by one --;
Line 63, "of" (first occurrence) should be deleted.

Column 32,
Line 10, "pinging" should read -- printing --;
Lines 13 and 17, "scanning" should read -- scannings --;
Line 57, "reads" should read -- read --;
Line 67, "increment. At Step" should read -- to increment. At step --.

UNITED STATES PATENT AND TRADEMARK OFFICE
CERTIFICATE OF CORRECTION

PATENT NO. : 6,416,151 B1
DATED : July 9, 2002
INVENTOR(S) : Naoji Otsuka et al.

It is certified that error appears in the above-identified patent and that said Letters Patent is hereby corrected as shown below:

Column 33,
Line 13, "a following another" should read -- another following --;
Line 17, "consist" should read -- consisting --;
Line 23, "a" should be deleted;
Line 24, "following another" should read -- another following --;
Line 27, "consist" should read -- consisting --;
Line 35, "patterns formation" should read -- pattern formations --;
Line 36, "reading" should read -- readings --.

Column 34,
Line 7, "respective" should read -- respectively --;
Line 15, "increment." should read -- to increment. --;
Line 33, "a" should be deleted;
Line 34, "following another" should read -- another following --.

Column 35,
Line 45, "in respect of" should read -- with respect to --.

Column 36,
Line 40, "longer" should read -- of longer --;
Line 41, "is" should read -- are --;
Line 63, "consist" should read -- consisting --.

Column 37,
Line 20, "The" should read -- the --.

Column 38,
Line 16, "consists" should read -- consist --.

Column 39,
Line 18, "density" should read -- densities --;
Line 21, "scanning" should read -- scanning of --.

Column 40,
Line 40, "cycle;" should read -- cycle, --;
Line 33, "same" should read -- the same --.

Column 41,
Line 52, "difficult" should read -- it is difficult --;
Line 60, "wherein," should read -- ¶ wherein, --;
Line 61, "said" (close up right margin).

UNITED STATES PATENT AND TRADEMARK OFFICE
CERTIFICATE OF CORRECTION

PATENT NO. : 6,416,151 B1
DATED : July 9, 2002
INVENTOR(S) : Naoji Otsuka et al.

It is certified that error appears in the above-identified patent and that said Letters Patent is hereby corrected as shown below:

Column 42,
Line 48, "liquid;" should read -- liquid, --;
Line 57, "from-said" should read -- from said --.

Signed and Sealed this

Twenty-fifth Day of February, 2003

JAMES E. ROGAN
*Director of the United States Patent and Trademark Office*